United States Patent [19]
Matsuoka et al.

[11] Patent Number: 5,956,702
[45] Date of Patent: Sep. 21, 1999

[54] TIME-SERIES TREND ESTIMATING SYSTEM AND METHOD USING COLUMN-STRUCTURED RECURRENT NEURAL NETWORK

[75] Inventors: Masahiro Matsuoka, Kawasaki, Japan; Mostefa Golea, Spring Hill Brisbane, Australia

[73] Assignee: Fujitsu Limited, Kawasaki, Japan

[21] Appl. No.: 08/701,700

[22] Filed: Aug. 22, 1996

[30] Foreign Application Priority Data

Sep. 6, 1995 [JP] Japan .................................. 7-229509

[51] Int. Cl.[6] .................................................. G06F 15/18
[52] U.S. Cl. ................................. 706/22; 706/20; 706/25; 706/19; 706/40; 706/34; 704/250
[58] Field of Search .................................. 395/22, 24, 27; 704/250; 706/20, 22, 19, 34, 25

[56] References Cited

U.S. PATENT DOCUMENTS

| | | | |
|---|---|---|---|
| 5,056,037 | 10/1991 | Eberhardt | 395/24 |
| 5,109,475 | 4/1992 | Kosaka et al. | 395/22 |
| 5,129,039 | 7/1992 | Hiraiwa | 395/24 |
| 5,255,349 | 10/1993 | Thakoor et al. | 395/27 |
| 5,465,321 | 11/1995 | Smyth | 395/22 |
| 5,526,465 | 6/1996 | Carey et al. | 704/250 |

OTHER PUBLICATIONS

Alan Lapedes and R. Farber, "Nonlinear Signal Processing Using Neural Networks: Prediction and System Modeling", IEEE, 1987.

Jeng–Neng Hwang and Eric Little, "Real Time Recurrent Neural Networks for Time Series Prediction and Confidence Estimation", 1996 IEEE International Conference on Neural Networks p. 1889–94, Jun. 3–6, 1996.

C.R. Gent and C.P. Sheppard, "Predicting Time Series by a Fully Connected Neural Network Trained by Back Propagation" Computing and Control Engineering Journal, May 1992.

Primary Examiner—Eric W. Stamber
Assistant Examiner—Jagdish Patel
Attorney, Agent, or Firm—Staas & Halsey, LLP

[57] ABSTRACT

Each neural element of a column-structured recurrent neural network generates an output from input data and recurrent data provided from a context layer of a corresponding column. One or more candidates for an estimated value is obtained, and an occurrence probability is computed using an internal state by solving an estimation equation determined by the internal state output from the neural network. A candidate having the highest occurrence probability is an estimated value for unknown data. Thus, the internal state of the recurrent neural network is explicitly associated with the estimated value for data, and a data change can be efficiently estimated.

21 Claims, 39 Drawing Sheets

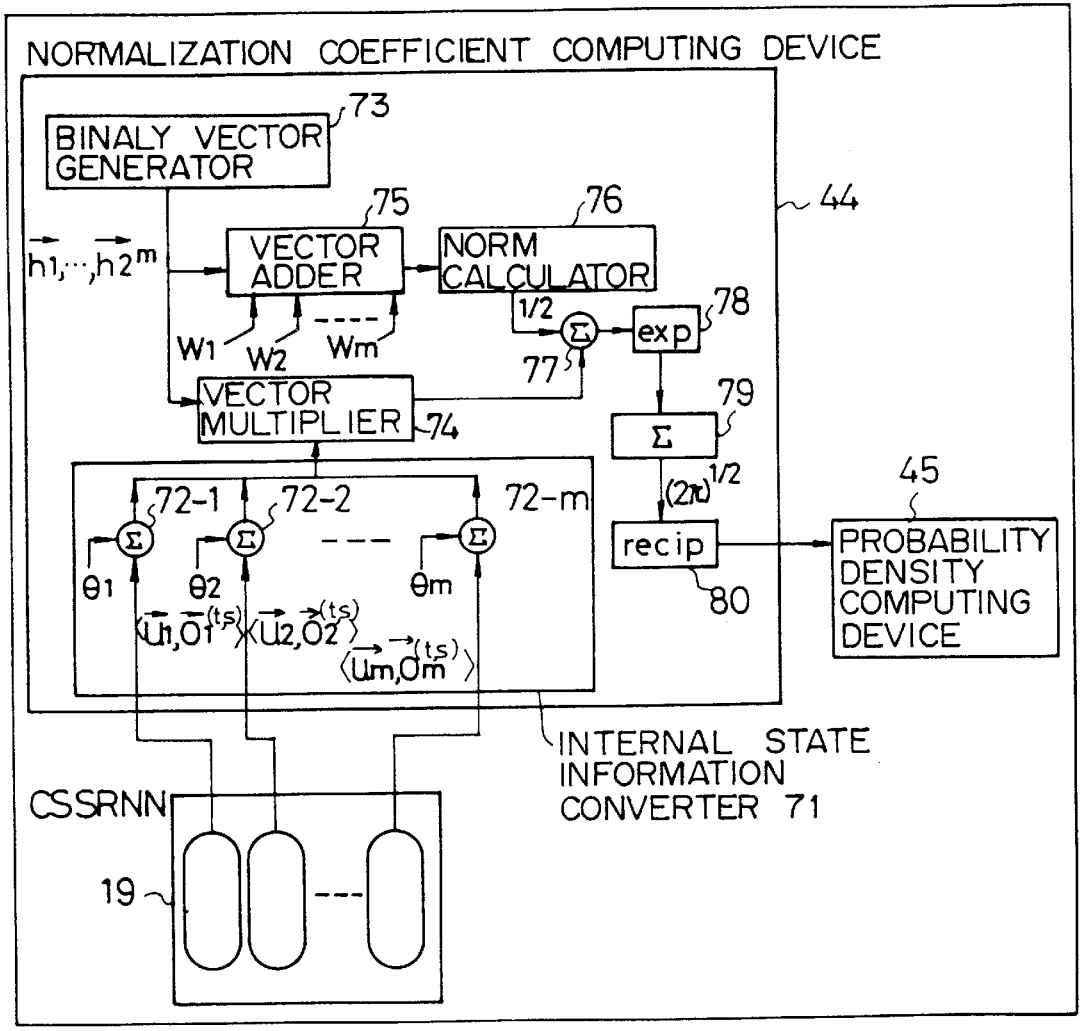
F I G. 10

|   | HIDDEN ELEMENT 1 | HIDDEN ELEMENT 2 |
|---|---|---|
| $w$ | 1.02696 | −1.10853 |
| $u$ | 3.87578 | 5.31459 |
| $\theta$ | −1.79017 | −2.63785 |

FIG. 25

|   | HIDDEN ELEMENT 1 | HIDDEN ELEMENT 2 |
|---|---|---|
| $w$ | −1.95128 | 0.95911 |
| $u1$ | 3.92196 | 5.92511 |
| $u2$ | 2.24827 | −4.07080 |
| $\theta$ | −2.99996 | 9.96372 |

FIG. 32

| NUMBER OF REGISTERS | NEGATIVE VALUE LOGARITHM LIKELIHOOD | FORMAL AMOUNT-OF-INFORMATION REFERENCE |
|---|---|---|
| 1 | 588.387 | 1178.77 |
| 2 | 585.880 | 1175.76 |
| 3 | 585.522 | 1177.04 |
| 4 | 585.495 | 1178.99 |
| 5 | 585.269 | 1180.54 |

FIG. 39

TIME-SERIES TREND ESTIMATING SYSTEM AND METHOD USING COLUMN-STRUCTURED RECURRENT NEURAL NETWORK

BACKGROUND OF THE INVENTION

1. Field of the Invention

The present invention relates to a recurrent neural network, and also to a system and method of estimating the trend of a change in measurement discontinuously variable in time.

2. Description of the Related Art

The Kalman filter has been conventionally used as an estimation filter. It is a classic method of identifying a system, and is still being developed for various applications. There are various methods of applying a neural network being newly established as a static nonlinear system identifying method for estimating nonlinear time-series data. However, the application of the Kalman filter is limited by the capabilities of the current computers, and the applications relating to the time-series analysis of the neural networks are new and have the following problems.

(1) Method using Kalman Filter

When discontinuous changes are made in the trend of time-series data or when a Gaussian type cannot be estimated for the noise representing the uncertainty of a model, a normal linear Gaussian Kalman filter does not properly estimate or filter data (refer to Time-series Analysis Programming by Genshiro Kitagawa, in Iwanami Computer Science published in 1993). If a discontinuous state change is processed by a linear Gaussian model, then an extremely large dimensional model is required. At this time, it is difficult to set a standard for objectively selecting the dimension of the model.

Recently, to solve the above described problems, a nonlinear and non-Gaussian generalized Kalman filter has been introduced (Genshiro Kitagawa. Non-Gaussian State-Space Modeling of Nonstationary Time Series. Journal of the American Statistical Association, 82 (400): 1032–1041, 1987.). The generalized Kalman filter is successfully used in estimating and smoothing a discontinuous change in trend or a noise. However, to operate the generalized Kalman filter, the distribution of the estimating, filtering, and smoothing should be directly computed. Therefore, when a larger state-space model is used, it takes a longer time in identifying a filtering coefficient appropriate for the generalized Kalman filter. On the other hand, since the probability distribution required for the computation in each step can be determined using the linear Gaussian model only by estimating a mean value and distribution, the volume of computation for the identification can be reduced but identification objects are limited. Additionally, to effectively apply the generalized Kalman filter, prior knowledge is required for the distribution in which noises including an abnormal value can be appropriately represented.

However, using a Monte Carlo filter for estimating the distribution of the noises from a sample in the bootstrap method, data can be appropriately estimated or smoothed even if prior knowledge is lacking for noises (Genshiro Kitagawa. A Monte Carlo Filtering and Smoothing Method for Non-Gaussian the receives Nonlinear State Space Models. Research Memorandum 462, The Institute of Statistical Mathematics, 12 1993.). Using the Monte Carlo filtering method, a methodology for common nonlinear non-Gaussian time series data is being established. However, the time required in computing the probability distribution through a resampling process is significantly lengthened.

(2) Method using a Neural Network

Data is retrieved from time-series data through a time window. Then, a series of patterns are generated to indicate small differences in a time series so that the time series data are learned through the feed-forward neural network and back propagation (A. Waibel. Modular Construction of Time-Delay Networks for Speech Recognition. Neural Computation, 1:382–399, 1989./Jeng-Neng Hwang, Shyh-Rong Lay, Martin Maechler, R. Douglas Martin, and James Schimert. Regression Modeling in Back-Propagation and Projection Pursuit Learning. IEEE Transactions on Neural Networks, 5(3):342–353, May 1994.). There is the problem in exactly learning the time series data in this method that the scale of the neural network is large and the storage areas are running short. The problem is caused by representing the relationship between input and output data by a weight value of the neural network. Furthermore, another problem arises. That is, definite descriptions cannot be made from the viewpoint of generating a probability structure of time-series data.

To solve the problems of network scales, a recurrent neural network having a feedback structure has been designed (Jerome T. Connor, R. Douglas Martin, and L. E. Atlas. Recurrent Neural Networks and Robust Time Series Prediction, IEEE Transactions on Neural Networks, 5(2): 240–254, March 1994.). There are two main types of recurrent neural networks. That is, a method in which an output layer recurs (Jordan method), and a method in which an intermediate layer recurs (Elman method). The recurrent neural network is specifically provided with a layer for storing recurrent information. The layer is referred to as a context layer.

The feedback structure solves the scale problem, but it is not certain in what scale and density of the context layer should the past information history recur to obtain an appropriate estimation filter. Furthermore, the operations and estimation for unknown time-series data (data generated in the same probability structure as the data used in identifying a parameter) are not clearly defined. It is obvious that a common network connection requires a high spatial computation cost, and a large volume of information is required to compute a differential coefficient, etc. when each type of coefficient is retrieved.

There is a method of configuring an estimation filter using a recurrent neural network having a restriction structure similar to that of an autoregressive moving average (ARMA) model (James Ting-Ho Lo. Synthetic Approach to Optimal Filtering. IEEE Transactions on Neural Networks, 5(5):803–811, September 1994./G. V. Puskorius and L. A. Feldkamp. Recurrent Neural Networks with the Decoupled Extended Kalman Filter Algorithm. Science of Artificial Neural Networks, 1710:461–473, 1992.). In this case, an internal state of a neural network can be interpreted through a normal Kalman filter. There is also a method of selecting a parameter appropriate for given data while computing the error of a given parameter through operations according to the least-squares-error criterion and computation using the Kalman filter. However, this technology has a problem of the volume of the computation using the Kalman filter. Additionally, there are a number of unclear points on the relationship between the network internal state and time-series data, thereby making a difficult problem of interpretation of an internal state.

SUMMARY OF THE INVENTION

The present invention aims at providing a time-series trend estimating system and method for clarifying the relationship between the internal state of a recurrent neural network and time-series data, and efficiently estimating a discontinuously changing time-series trend.

The time-series trend estimating system according to the present invention comprises an input unit, neural network unit, estimated value generating unit, and output unit.

The input unit inputs time-series data. The neural network unit includes a column-structured recurrent neural network having a context layer, and outputs an internal state including the information about the past time-series data.

An estimated value generating unit obtains an estimated value candidate occurrence probability using the above described internal state, and defines the candidate indicating the highest probability as an estimated value. The output unit outputs the estimated value as a result of estimating unknown data.

For example, a neural network unit sets for each column the internal state of a recurrent neural network containing past data information. The recurrent neural network comprises a plurality of columns. Each column contains a neural element for generating output data from the input data; and a context layer for holding the past output of the neural element.

When the current time data is input, each neural element generates new output data from the input data and recurrent data from the context layer in the column of the neural element. Then, the data information for one time unit in the context layer is shifted.

The estimated value generating unit obtains a candidate for an estimated value by solving an estimating equation determined according to the internal state received from the neural network unit. Then, the estimated value generating unit obtains an estimated value candidate occurrence probability using the internal state. The output unit outputs the highest occurrence probability as an estimated value for unknown data.

For example, an energy function can be configured with a discrete variable and an internal state by assigning to a neural element of each column the discrete variable representing the discrete property of the discontinuous trend of time-series data. According to the probability distribution function defined using the energy function, the occurrence probability of a candidate for the above described estimated value is represented.

In consideration of the defined probability distribution function, the internal state of each column represents the information about the probability of selecting a specific probability distribution of data.

Such a time-series trend estimating system allows the internal state of a neural network to be interpreted in relation to the occurrence probability of a discrete value of time-series data.

Since the data of only the same column is recurrently input to each neural element, the columns are independent of each other. Accordingly, the parameter of each column can be adjusted to apply to each discrete value of a change trend, and a discontinuous trend can be easily estimated.

Thus, the relationship between the internal state of a recurrent neural network and time-series data can be clearly defined. Using the relationship, a time-series trend that is variable in time can be efficiently estimated.

BRIEF DESCRIPTION OF THE DRAWINGS

FIG. 10 shows the configuration of a normalization coefficient computing device;

FIG. 25 shows an example of an optimum parameter set for the h2r1 neural network;

FIG. 32 shows an example of an optimum parameter set for the h2r2 neural network;

FIG. 39 shows the number of registers and an example of a formal information reference.

DESCRIPTION OF THE PREFERRED EMBODIMENTS

Figure 1:
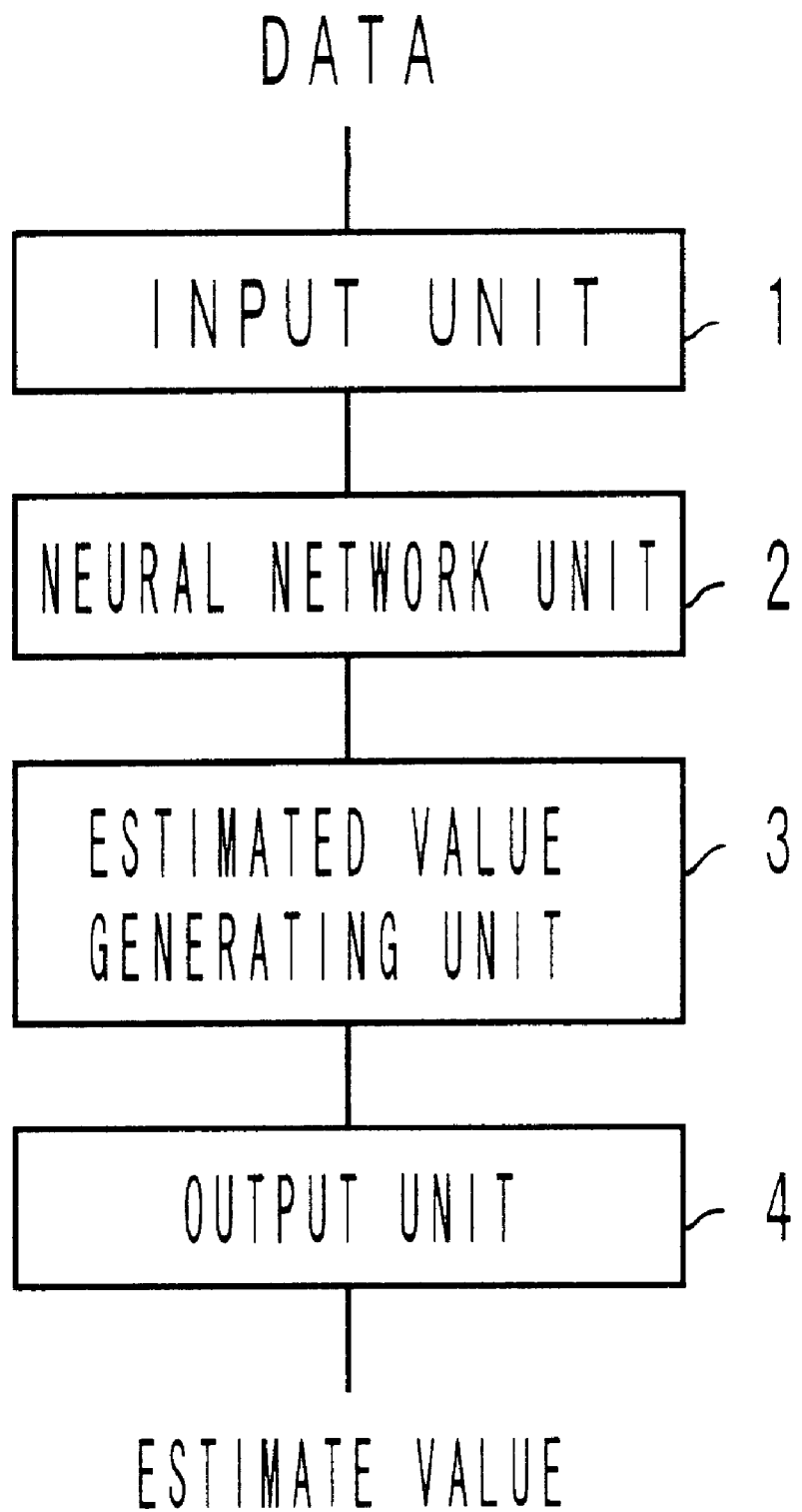
FIG. 1 shows the principle of a time-series trend estimating system according to the present invention.

FIG. 1 shows the principle of the time-series trend estimating system according to the present invention. The time-series trend estimating system shown in FIG. 1 comprises an input unit 1, a neural network unit 2, an estimated value generating unit 3, and an output unit 4.

The input unit 1 inputs time-series data.

The neural network unit 2 includes a column-structured recurrent neural network having a context layer and outputs an internal state containing the information about the past time-series data.

The estimated value generating unit 3 obtains the occurrence probability of a candidate for an estimated value according to the above described internal state, and defines the candidate indicating the highest probability as an estimated value.

The output unit 4 outputs the above described estimated value as an estimation result for unknown data.

Figure 2:
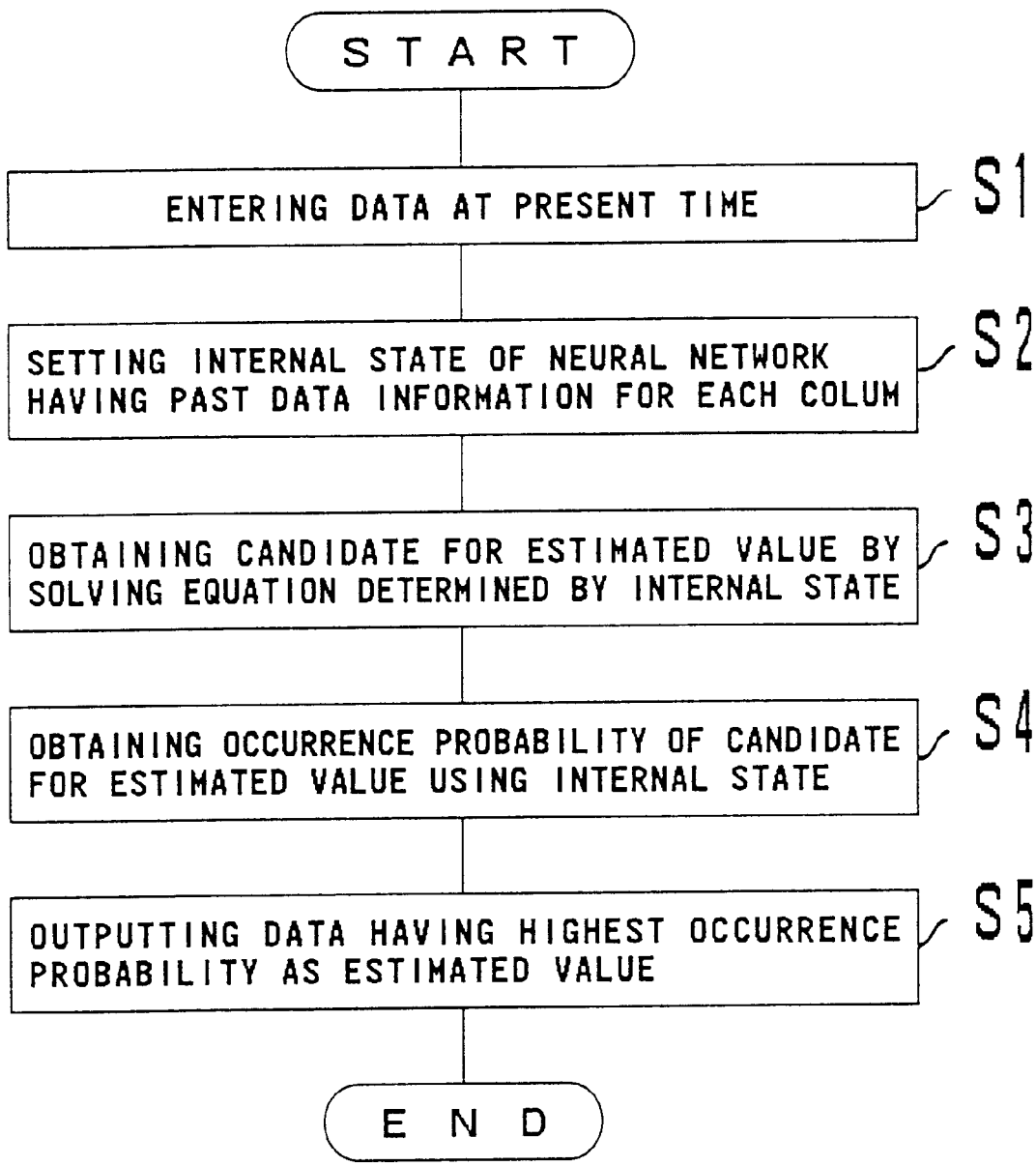
FIG. 2 is a flowchart showing a time-series trend estimating process.

FIG. 2 is a flowchart showing the estimating process performed by the time-series trend estimating system shown in FIG. 1. In step S1 shown in FIG. 2, the input unit 1 inputs the data at the current time.

In step S2, the neural network unit 2 sets for each column the internal state of a recurrent neural network containing the past data. The recurrent neural network comprises a plurality of columns. Each column contains a neural element for generating output data from the input data; and a context layer for holding the past output from the neural element. When the data at the current time is input, the neural element generates output data from the input data and the recurrent data from the context layer in the same column as the neural element. The data for one time unit in the context layer is shifted.

In step S3, the estimated value generating unit 3 solves the estimating equation determined according to the internal state, and obtains a candidate for an estimated value. At this time, the estimated value generating unit 3 obtains the solution of the estimating equation using the internal state received from the neural network unit 2.

In step S4, the estimated value generating unit 3 obtains the occurrence probability of a candidate for an estimated value according to the internal state.

In step S5, the output unit 4 outputs the highest occurrence possibility as an estimated value for unknown data.

An energy function can be configured with a discrete variable and an internal state by assigning to a neural element of each column the discrete variable representing the discrete property of the discontinuous trend of time-series data. According to the probability distribution function defined using the energy function, the occurrence probability of a candidate for the above described estimated value is represented. As described later, in consideration of the defined probability distribution function, the internal state of each column outputs the probability to set the discrete variable of a corresponding neural element to 1. If there is a high probability that a certain discrete variable is 1, then the contribution of the probability distribution having a mean value determined by the parameter of the column is very large. Therefore, the internal state represents the information about the probability that the specific probability distribution is selected. Such a time-series trend estimating system allows the internal state of a neural network to be interpreted in relation to the occurrence probability of a discrete value of time-series data. Since the data of only the same column is recurrently input to each neural element, the columns are independent of each other. Accordingly, the parameter of each column can be adjusted to apply to a discrete value of a discontinuous change trend, and the trend can be easily estimated.

The neural network unit 2 shown in FIG. 1 corresponds to a column-structured simple recurrent neural network 19 shown in FIG. 3 and described later. The estimated value generating unit 3 corresponds to a nonlinear equation solving device 18. The input unit 1 and output unit 4 correspond to a display/communication device 12.

According to the present embodiment, a system is designed as follows.

(a) The capabilities of exactly following great changes in trend that a linear model cannot follow are guaranteed by assigning a discrete variable to a hidden element of a neural network. At this time, an identifying method is also provided to configure a filter capable of appropriately follow the changes.

(b) To process an abnormal value that cannot be processed by a linear model or by assuming a simple distribution, a saturation property, that is, one of the nonlinear properties of a network, is used.

(c) A probability density function for the measurement of an estimating mechanism and a filter is determined using the linear summation of Gaussians/mixture of Gaussians. The probability density function is computed based on the internal state of the neural network. Thus, the relationship between the internal state of a network and time-series data can be clearly defined. Additionally, an efficient computing method is applied to a small-scale network.

(d) The network is an Elman type structure, and the structure is limited by applying a column structure to the context layer. Thus, the independence of recurrent information is guaranteed, and the recomputation of the internal state required to retrieve the optimum coefficient can be facilitated.

Figure 3:
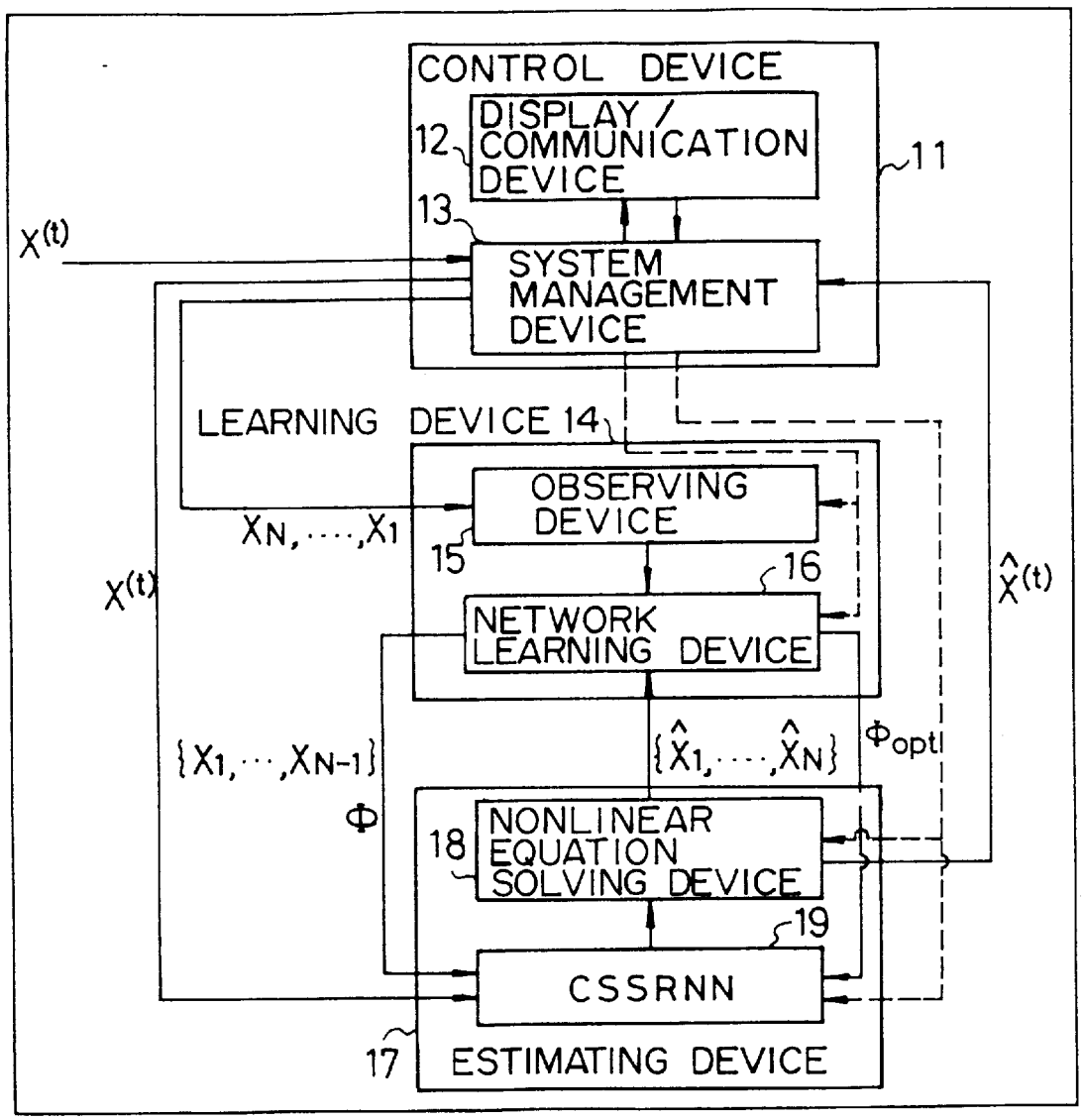
FIG. 3 shows the configuration of the time-series trend estimating system.

FIG. 3 shows the configuration of the time-series trend estimating system according to the present invention. The time-series trend estimating system shown in FIG. 3 comprises a control device 11, a learning device 14, and an estimating device 17. The control device 11 comprises the display/communication device 12 and a system management device 13. The learning device 14 comprises an observing device 15 and a network learning device 16. The estimating device 17 comprises the nonlinear equation solving device 18 and column-structured simple recurrent neural network 19. The column-structured simple recurrent neural network is hereinafter referred to as a CSSRNN.

Figure 4:
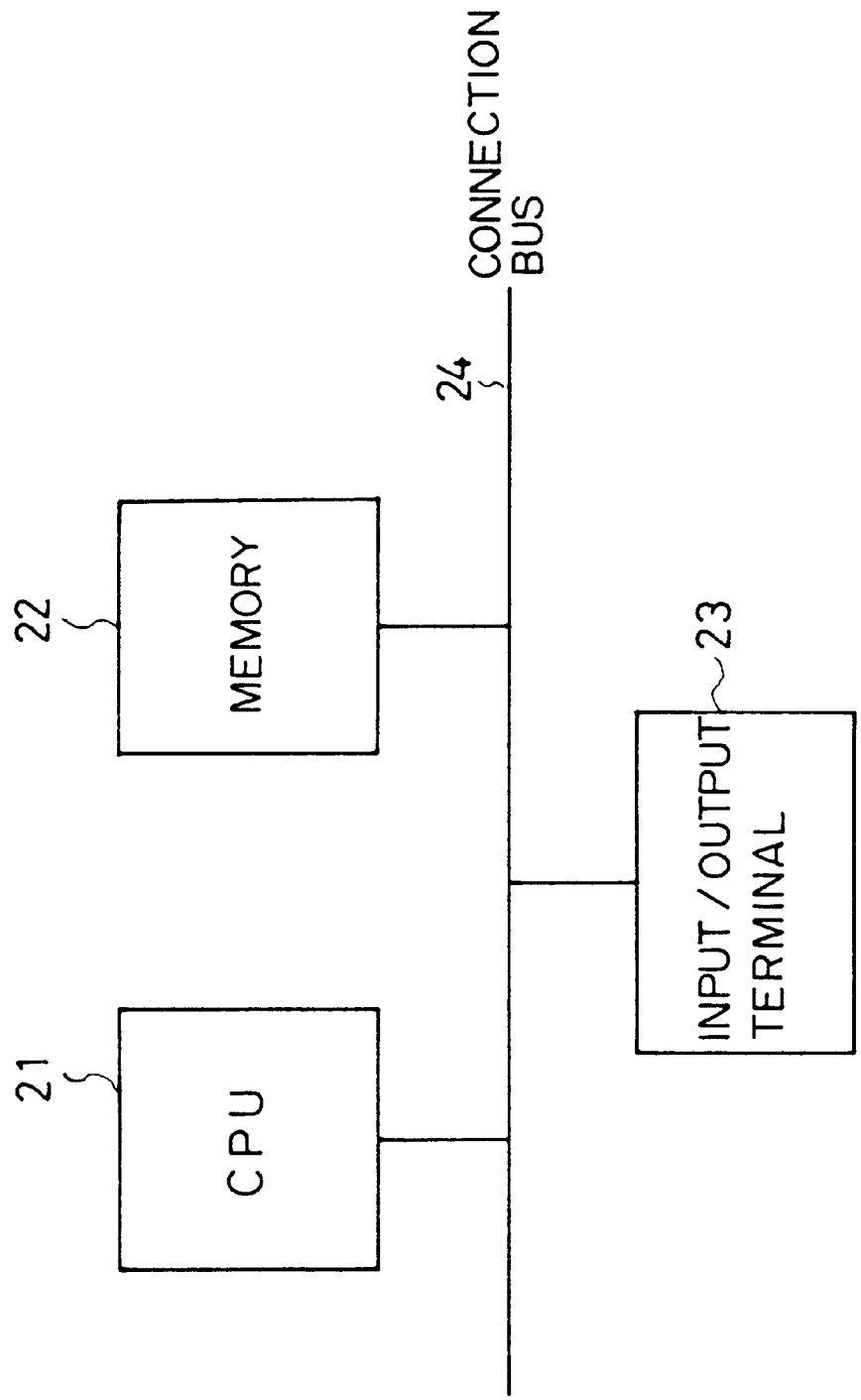
FIG. 4 shows the configuration of the computer system according to an embodiment of the present invention.

The time-series trend estimating system is embodied as a computer system as shown in FIG. 4. The computer system shown in FIG. 4 comprises a CPU (central processing unit) 21, a memory 22, an input/output terminal 23, and a bus 24 for connecting them. The input/output terminal 23 is a terminal unit comprising, for example, a display device and a keyboard, and corresponds to the display/communication device 12. An external storage device such as a hard disk, etc., a printer, and other units are connected as necessary to the connection bus 24. Each of the functions of the system management device 13, learning device 14, and estimating device 17 is realized by the CPU 21 for executing the programs stored in the memory 22.

The control device 11 is an interface required to transmit data between the time-series trend estimating system and another system or a user (hereinafter referred to as a client). It also reserves necessary computer resources and controls the flow of data. In FIG. 3, the arrow in bold lines indicates the flow of data, and the arrow in broken lines indicates the route of control information. The time-series trend estimating system is operated in a learning mode and an estimating mode. These modes are controlled by the system management device 13 of the control device 11. The system management device 13 switches the modes according to the information from the display/communication device 12. In the learning mode, the learning device 14 is activated. At this time, the data input line is connected from the control device 11 to the learning device 14. When the necessary length of time-series data is collected, the learning operation is performed according to the data. The estimating device 17 obtains from the learning device 14 the input data required to update the internal state of the CSSRNN 19. In the estimating mode, the learning device 14 is ready to be activated, and the input line is directly connected to the estimating device 17. The estimating device 17 performs the estimating process using the optimum parameter set. The estimation result is provided for the client by the display/communication device 12 through the system management device 13.

The observing device 15 of the learning device 14 reads observation data $x^{(t)}$ with time. Then, the learning device 14 activates the network learning device 16 and passes to the network learning device 16 the read data as time-series data $\{x_1, \ldots, x_N\}$. The network learning device 16 obtains the optimum parameter set $\Phi_{opt}$ through learning and outputs it to the CSSRNN 19 of the estimating device 17. The learning device 14 is placed in the activation wait state.

The network learning device 16 passes to the estimating device 17 the time-series data $\{x_1, \ldots, x_N\}$ and parameter set $\Phi$. The $\Phi$ first passed to the estimating device 17 is a random parameter set. Then, the network learning device 16 receives an estimated value $\{\hat{x}_1, \ldots, \hat{x}_N\}$ from the estimating device 17, computes the evaluation function for use in evaluating the difference between the data and a model represented by the CSSRNN 19, and amends the parameter set $\Phi$ according to the obtained value. This process is repeated until the optimum parameter set that minimizes the evaluation function is obtained.

The estimating device 17 drives the CSSRNN 19 based on a given parameter set $\Phi$, updates the internal state of the CSSRNN 19, and estimates the time-series data using the nonlinear equation solving device 18 according to the internal state.

The CSSRNN 19 is a recurrent neural network comprising an input layer, a hidden element layer, and a context layer. The context layer comprises a shift register for storing the past output of each of the hidden elements of the CSSRNN 19. The past output history of each hidden element recurs itself, and is not directly transmitted to another element. The value in the shift register of the context layer of the CSSRNN 19 is referred to as an internal state. The CSSRNN 19 sequentially updates the internal state while receiving the input $\{x_1, \ldots, x_N\}$ with time axis in order from the earliest data.

The nonlinear equation solving device 18 solves the nonlinear equation for estimation to compute the estimated value $\hat{x}^{(t)}$ for the data. The coefficient of the nonlinear equation is determined according to the internal state of the CSSRNN 19.

Then, the components and operations of each device and the data flow among them are described.

The display/communication device 12 displays the time-series data and estimated trend for the client. The time-series data and estimated trend are transmitted from the estimating device 17 to the display/communication device 12 through the system management device 13. If the client is not satisfied with the displayed result, he or she can demand to relearn the parameter of the estimating device 17. At this time, the client may specify the scale of the CSSRNN 19, and amend the learning algorithm of the learning device 14. When the learning algorithm is amended, the learning standard is amended and each parameter for the learning algorithm is specified or amended through the display/communication device 12. The client instructs the system management device 13 to perform the re-computation or to amend each parameter.

The system management device 13 reserves computer resources required for the learning device 14 and estimating device 17 to activate each device. The system management device 13 controls the operations of the learning device 14 and estimating device 17 through the control path indicated by the broken lines shown in FIG. 3. In the learning mode, the system management device 13 invokes the learning device 14 to identify the parameter from the estimating device 17. At this time, the system management device 13 does not directly communicate with the estimating device 17. In the estimating mode, the system management device 13 directly communicates with the estimating device 17, transmits the time-series data, and receives a trend estimated value (a trend predicted value). The trend estimated value is provided for the client through the display/communication device 12, and the system management device 13 receives the feedback from the client. When the client is not satisfied with the estimation result, the system management device 13 activates the learning device 14 at the request from the client, and starts relearning the parameter from the estimating device 17. If the client requests to amend the learning standard or the scale of the CSSRNN 19, then the system management device 13 reserves the necessary computer resources, sets the initial value of the parameter, and invokes the learning device 14. Using the parameter updated by the learning device 14, the estimating device 17 drives the CSSRNN 19 to estimate necessary data. The newly estimated data is passed to the display/communication device 12 and provided for the client.

The important functions of the learning device 14 are supplied by the network learning device 16. The observing device 15 continuously collects the necessary number of samples, and is placed in the activation wait state except when the time-series data $S=\{x_1, \ldots, x_N\}$ required to learn the parameter is generated.

Figure 5:
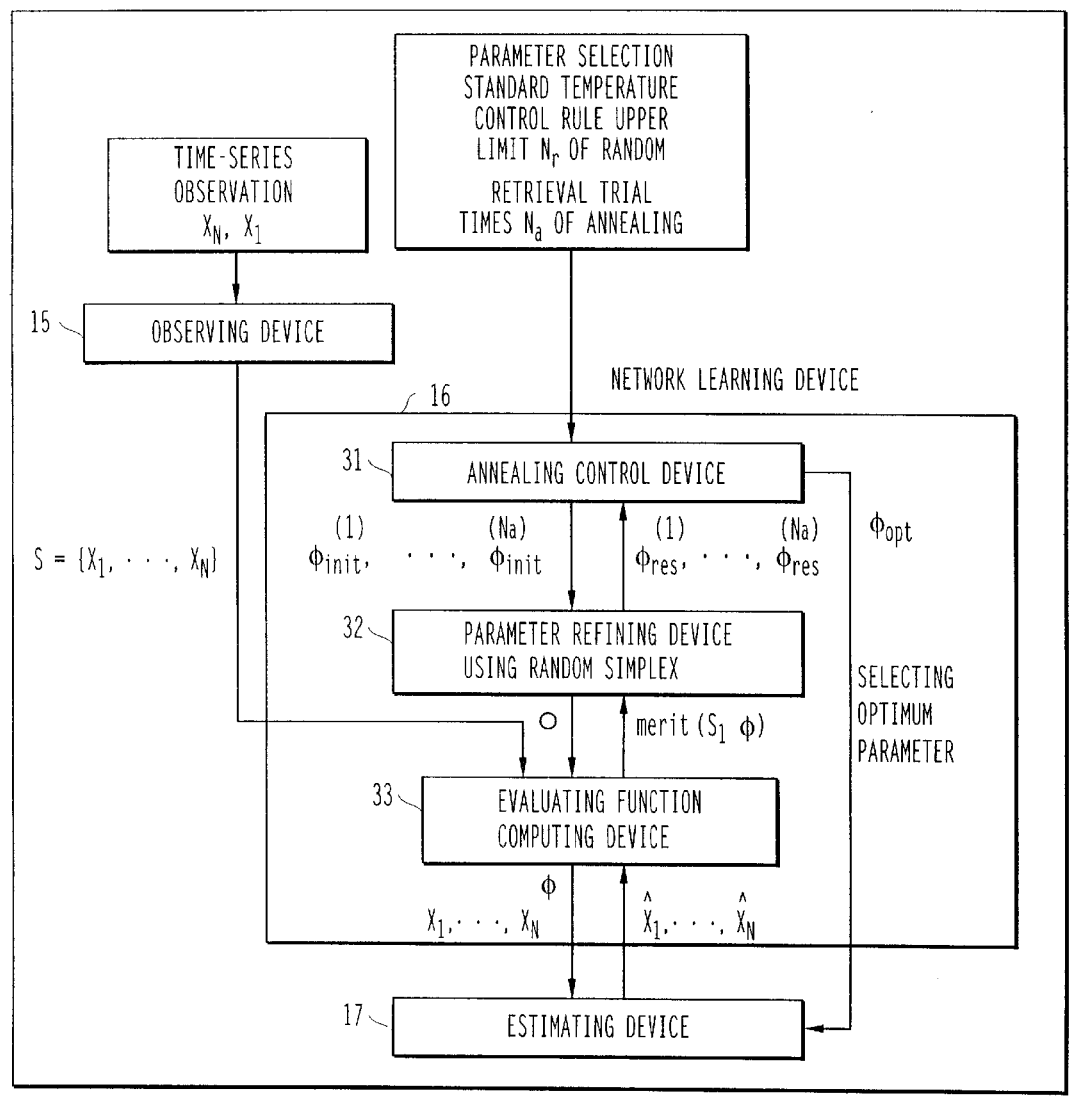
FIG. 5 shows the configuration of a network learning device.

FIG. 5 shows the configuration of the network learning device 16. The network learning device 16 shown in FIG. 5 comprises a simulated annealing control device 31; a parameter refining device 32 which uses a random simplex; and an evaluation function computing device 33. The network learning device 16 obtains, through learning, $\Phi=\Phi_{opt}$ which minimizes, for example, the following evaluation function as a parameter guaranteeing an appropriate operation of the estimating device 17.

$$\text{merit}(S \mid \Phi) = \frac{1}{2N} \sum_{i=1}^{N} (x_i - \hat{x}_i)^2 \quad (1)$$

In equation (1), an $\hat{x}_i$ is an estimated value received from the estimating device 17, and depends on the $\Phi$ provided by the CSSRNN 19. The network learning device 16 performs the learning process while communicating with the estimating device 17 through the evaluation function computing device 33.

The evaluation function computing device 33 receives the time-series data $\{x_1, \ldots, x_N\}$ and estimated value string $\{\hat{x}_1, \ldots, \hat{x}_N\}$, and computes and outputs the evaluation function merit (S|$\Phi$) obtained by equation (1). The $\{\hat{x}_1, \ldots, \hat{x}_N\}$ is obtained as being output when the $\Phi$ and $\{x_1, \ldots, x_N\}$ are input to the estimating device 17.

The simulated annealing control device 31 receives as control data from the system management device 13 a parameter selecting standard, an annealing temperature control rule, an upper limit value Nr indicating the number of random searches, and a number $N_a$ of annealing trials. According to these data, the annealing control device 31 controls the process of searching for the optimum parameter through simulated annealing. The annealing control device 31 generates the parameter set $\Phi^{(i)}_{init}$ (i=1, . . . , $N_a$) of $N_a$ initial values, and provides them for the parameter refining device 32 which uses a random simplex.

The parameter refining device 32 activates the evaluation function computing device 33 according to a received parameter set $\Phi$ as necessary, and receives the value of the merit (S|$\Phi$). The parameter refining device 32 refines the parameter set $\Phi$ by the locally optimizing method through a well-known descent simplex method. In each annealing trial, an initial value simplex comprising dim ($\Phi$)+1 points is generated from an initial value parameter set $\Phi^{(i)}_{init}$, and starts searching, where the dim ($\Phi$) indicates the number of independent variables in the parameter set.

Figure 6:
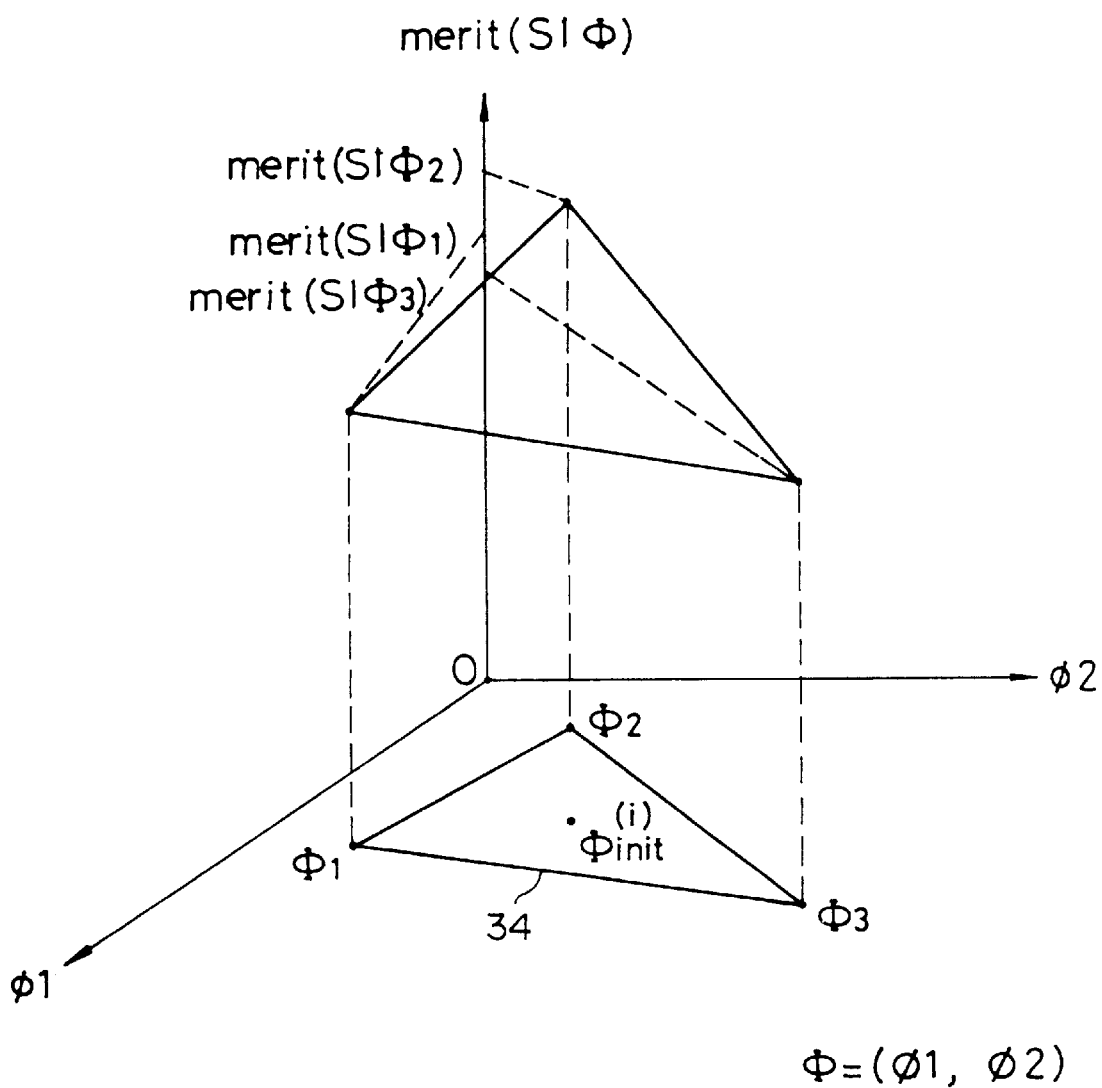
FIG. 6 shows the initial value simplex of a two-dimensional parameter set.

FIG. 6 shows an example of the initial simplex when dim ($\Phi$)=2. In FIG. 6, the parameter set $\Phi$ is represented as $\Phi=(\phi 1, \phi 2)$ using the two independent variables $\phi 1$ and $\phi 2$, and an optional point $\Phi^{(i)}_{init}$ on the plane $\phi 1 \phi 2$ is provided as an initial value. The parameter refining device 32 generates a triangular initial value simplex 34 having the vertices $\Phi_1$, $\Phi_2$, and $\Phi_3$ based on the point $\Phi^{(i)}_{init}$. When dim ($\Phi$)=3, the initial value simplex is a three-dimensional pattern having four vertices.

In each annealing trial, the parameter refining device 32 checks the largest (worst) point, second worst point, and best (smallest) point of the evaluation function values in the vertices of the simplex. With respect to the center of the gravity of the vertices except the worst-value point, a symmetric point (opposite point) of the worst-value point is obtained by symmetrically moving the worst-value point, and the opposite point is adopted instead of the worst point to generate a new simplex. If the value of the evaluation function at the opposite point is better than that at the best point, a point at double the distance from the center of gravity in the same direction as the opposite point is set as a new vertex. If the value of the opposite point is worse than the second worst value, the worst point is shifted one-dimensionally toward the center of gravity to set a new vertex. If no point better than the best point can be detected, the entire simplex is shrunk in the best-point direction. By repeating the above described processes, a direction in which the value of the evaluation function is decreased should be detected while varying the shape of the simplex. Thus, a point at which the smallest value is obtained is detected by finally reducing the size of the simplex.

Thus, in the descent simplex method, it is necessary to compute an evaluation function each time a simplex is updated. As described above, the computation is performed when the evaluation function computing device 33 communicates with the estimating device 17.

With merit (S|$\Phi_2$)>merit (S|$\Phi_1$)>merit (S|$\Phi_3$) in FIG. 6, the worst point is point $\Phi_2$. The parameter refining device 32 obtains the center of gravity of the remaining vertices $\Phi_1$ and $\Phi_3$ (in this example, the middle point of the line connecting $\Phi_1$ to $\Phi_3$) obtained by removing the point $\Phi_2$ from the initial value simplex 34. Then, with respect to the obtained center of gravity, a point symmetric to the point $\Phi_2$ is obtained in the plane $\phi 1$ $\phi 2$. The merit (S|$\Phi$) at the obtained point is computed and compared with the merit (S|$\Phi_1$) and merit (S|$\Phi_3$). If the value at the symmetric point is smaller than the merit (S|$_3$), then the next simplex is generated with a point further distant in the center-of-gravity direction set as a new vertex.

Furthermore, the parameter refining device 32 allows the simplex to walk at random in the search space according to the deviation depending on a given control temperature $T^{(j)}$ (j=1, 2, . . . , M) to search around the globally minimum value of the evaluation function. The number of times of random walks at each control temperature is $N_r$. During the computation, a candidate $\Phi^{(i)}_{res}$ (where i=1, . . . , $N_a$) for a parameter set which determines the globally minimum value of the evaluation function is obtained in each annealing trial.

The annealing control device 31 selects as the optimum parameter set $\Phi_{opt}$ the parameter set in which the value of the evaluation function is the smallest of all candidates. The network learning device 16 passes the optimum parameter set $\Phi_{opt}$ to the estimating device 17 and enters the activation wait state.

Figure 7:
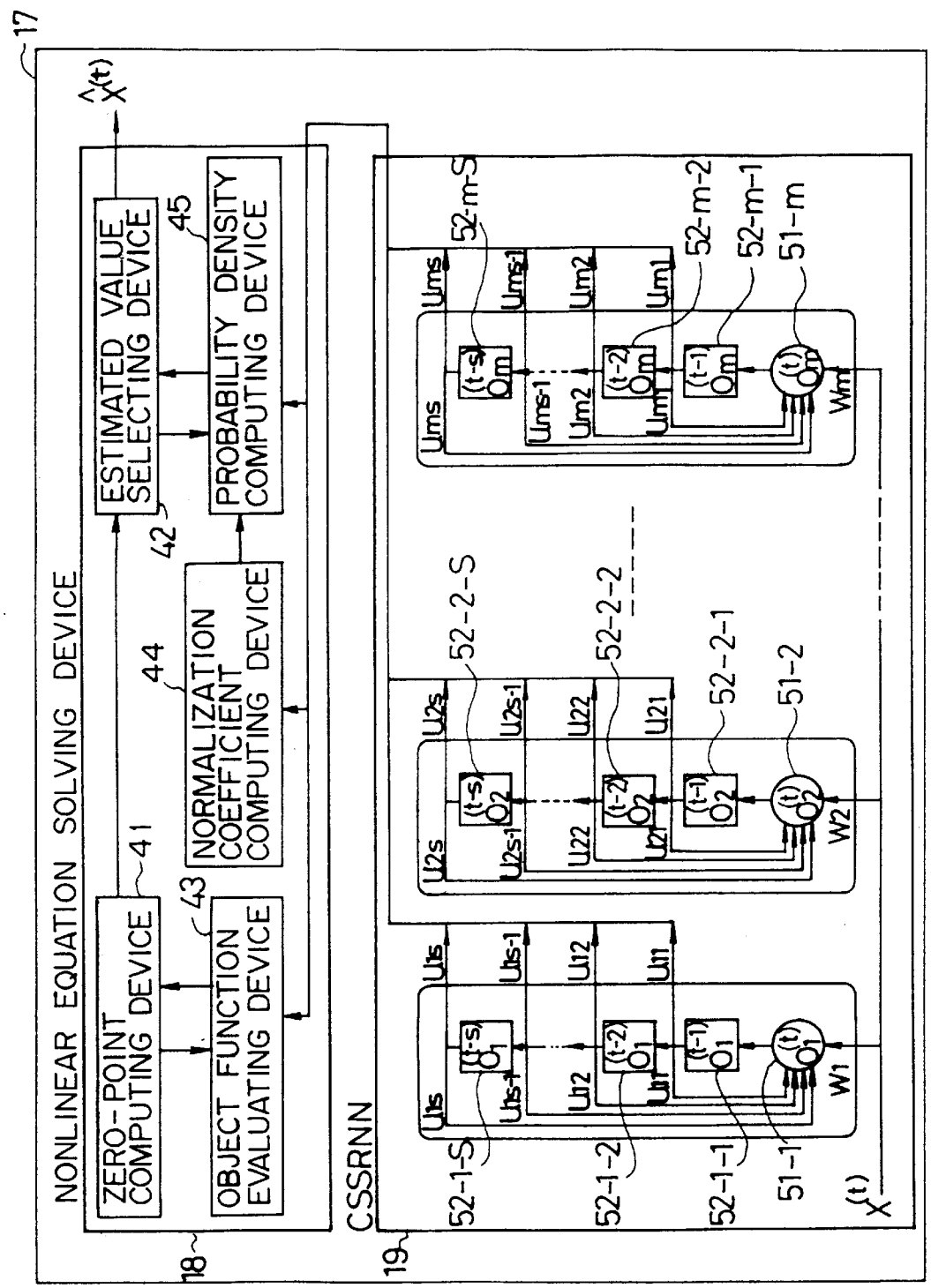
FIG. 7 shows the configuration of an estimating device.
Figure 17:
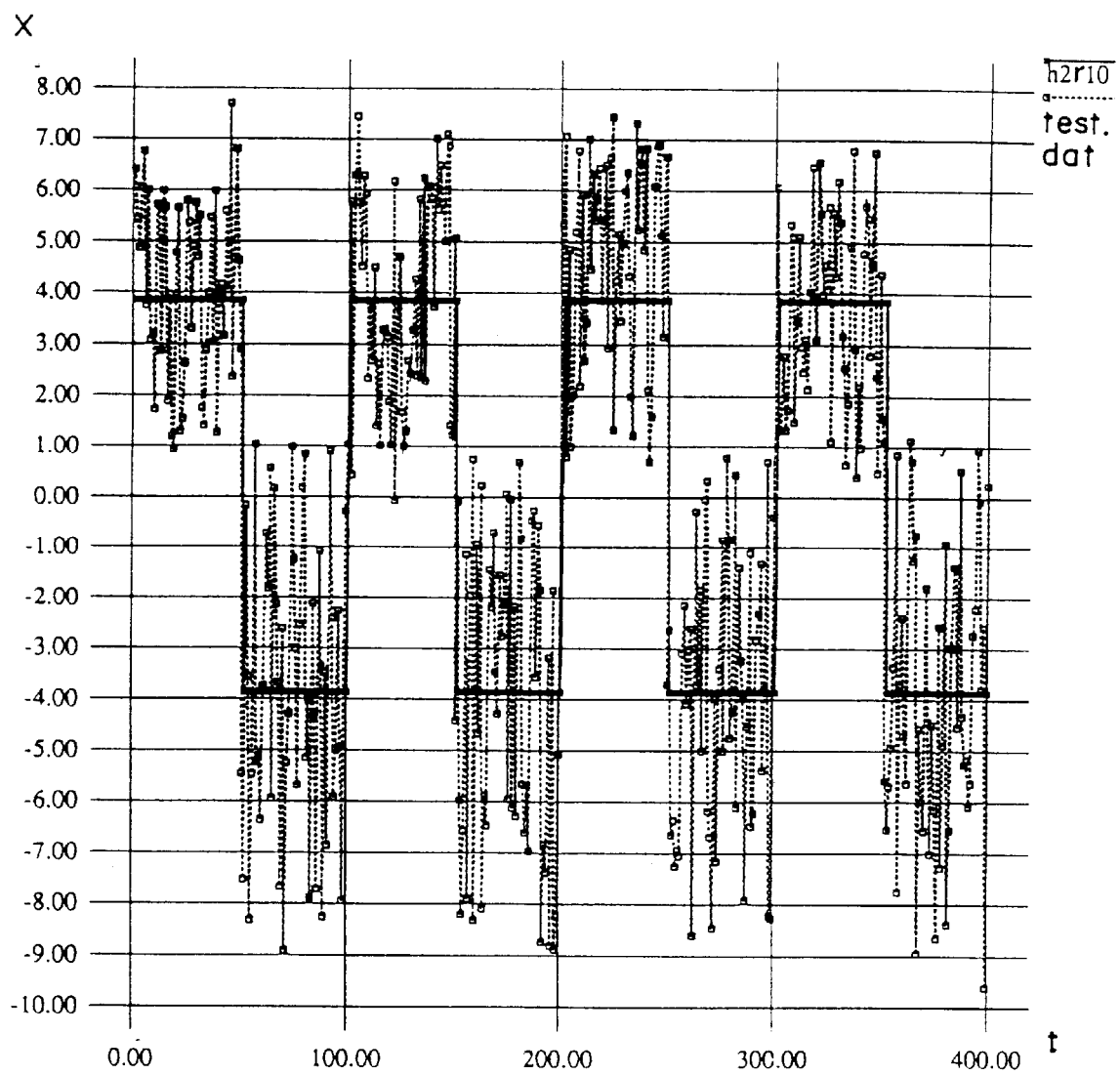
FIG. 17 shows an estimation result according to the h2r10 neural network.

FIG. 7 shows the configuration of the estimating device 17. In FIG. 17, the hidden element layer of the CSSRNN 19 comprises m hidden elements 51-1, 51-2, . . . , 51-$m$. Each hidden element has a neuron (neural element) shown in FIG. 8. No mutual connections are made between hidden elements. Each hidden element is assigned s registers for forming a context layer. For example, registers 52-1-1, 52-1-2, . . . , 52-1-$s$ are provided at the output terminal of the hidden element 51-1. Registers 52-2-1, 52-2-2, . . . , 52-2-$s$ are provided at the output terminal of the hidden element 51-2. Registers 52-$m$-1, 52-$m$-2, . . . , 52-$m$-$s$ are provided at the output terminal of the hidden element 51-$m$. One column is formed by a hidden element and corresponding registers. Assuming that the input for the hidden element at time t is $x^{(t)}$, the output of the j-th hidden element (j=1, . . . , m) at that time is computed as follows.

$$\begin{aligned} O_j^{(t)} &= \frac{1}{1 + e^{-\left(w_j x^{(t)} + \sum_{i=1}^{s} u_{ji} O_j^{(t-i)} + \theta_j\right)}} \quad (2)\\ &= LG\left(w_j x^{(t)} + \sum_{i=1}^{s} u_{ji} O_j^{(t-i)} + \theta_j\right)\\ &= LG\left(w_j x^{(t)} + \vec{u}_j \vec{O}_j^{(t,s)} + \theta_j\right) \end{aligned}$$

Figure 8:
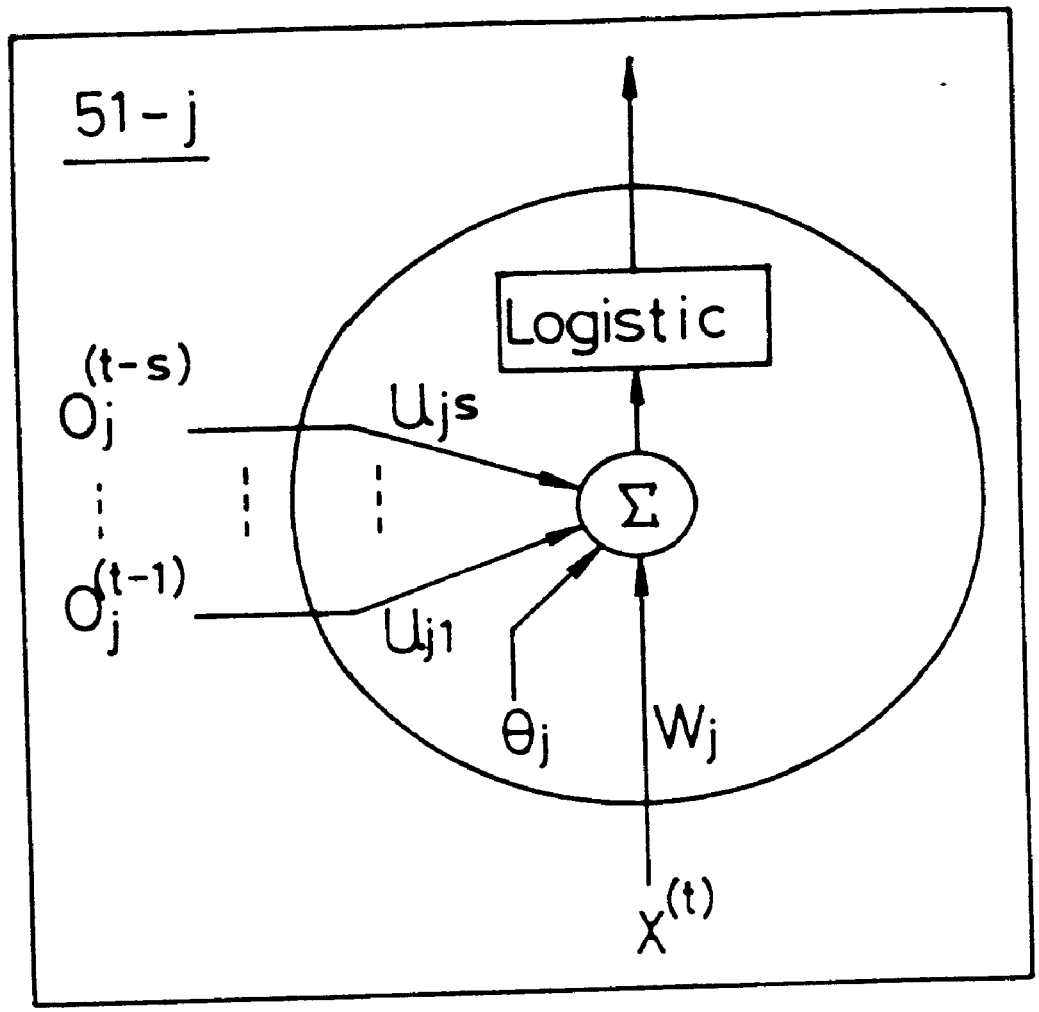
FIG. 8 shows a neural element.

The following definitions are established to simply represent the above equation.

$$LG(x) \stackrel{def}{=} \frac{1}{1+e^{-x}},$$

$$\vec{u}_j \stackrel{def}{=} (u_{j1}, \ldots, u_{js}),$$

$$\vec{O}_j^{(t,s)} \stackrel{def}{=} (O_j^{(t-1)}, \ldots, O_j^{(t-s)})$$

where the function LG(x) is commonly referred to as a logistic function and corresponds to the output function of the neuron shown in FIG. 8. The $w_j$ is the weight of the j-th hidden element corresponding to the input $x^{(t)}$. The $O_j^{(t-i)}$ is the output of the j-th hidden element at time t-i. The $\vec{O}_j^{(t,s)}$ (hereinafter represented as a vector $O_j^{(t,s)}$) refers to a vector having the values of s registers in the j-th column as its components. The $u_{ji}$ refers to the input weight of the j-th hidden element for the recurrent value from the i-th register. The $\vec{u}_j$ (hereinafter referred to as vector $u_j$) has the input weights as its components. The $\theta_j$ is a bias of the logistic function of the j-th hidden element, and is commonly referred to as a threshold. The parameter set of the CSSRNN 19 is represented as $\Phi=\{(w_j, \theta_j, \text{vector } u_j): (j=1, \ldots, m)\}$ using the above described notation. The dimension of the parameter set dim ($\Phi$) is (s+2)m.

$$\overline{O}^{(t,s)} \stackrel{def}{=} (\overline{O}_1^{(t,s)}, \ldots, \overline{O}_m^{(t,s)})$$

The $\overline{O}^{(t,s)}$ in the above equation is hereinafter referred to as an internal state of the CSSRNN 19 at time t. The internal state $\overline{O}^{(t,s)}$ is updated for each column. First, the output $O_j^{(t)}(j=1, \ldots, m)$ of each hidden element at time t is computed by equation (2). Next, the values $O_j^{(t-1)}, \ldots, O_j^{(t-s)}$ in the register is shifted, and $O_j^{(t)}$ is stored in the leading register 52-j-1. At this time, the output value $O_j^{(t-s)}$ in the register 52-j-s at the earliest time is discarded. The value in the register of each column is updated from $O_j^{(t-s)}, \ldots, O_j^{(t-s)}$ into $O_j^{(t)}, \ldots, O_j^{(t-s+1)}$. The internal state is updated by time t+1 in each column.

Using such a column structure allows the past output history of each hidden element of the CSSRNN 19 to recur to the hidden element in good time order, thereby ensuring the independence of the recurrent information of each column.

When a new observation value $x^{(t)}$ is input at time t=1, 2, ..., the CSSRNN 19 updates the state from $\overline{O}^{(t,s)}$ to $\overline{O}^{(t,s)}$. According to the internal state $\overline{O}^{(t,s)}$ of the network, the estimated density function of x at time t and the estimated value of x at time t (estimated value for the input at time t+1) can be computed. The estimated density function is derived from the energy function defined according to the internal state of the network. The energy function can be represented by applying a hidden variable $h_j \in \{0, 1\}$ (j=1, ..., m) to each hidden element, and by interpreting that the output of the hidden element equals the probability that the value of the hidden variable is 1. Since $h_j$ is a discrete value of 0 or 1, it can be referred to as a discrete variable. The estimated probability density function representing the probability density for $x^{(t)}$ is represented by a hidden variable $h_j$ as follows.

$$p(x^{(t)} \mid \Phi, \overline{O}^{(t,s)}) = \tag{3}$$

-continued $$\exp\left(-\frac{1}{2}|x^{(t)}|^2\right) \frac{1}{Z^{(t)}} \prod_{j=1}^{m} \left(1 + \exp\left(w_j x^{(t)} + \vec{u}_j \vec{O}_j^{(t,s)} + \theta_j\right)\right)$$

where $Z^{(t)}$ is a normalization coefficient obtained in the following equation (4) and varies with time.

$$Z^{(t)} = \sqrt{2\pi} \sum_{\vec{h}^{(s)} \in \{0,1\}^m} \exp\left(\sum_{j=1}^{m} h_j^{(t)}\left(\vec{u}_j \vec{O}_j^{(t,s)} + \theta_j\right) + \frac{1}{2}\left|\sum_{j=1}^{m} h_j^{(t)} w_j\right|^2\right) \tag{4}$$

The estimated probability density function in equation (3) is a combination of plural Gaussian probability density functions. For example, considering the CSSRNN 19 (m=1) comprising a single hidden element, the estimated probability density function is computed as follows using equation (3).

$$p(x^{(t)} \mid \Phi, \overline{O}^{(t,s)}) = \frac{1}{Z^{(t)}} \left[\exp\left(-\frac{1}{2}|x^{(t)}|^2\right) + \exp\left(-\frac{1}{2}|x^{(t)} - w_1|^2 + \frac{1}{2}|w_1|^2 + \sum_{k=1}^{s} u_{1k} O_1^{(t-k)} + \theta_1\right)\right] \tag{5}$$

The estimated probability density function in equation (5) is a composite function of two Gaussian density functions. In this case, the weight for the first Gaussian density function indicating its peak at $x^{(t)}=0$ is $1/Z^{(t)}$ while the weight for the second Gaussian density function indicating its peak at $x^{(t)}=w_1$ is represented as follows.

$$\frac{1}{Z^{(t)}} \exp\left(\frac{1}{2}|w_1|^2 + \sum_{k=1}^{s} u_{1k} O_1^{(t-k)} + \theta_1\right)$$

Likewise, the probability density function represented by the CSSRNN 19 comprising m hidden elements is a composition of $2^m$ Gaussian density functions. The weight of the composition for each Gaussian density function is represented as follows.

$$\sum_{k=1}^{s} u_{jk} O_j^{(t-k)}$$

Since the value $O_j^{(t-k)}$ depends on the input $x^{(t-1)}, \ldots, x^{(1)}$ according to equation (2) and the definition of vector $O_j^{(t,s)}$, the weight of the composition varies with the variations of the input $x^{(t-1)}, \ldots, x^{(1)}$. This indicates that a change in form of an estimated probability density function is made by a preceding input, thereby successfully estimating a discontinuous trend.

A nonlinear equation required to estimate a trend is obtained by the differentiation of an estimated probability density function as follows.

$$x^{(t)} = \sum_{j=1}^{m} \frac{w_j}{1 + \exp\left(-\left(w_j x^{(t)} + \vec{u}_j \vec{O}_j^{(t,s)} + \theta_j\right)\right)} \tag{6}$$

The method of deriving equations (3) and (6) is described later in detail.

The nonlinear equation solving device 18 shown in FIG. 7 computes the distribution of an estimated probability density function and an estimated value. The nonlinear equation solving device 18 comprises a zero-point computing device 41 for obtaining the zero point of an object function; an estimated value selecting device 42; an object function evaluating device 43; a normalization coefficient computing device 44; and a probability density computing device 45.

According to equation (6), the object function TG(x) is computed as follows.

$$TG(x) \stackrel{def}{=} x - \sum_{j=1}^{m} \frac{w_j}{1 + \exp\left(-\left(w_j x + \vec{u}_j \vec{O}_j^{(t,s)} + \theta_j\right)\right)} \quad (7)$$

The value of x for TG(x)=0 is a solution to equation (6), and corresponds to the value to obtain the maximum value of the estimated probability density in equation (3). The zero-point computing device 41 repeats the segmentation and simple enclosure method to approximately identify the value $x^1_{peak}, \ldots, x^k_{peak}$ for obtaining the zero-point of an object function. At this time, a variable x is provided for the object function evaluating device 43 as necessary to compute the value of TG(x) in equation (7).

The estimated value selecting device 42 selects a variable deriving the maximum value in the variables $x^1_{peak}, \ldots, x^k_{peak}$ deriving the maximum value of the estimated probability density function. At this time, the estimated value selecting device 42 obtains a probability density function $v^1_{peak}, \ldots, v^k_{peak}$ for a candidate $x^1_{peak}, \ldots, x^k_{peak}$ for an estimated value by communicating with the probability density computing device 45. Using these values in a high-speed sorting method, the value $x_{max}$ deriving the maximum value of a probability density function is obtained. When there are a small number of candidates for an estimated value, the estimated value can be selected by simply comparing the probability density functions with each other. If the probability density indicates the maximum values for two different variables, one of them is selected as the $x_{max}$ in consideration of the probability based on a uniform probability distribution about the variables. The selected variable $x_{max}$ is output as an estimated value $x^{(t)}$ for the next input.

The configurations and operations of the object function evaluating device 43, normalization coefficient computing device 44, and probability density computing device 45 are closely related to the internal state of the CSSRNN 19. Each of the three devices is described below in detail by referring to FIGS. 9 through 11.

Figure 9:
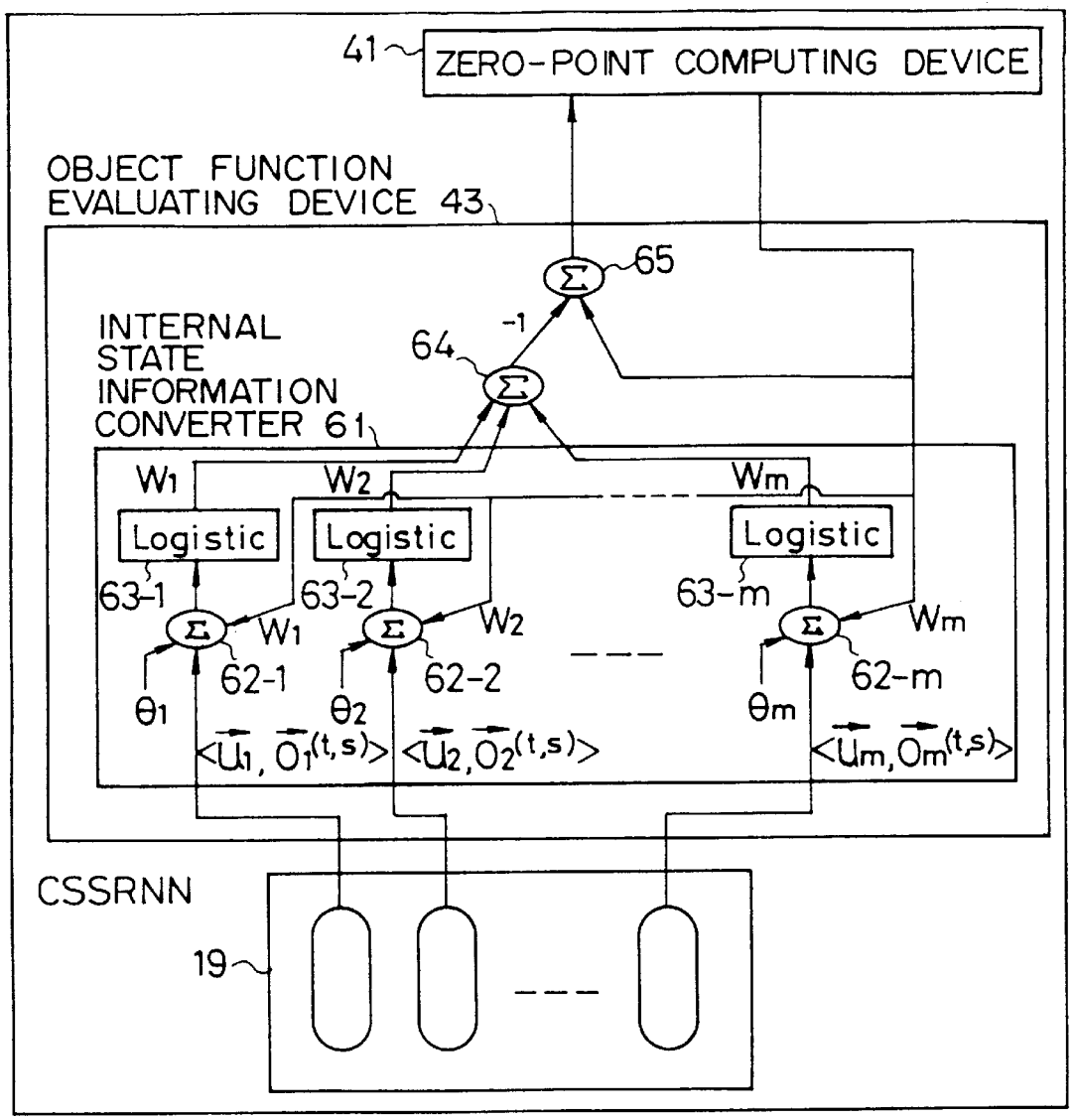
FIG. 9 shows the configuration of an object function evaluating device.

FIG. 9 shows the configuration of the object function evaluating device 43. The object function evaluating device 43 processes as input data the {vector $u_j$, vector $O_j^{(t,s)}$} (j=1, ..., m) from the CSSRNN 19 and the variable x from the zero-point device, and then computes the TG(x). To attain this, the object function evaluating device 43 comprises an internal state information converter 61 having the column configuration corresponding to the CSSRNN 19; and adders (Σ) 64 and 65. The internal state information converter 61 comprises adders 62-1, 62-2, ..., 62-m and logistic function operating units 63-1, 63-2, ..., 63-m. Each adder 62-j and logistic function operating unit 63-j form the j-th column. In FIG. 9, a variable or a constant shown on each data path indicated by an arrow refer to multiplying its value by the data on the path. The values of the data propagated through the paths not indicated by any symbols do not vary during the propagation.

Each adder 62-j multiplies the input x by a predetermined weight coefficient $w_j$, adds the threshold $\theta_j$ and the inner product of the vectors (vector $u_j$·vector $O_j^{(t,s)}$) to the obtained product, and enters the result in the logistic function operating unit 63-j. The logistic function operating unit 63-j computes the LG($y_j$) from the entered value $y_j$. The internal state information converter 61 outputs the product obtained by multiplying $w_j$ by the output LG($y_j$) (j=1, ..., m). Then, the adder 64 obtains the sum of m outputs from the internal state information converter 61. The adder 65 subtracts the output of the adder 64 from the variable x input through the zero-point computing device 41, and sets the balance as an output from the object function evaluating device 43.

FIG. 10 shows the configuration of the normalization coefficient computing device 44. The normalization coefficient computing device 44 computes the value $Z^{(t)}$ in equation (4), and comprises an internal state information converter 71 having a column structure corresponding to that of the CSSRNN 19; a binary vector generator 73; a vector multiplier 74; a vector adder 75; a norm calculator 76; an adder 77; an exponential function computer 78; an accumulative adder 79; and a reciprocal operator 80. The binary vector generator 73, vector multiplier 74, and vector adder 75 performs operations related to the hidden variables $h_1, \ldots, h_m$ assigned to the hidden elements of the CSSRNN 19. The binary vector generator 73 generates all of $2^m$ possible vectors $h_i$ (i=1, ..., $2^m$) with m hidden variables $h_1, \ldots, h_m$ equivalent to 0 or 1 set as components of one hidden variable vector $h_i$ (hereinafter referred to as a vector $h_i$). The binary vector generator 73 manages the flow of a series of operations for equation (4).

The internal state information converter 71 comprises adders 72-1, 72-2, ..., 72-m, and each adder 72-j forms the j-th column. Each adder 72-j adds a threshold $\theta_j$ to an inner product (vector $u_j$·vector $O_j^{(t,s)}$) and outputs the sum. The output from the internal state information converter 71 is a vector such as (vector $u_1$·vector $O_1^{(t,s)}$+$\theta_1$, ..., vector $u_m$·vector $O_m^{(t,s)}$+$\theta_m$). When the normalization coefficient computing device 44 once invokes the internal state information converter 71, the internal state information converter 71 is once activated and outputs the information about the internal state of the CSSRNN 19. The output result is stored as an input of the vector multiplier 74. The vector multiplier 74 receives the hidden variable vector $h_i$ (i=1, ..., $2^m$) and a vector of the internal state information of the CSSRNN 19, computes and output their inner product in the following form.

$$\sum_{j=1}^{m} h_{ij}\left(\vec{u}_j \vec{O}_j^{(t,s)} + \theta_j\right)$$

where each hidden variable vector is represented as vector $h_i$=($h_{i1}, \ldots, h_{ij}, \ldots, h_{im}$). The vector adder 75 performs a computation by the following equation (8) using the input weight coefficient $w_1, \ldots, w_m$ of the CSSRNN 19 and each hidden variable vector $h_i$ (i=1, ..., $2^m$).

$$\sum_{j=1}^{m} h_{ij} w_j \quad (8)$$

The norm calculator 76 calculates a square of the norm (absolute value) of the expression (8), multiplies the result by ½, thereby performs the computation of the following expression.

$$\frac{1}{2}\left|\sum_{j=1}^{n} h_{ij} w_j\right|^2$$

The result is added by the adder 77 to an output value from the vector multiplier 74, and input to the exponential function computer 78. The exponential function computer 78 performs the computation of the following expression.

$$\exp\left(\sum_{j=1}^{m} h_{ij}\left(\vec{u}_j \vec{O}_j^{(t,s)} + \theta_j\right) + \frac{1}{2}\left|\sum_{j=1}^{m} h_{ij} w_j\right|^2\right)$$

It passes the computation result to the accumulative adder 79. The above described operations are repeated for $2^m$ hidden variable vectors $h_i$ to calculate the sum with respect to the vectors $h^{(t)}$ on the right side of equation (4). The accumulative adder 79 obtains the sum for all hidden variable vectors. The reciprocal operator 80 multiplies the output from the accumulative adder 79 by $(2\pi)^{1/2}$ and obtains the reciprocal of the multiplication result. Finally, the normalization coefficient computing device 44 outputs the reciprocal of the value $Z^{(t)}$ in equation (4).

Figure 11:
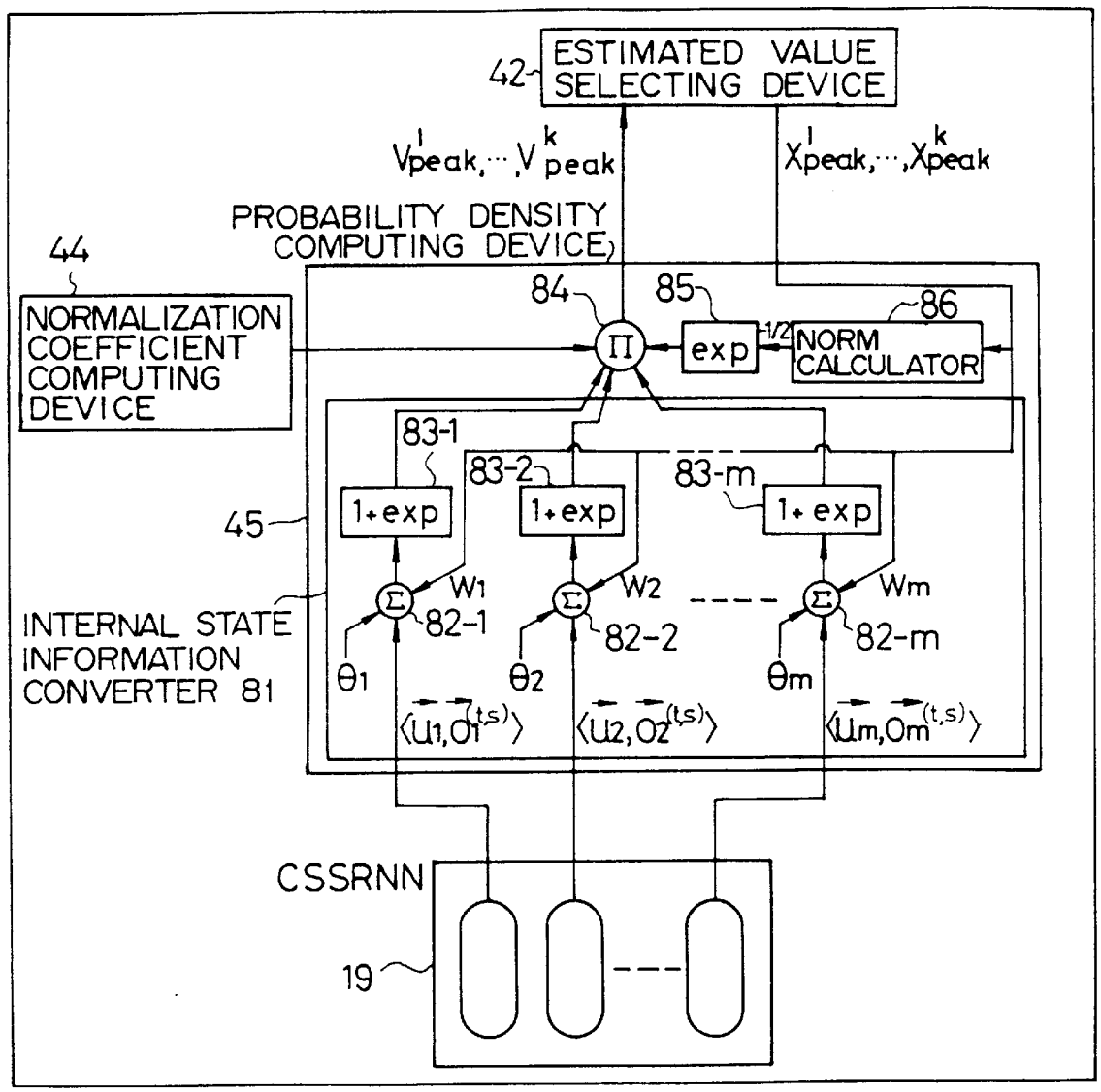
FIG. 11 shows the configuration of a probability density computing device.

FIG. 11 shows the configuration of the probability density computing device 45. At time t, the probability density computing device 45 receives from the estimated value selecting device 42 the candidates $x=x^1_{peak}, \ldots, x^k_{peak}$ for an estimated value, and outputs the values $v^1_{peak}, \ldots, v^k_{peak}$ of the estimated probability density function at time t for the received values. The estimated probability density function at time t is provided by equation (3). The probability density computing device 45 comprises an internal state information converter 81 having the column structure corresponding to that of the CSSRNN 19; a multiplier (II) 84; an exponential function computer 85; and a norm calculator 86. The internal state information converter 81 comprises adders 82-1, 82-2, . . . , 82-m, and exponential function computers (1+exp) 83-1, 83-2, . . . , 83-m. The adder 82-j and exponential function computer 83-j form the j-th column.

The adder 82-j obtains $w_j$x+vector $u_j$·vector $O_j^{(t,s)}+\theta_j$ from the input value x from the estimated value selecting device 42, the input weight coefficient $w_j$ of the CSSRNN 19, the threshold $\theta_j$, and the inner product (vector $u_j$·vector $O_j^{(t,s)}$), that is, the internal information of the j-th column of the CSSRNN 19. The exponential function computer 83-j computes the value of 1+exp ($w_j$x+vector $u_j$·vector $O_j^{(t,s)}+\theta_j$) from the output of the adder 82-j. The norm calculator 86 calculates a square of the norm of the input value x. Using the result, the exponential function computer 85 obtains the value exp $(-|x|^2/2)$ of the density function of the distribution N (0,1) of the input x. The multiplier 84 accumulates the outputs from m exponential function computers of the internal state information converter 81, and further accumulates the $1/Z^{(t)}$ received from the normalization coefficient computing device 44 and the normal distribution density function value exp $(-|x|^2/2)$ received from the exponential function computer 85. Here, N (0,1) indicates the normal distribution of a mean value 0 and variance 1. Thus, the values $x^1_{peak}, \ldots, x^k_{peak}$ are substituted for $x^{(t)}$ in equation (3) and obtains the values $v^1_{peak}, \ldots, v^k_{peak}$ of p $(x^{(t)}|\Phi, O^{(t,s)})$, and the results are output to the estimated value selecting device 42.

In the above described embodiment, the evaluation function merit $(S|\Phi)$ computed by the evaluation function computing device 33 does not always have to be an average square error in the form of equation (1). For example, it can be the logarithm likelihood of an estimated probability density function determined by time-series data and the internal state of the CSSRNN. In this case, the evaluation function is represented as follows.

$$\text{merit}(S|\Phi) = -\sum_{t=1}^{N} \log p(x^{(t)}|\Phi, \overline{O}^{(t,s)}) \qquad (9)$$

$$= \frac{1}{2}\sum_{t=1}^{N} |x(t)|^2 + \sum_{t=1}^{N} \log Z^{(t)} - $$

$$\sum_{t=1}^{N} \log\left(1 + e^{\left(w_j x^{(t)} + \vec{u}_j \vec{O}_j^{(t,s)} + \theta_j\right)}\right)$$

In the network learning device 16 shown in FIG. 5 operated by the random simplex method and simulated annealing method, the basic operations of a learning algorithm remain unchanged even if the evaluation function is replaced as represented by equation (9).

Otherwise, $y=(x-m)/\sigma$ is applied to the time-series data x to use a model in which a mean value can be processed in a parallel translation and distribution can be modified. In this case, the number of bases and distribution should be traded off and the distribution should be estimated, but these processes can be easily performed.

Furthermore, according to the present embodiment, a change trend is estimated for one-dimensional input data, and the estimation can be extended for multiple-dimensional data without changing a model interpreting method, etc.

Described below is the method of deriving equations (3) and (6). A general example is a CSSRNN comprising m hidden elements and s registers for each hidden element. Data is input as d-dimensional data. At this time, the input weight variable is also d-dimensional data. The value of 'd' is 1 in equations (3) and (6).

The probability variable $h_j \in \{0, 1\}$ (j=1, . . . , m) is allotted to each hidden element of the CSSRNN. It is referred to as a hidden variable, and represented by vector h=($h_1, \ldots, h_m$). A combination of the d-dimensional input $\vec{x}^{(t)}$ (hereinafter referred to as vector $x^{(t)}$ of the CSSRNN and the hidden variable vector $h^{(t)}$ at time t is referred to as the state of a time-series analysis system (vector $x^{(t)}$, vector $h^{(t)}$). Using the internal state $\overline{O}^{(t,s)}$ of the CSSRNN and the parameter set $\Phi$, the energy function of the state (vector $x^{(t)}$, vector $h^{(t)}$) is defined by the following equation.

$$E_t\left(\vec{x}^{(t)}, h^{(t)}|\Phi, \overline{O}^{(t,s)}\right) \stackrel{def}{=} -\sum_{i=1}^{m}\left(\vec{w}_j\vec{x}^{(t)} + \vec{u}_j\vec{O}_j^{(t,s)} + \theta_j\right)h_j^{(t)} + \frac{1}{2}\|\vec{x}^{(t)}\|^2 \qquad (10)$$

Using the energy function, the conditional probability of the state (vector $x^{(t)}$, vector $h^{(t)}$) is defined by the following equation (11).

$$p\left(\vec{x}^{(t)}, \vec{h}^{(t)}|\Phi, \overline{O}^{(t,s)}\right) \stackrel{def}{=} \frac{1}{Z^{(t)}} e^{-E_t\left(\vec{x}^{(t)} \vec{h}^{(t)}|\Phi, \overline{O}^{(t,s)}\right)}, \qquad (11)$$

where, $$Z^{(t)} = \int_{\vec{x}^{(t)}} \left( \sum_{\vec{h}^{(t)} \in \{0,1\}^m} e^{-E_t\left(\vec{x}^{(t)}, \vec{h}^{(t)} | \Phi, \overline{O}^{(t,s)}\right)} \right) d\vec{x}^{(t)} \quad 5$$

Using the conditional probability in equation (11), respective conditional probabilities are derived for vector $x^{(t)}$ and vector $h^{(t)}$. First, the sum is obtained over all possible values of hidden variable vector $h^{(t)}$, and the vector $h^{(t)}$ is removed from equation (11). Then, the following equation is set.

$$p(\vec{x}^{(t)} | \Phi, \overline{O}^{(t,s)}) = \sum_{\vec{h}^{(t)} \in \{0,1\}^m} p(\vec{x}^{(t)}, \vec{h}^{(t)} | \Phi, \overline{O}^{(t,s)}) \quad (12)$$

$$= \exp\left(-\frac{1}{2}\|\vec{x}^{(t)}\|^2\right) \frac{1}{Z^{(t)}} \prod_{j=1}^{m} \left(1 + \exp\left(\vec{w}_j \vec{x}^{(t)} + \vec{u}_j \vec{O}_j^{(t,s)} + \theta_j\right)\right)$$

When d is set to be 1 in equation (12), equation (3) is obtained. When equation (11) is integrated over the vector $x^{(t)}$ to remove it, the following equation (13) is established.

$$P(\vec{h}^{(t)} | \Phi, \overline{O}^{(t,s)}) = \int_{\vec{x}^{(t)}} p(\vec{x}^{(t)}, \vec{h}^{(t)} | \Phi, \overline{O}^{(t,s)}) d\vec{x}^{(t)} \quad (13)$$

$$= \frac{\exp\left(\sum_{j=1}^{m} h_j^{(t)}\left(\vec{u}_j \vec{O}_j^{(t,s)} + \theta_j\right) + \frac{1}{2}\left\|\sum_{j=1}^{m} h_j^{(t)} \vec{w}_j\right\|^2\right)}{\sum_{\vec{h}^{(t)} \in \{0,1\}^m} \exp\left(\sum_{j=1}^{m} h_j^{(t)}\left(\vec{u}_j \vec{O}_j^{(t,s)} + \theta_j\right) + \frac{1}{2}\left\|\sum_{j=1}^{m} h_j^{(t)} \vec{w}_j\right\|^2\right)}$$

where $h_j^{(t)}$ indicates the j-th component of the vector $h^{(t)}$.

Next, according to the Bayes' Law, the conditional probability is obtained by equations (11) and (12).

$$p(\vec{h}^{(t)} | \Phi, \overline{O}^{(t,s)}, \vec{x}^{(t)}) = \frac{p(\vec{x}^{(t)}, \vec{h}^{(t)} | \Phi, \overline{O}^{(t,s)})}{p(\vec{x}^{(t)} | \Phi, \overline{O}^{(t,s)})} \quad (14)$$

$$= \prod_{j=1}^{m} \frac{e^{\left(\vec{w}_j \vec{x}^{(t)} + \vec{u}_j \vec{O}_j^{(t,s)} + \theta_j\right) h_j^{(t)}}}{1 + e^{\left(\vec{w}_j \vec{x}^{(t)} + \vec{u}_j \vec{O}_j^{(t,s)} + \theta_j\right)}}$$

$$= \prod_{j=1}^{m} p(h_j^{(t)} | \Phi, \overline{O}^{(t,s)}, \vec{x}^{(t)})$$

where $$p(h_j^{(t)} | \Phi, \overline{O}^{(t,s)}, \vec{x}^{(t)}) = \frac{e^{\left(\vec{w}_j \vec{x}^{(t)} + \vec{u}_j \vec{O}_j^{(t,s)} + \theta_j\right) h_j^{(t)}}}{1 + e^{\left(\vec{w}_j \vec{x}^{(t)} + \vec{u}_j \vec{O}_j^{(t,s)} + \theta_j\right)}} \quad (15)$$

In the final expression in the right side of equation (14), the probabilities for m hidden variables form a product. Therefore, the independence of each hidden variable can be clearly assumed. Using equation (15), the following equation (16) is derived.

$$p(h_j^{(t)} = 1 | \Phi, \overline{O}^{(t,s)}, \vec{x}^{(t)}) = 1 - p(h_j^{(t)} = 0 | \Phi, \overline{O}^{(t,s)}, \vec{x}^{(t)}) \quad (16)$$

$$= \frac{1}{1 + \exp\left(-\left(\vec{w}_j \vec{x}^{(t)} + \vec{u}_j \vec{O}_j^{(t,s)} + \theta_j\right)\right)}$$

The right side of equation (16) represents the output of the j-th hidden element for the input vector $x^{(t)}$. Simultaneously, it indicates the conditional probability in which the hidden variable $h_j^{(t)}$ is 1. Actually, when the input vector $x^{(t)}$ is one-dimensional data, the right side of equation (16) matches the right side of equation (2). At this time, the $O_j^{(t)}$ in equation (2) indicates the probability density of the time-series data $x^{(t)}$ corresponding to $h_j^{(t)}=1$. Through equation (16), the interpretation of the internal state of the CSSRNN and the relationship between the state and the time-series data are clarified. The assumption of the independence of each hidden variable in equation (14) corresponds to that information is not exchanged between the columns of the CSSRNN.

Assume that the optimum parameter set has been detected through learning. At this time, the estimating device 17 estimates the time t using the estimated probability density function p (vector $x^{(t)}|\Phi, \overline{O}^{(t,s)}$). Practically, a value for the peak of the probability density function is selected as an estimated value for the most probable vector $x^{(t)}$. Thus, the vector $x^{(t)}$ that satisfies the following differential equation (17) is defined as an estimated value.

$$\frac{d p(\vec{x}^{(t)} | \Phi, \overline{O}^{(t,s)})}{d x^{(t)}} = 0 \quad (17)$$

Equation (17) ie equivalent to equation (18).

$$\frac{d \ln p(x^{(t)} | \Phi, \overline{O}^{(t,s)})}{d x^{(t)}} = 0 \quad (18)$$

where p (vector $x^{(t)}|\Phi, \overline{O}^{(t,s)}$) in equation (12) is substituted in equation (18) to obtain the following nonlinear equation (19) as an estimating equation.

$$\vec{x}^{(t)} = \sum_{j=1}^{m} \vec{w}_j LG\left(\vec{w}_j \vec{x}^{(t)} + \vec{u}_j \vec{O}_j^{(t,s)} + \theta_j\right) \quad (19)$$

When the input vector $x^{(t)}$ is one-dimensional data, equation (19) is equivalent to equation (6).

Figure 12:
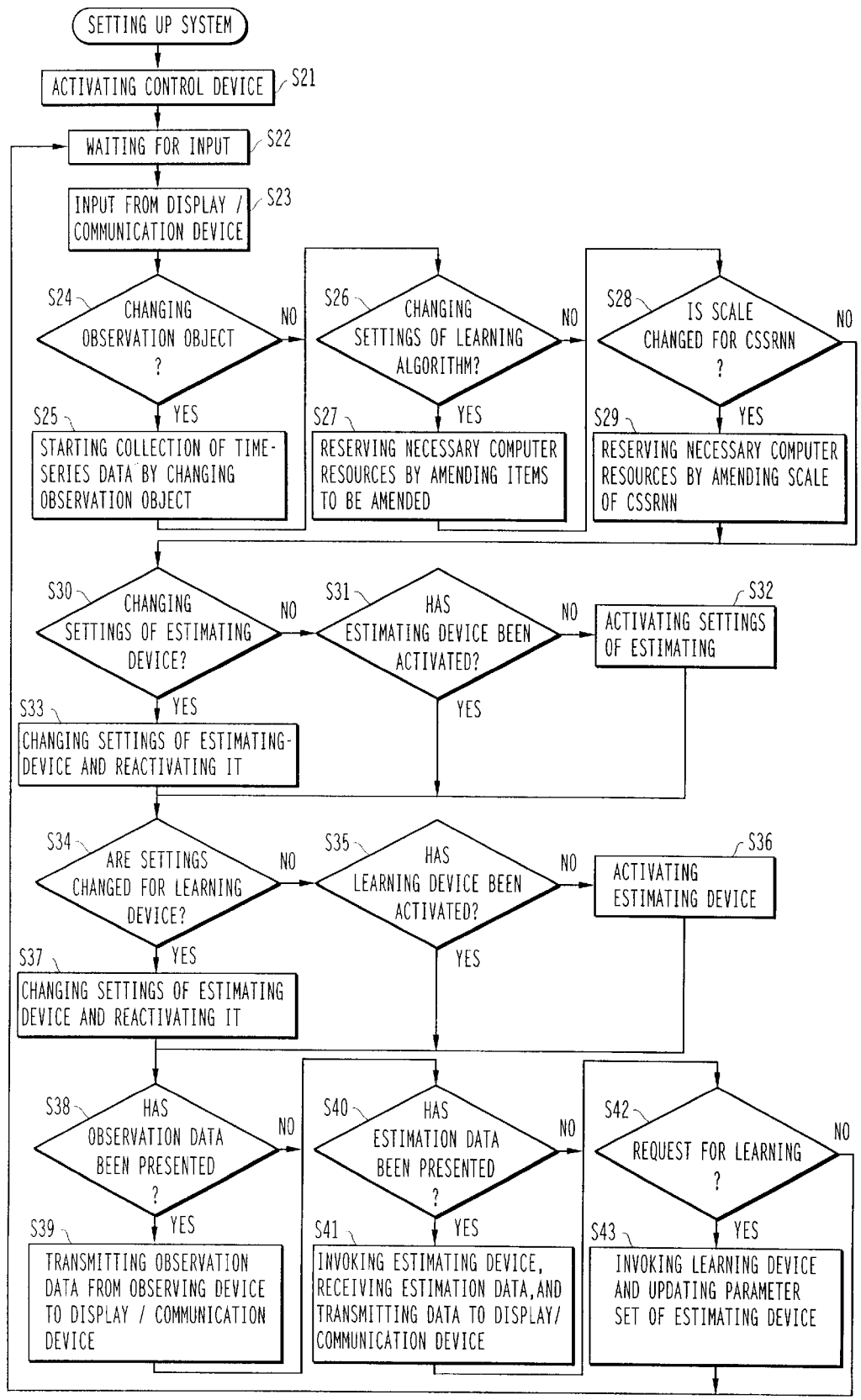
FIG. 12 is a flowchart showing the processes performed by a trend estimating system.
Figure 13:
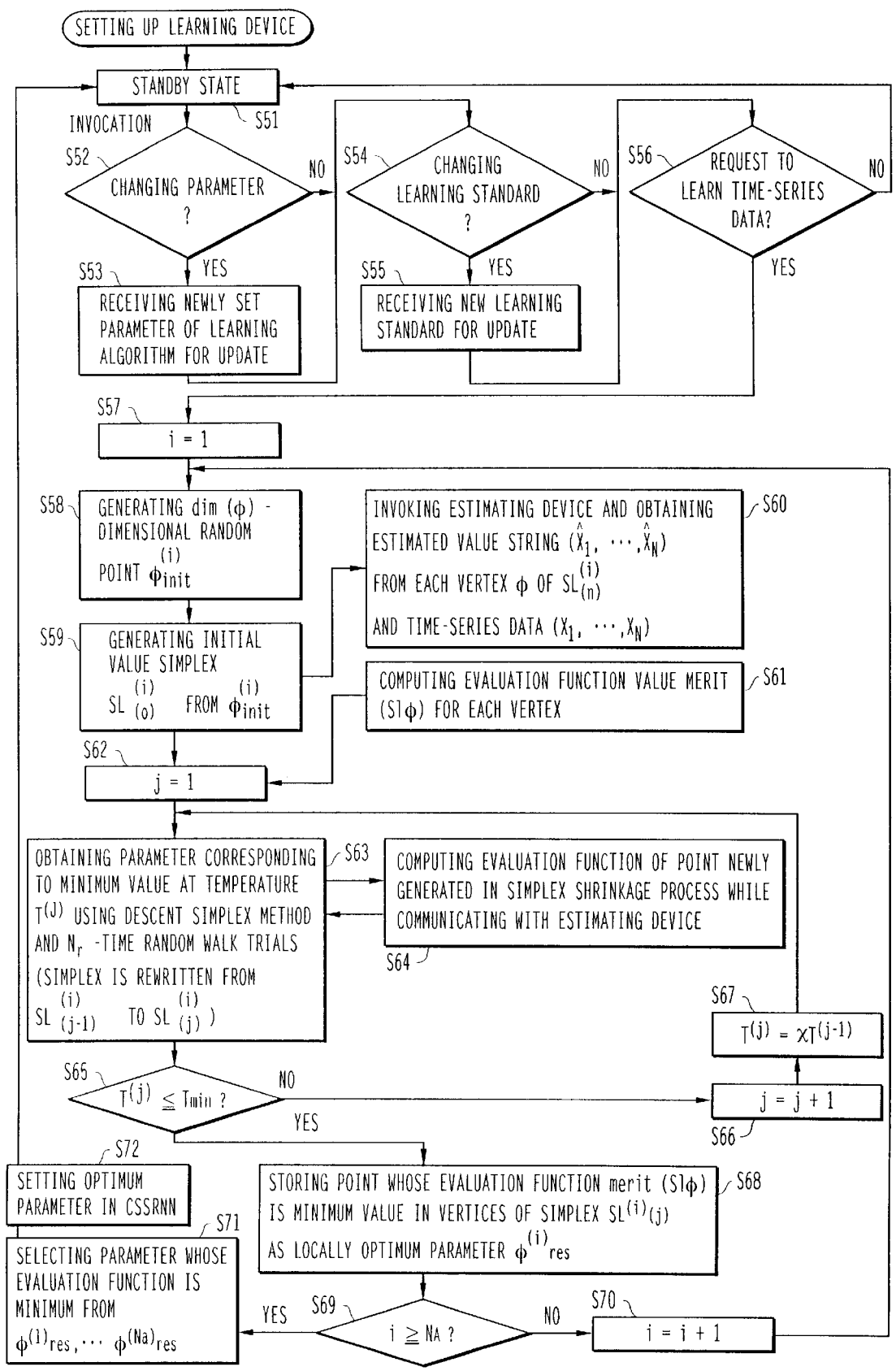
FIG. 13 is a flowchart showing the processes performed by a learning device.
Figure 14:
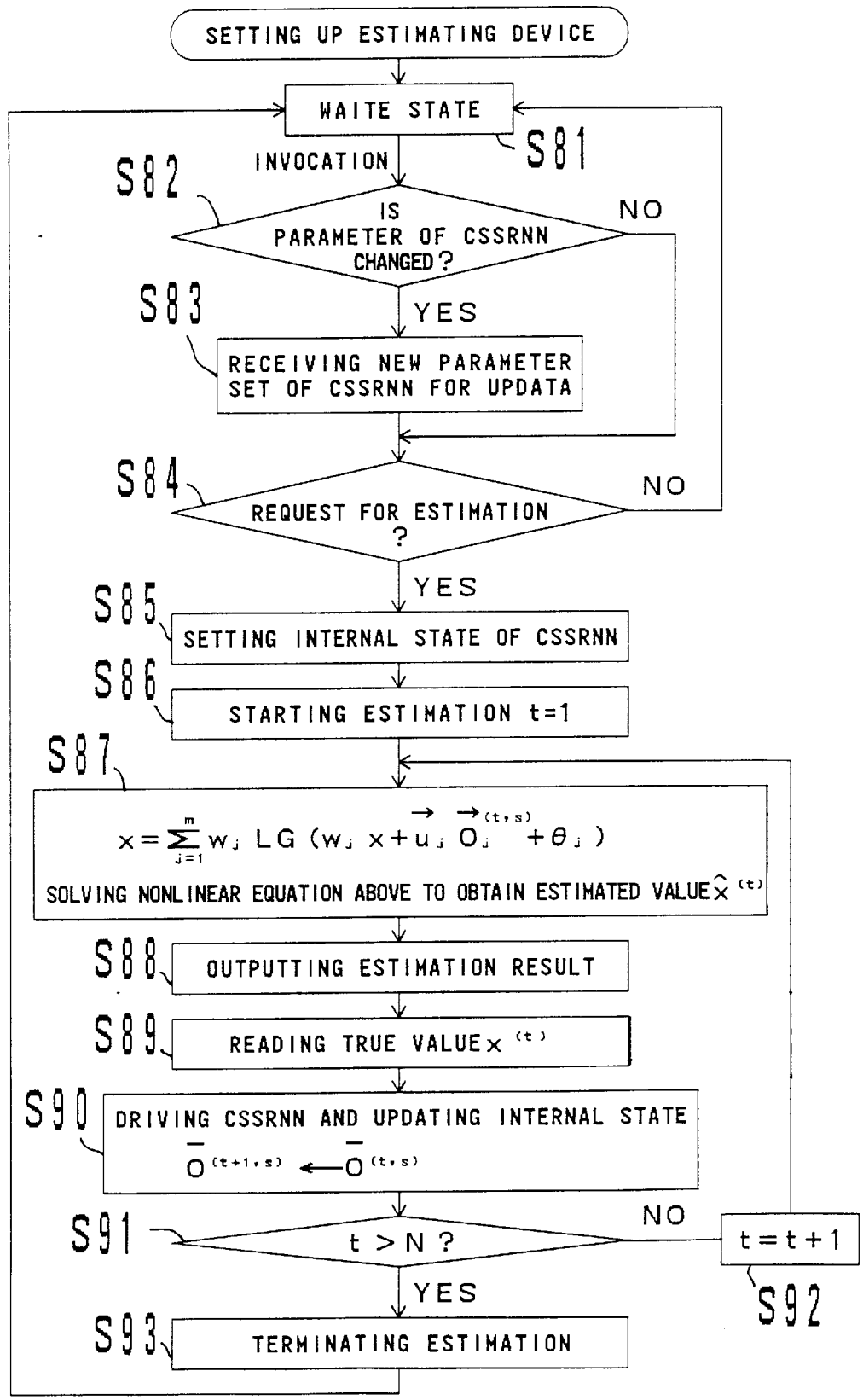
FIG. 14 is a flowchart showing the processes performed by an estimating device.

Next, the flow of the operations of the time-series trend estimating system shown in FIG. 3 is described by referring to FIGS. 12 through 14.

FIG. 12 is a flowchart showing the entire processes performed by the time-series trend estimating system. When the system is set up as shown in FIG. 12, the control device 11 is activated according to predetermined initial values (step S21). The display/communication device 12 and system management device 13 are set in the input wait state (step S22). Upon receipt of a request from a client (step S23), the system management device 13 first determines whether or not the request refers to a change of an observation object (step S24).

If the client requests to change an observation object, it is changed into another object and the time-series data is collected (step S25). Then, it is determined whether or not a request to change a learning algorithm has been issued (step S26). If yes, the specified item is amended and necessary computer resources are reserved (step S27). Next, it is determined whether or not a request to change the scale of the CSSRNN 19 has been issued (step S28). If yes, the scale of the CSSRNN 19 is amended and necessary computer resources are reserved (step S29). Then, it is determined whether or not a request to change the settings of the estimating device 17 has been issued (step S30). If a change request has not been issued in step S24, then control is passed to the process in step S26. If a change request has not been issued in step S26, then control is passed to the process in step S28. If a change request has not been issued in step S28, then control is passed to the process in step S30.

If a change request has been issued in step S30, the settings of the estimating device 17 is changed and the device is reactivated (step S33). Then, it is determined whether or not a request to change the settings of the learning device 14 has been issued (step S34). If the change request has not been issued in step S30, then it is determined whether or not the estimating device 17 has been activated (step S31). If it has been activated, control is passed to the process in step S34. Unless the estimating device 17 has been activated, it is activated (step S32) and control is passed to the process in step S34.

If a change request has been issued in step S34, the settings of the learning device 14 is changed and the device is reactivated (step S37). Then, it is determined whether or not a request to present the observation data has been issued (step S38). If the change request has not been issued in step S38, then it is determined whether or not the learning device 14 has been activated (step S35). If it has been activated, control is passed to the process in step S38. Unless the learning device 14 has been activated, it is activated (step S36) and control is passed to the process in step S38. If a presentation request has been issued in step S38, the system management device 13 transmits the observation data from the observing device 15 to the display/communication device 12 (step S39), and then determines whether or not a request to present estimation data has been issued (step S40). If yes, the system management device 13 invokes the estimating device 17 to receive the estimation data and transmit the data to the display/communication device 12 (step S41), and determines whether or not a request to start learning data has been issued (step S42). If yes, it involves the learning device 14 to make it learn data, updates the parameter set of the estimating device 17 (step S43), and enters the input wait state (step S22). Unless a request to present data has been issued in step S38, control is passed to the process in step S40. Unless a request to present data has been issued in step S40, control is passed to the process in step S42. Unless a request to present data has been issued in step S42, the system management device 13 enters the input wait state.

The learning device 14 starts the process in response to the invocation from the control device 11. FIG. 13 is a flowchart showing the processes performed by the learning device 14.

When the learning device 14 is set up as shown in FIG. 13, it is placed in the wait state until it is invoked by the control device 11 (step S51). When the control device 11 invokes the learning device 14, the learning device 14 determines whether or not a request to change a parameter of the learning algorithm has been issued (step S52). If yes, the learning device 14 receives a new setting parameter, updates the learning algorithm (step S53), and determines whether or not a request to change the learning standard has been issued (step S54). If yes, it receives the new learning standard, updates the learning standard (step S55), and determines whether or not a request to learn time-series data has been issued (step S56). Unless a request to change the standard has been issued in step S52, control is passed to step S54. Unless a request to change the standard has been issued in step S54, control is passed to step S56. Unless a request to change the standard has been issued in step S56, the learning device 14 enters the wait state in step S51.

When a learning request is issued in step S56, 1 is substituted for i (step S57), and an optional point $\Phi^{(i)}_{init}$ is generated in a dim($\Phi$)-dimensional space, where dim($\Phi$) is the dimension of the parameter set $\Phi$ (step S58). Then, an initial value simplex $SL^{(i)}_{(0)}$ is generated from $\Phi^{(i)}_{init}$, (step S59). Then, the learning device 14 invokes the estimating device 17 to provide the value of $\Phi$ of each vertex of the $SL^{(i)}_{(0)}$ and the time-series data $\{x_1, \ldots, x_N\}$, and receives a corresponding estimated value string $\{\hat{x}_1, \ldots, \hat{x}_N\}$ (step S60). Then, the value of the evaluation function merit ($S|\Phi$) corresponding to each vertex is computed (step S61).

Next, 1 is substituted for j (step S62), and a parameter set for the minimum value of the evaluation function at the control temperature $T^{(j)}$ is retrieved through the descent simplex method and $N_r$ trials of a random walk starting with the simplex $SL^{(i)}_{(j-1)}$ (step S63). At this time, the value of the evaluation function for the vertex generated in the simplex compressing process is computed while communicating with the estimating device 17 (step S64). The newly obtained simplex is $SL^{(i)}_{(j)}$.

Then, $T^{(j)}$ is compared with the final temperature $T_{min}$ of annealing (step S65). If $T^{(j)}$ is higher than $T_{min}$, then j is set to j+1 (step S66), and $T^{(j)}$ is set to $KT^{(j-1)}$ to lower the temperature (step S67), where 0<K<1. The processes in and after step S64 are repeated. If $T^{(j)}$ is equal to or lower than $T^{min}$ in step S65, then a point at which the evaluation function indicates the minimum value in the vertices of the simplex $SL^{(i)}_{(j)}$ is obtained and stored as a locally optimum parameter set $\Phi^{(i)}_{res}$ (step S68).

Then, i is compared with the number $N_a$ of times of trials (step S69). If i is smaller than $N_a$, i is set to i+1 (step S70), and the processes in and after steps S58 are repeated. If i has reached $N_a$ in step S69, then the optimum parameter set indicating the smallest value for the evaluation function is selected from $N_a \Phi^{(i)}_{res}$ (i=1, . . . , $N_a$) (step S71). The optimum parameter set is set in the CSSRNN 19 (step S72) and the learning device 14 returns to the wait state (step S51).

The estimating device 17 is invoked by the learning device 14 in the learning mode, and by the control device 11 in the estimating mode. The fundamental operations of the estimating device 17 are the same in both modes except that the observation data are provided by different suppliers and the estimation results are output to different destinations. FIG. 14 is a flowchart showing the processes performed by the estimating device 17.

When the estimating device 17 is set up as shown in FIG. 14, it enters the wait state until it is invoked by either control device 11 or learning device 14 (step S81). When it is invoked, the estimating device 17 determines whether or not a request to change the parameter set of the CSSRNN 19 has been issued (step S82). If yes, the estimating device 17 receives a new parameter set, updates the old parameter set (step S83), and determines whether or not a request to estimate data has been issued (step S84). Control is passed to the process in step S84 unless a request to change the parameter set has been issued in step S82. If a request to estimate data has not been issued in step S84, then the estimating device 17 enters the wait state in step S81.

If an estimation request is issued in step S84, the internal state $\overline{O}^{(t,s)}$ of the CSSRNN 19 is set (step S85), t is set to 1, and the estimation is started (step S86). First, the nonlinear equation (6) is solved to obtain the estimated value $\hat{x}^{(t)}$ of the time-series data (step S87), and the solution is output as an estimation result (step S88). Then, a true value $x^{(t)}$ is read (step S89), the CSSRNN 19 is driven, and the internal state $\overline{O}^{(t-1,s)}$ is updated into $\overline{O}^{(t,s)}$ (step S90). Next, it is determined whether or not t has exceeded the upper limit value N (step S91). If not, t is set to t+1 (step S92), and the processes in step S87 are repeated. If t has exceeded N in step S91, then the estimation terminates (step S93), and the estimating device 17 enters the wait state (step S81).

Described below is an example of estimating a data change trend by the time-series trend estimating system shown in FIG. 3. For simple description, a CSSRNN assigned m hidden elements each of which is assigned s registers is referred to as an hmrs-NN. The number s of the registers assigned to the hidden elements indicates the depth of the context layer. For example, the CSSRNN comprising two hidden elements each of which has one register is represented as h2r1-NN.

Figure 15:
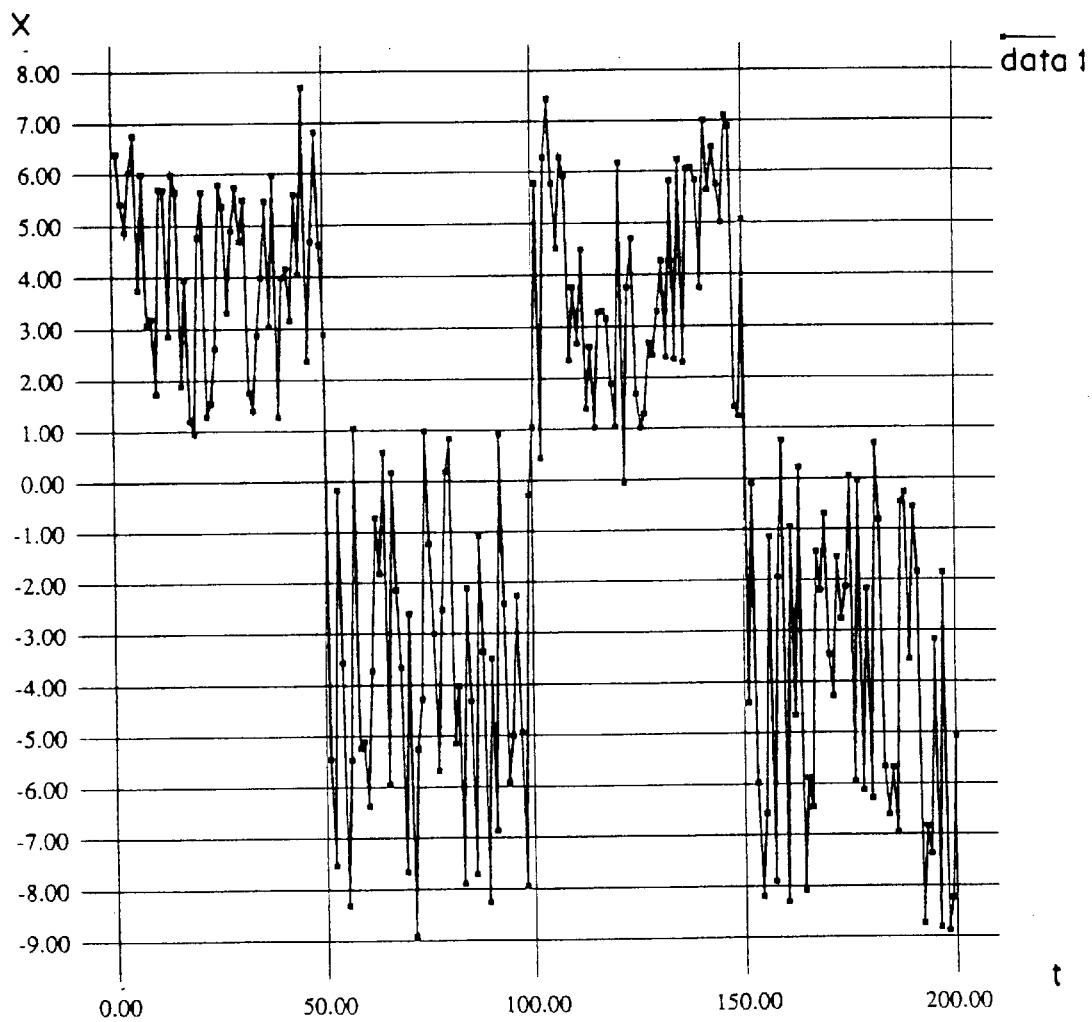
FIG. 15 shows a time series of a jumping trend.

Described first is a trend estimation result for piecewise stationary data. For example, the following time-series data generated by a time-series data generating device (not shown in FIG. 3) is selected as an estimation object.

$$x^{(t)} \sim \begin{cases} N(4, 3) & 1 \le t \le 50 \\ N(-4, 8) & 51 \le t \le 100 \\ N(4, 3) & 101 \le t \le 150 \\ N(-4, 8) & 151 \le t \le 200 \end{cases} \quad (20)$$

where $N(\mu, \sigma^2)$ indicates a Gaussian density function having a mean value $\mu$ and a variance $\sigma^2$. FIG. 15 shows an example of time-series data generated according to expression (20). In the time-series data shown in FIG. 15, the discontinuous switches of the mean values at the boundaries of the four segments of time t, that is, $1 \le t \le 50$, $51 \le t \le 100$, $101 \le t \le 150$, and $151 \le t \le 200$, are represented as data jumping trends. Such discontinuous jumping trends are estimated by the time-series trend estimating system. The learning data for use in determining the optimum parameter set and test data to be compared with an estimation result are individually generated by expression (20).

Figure 16:
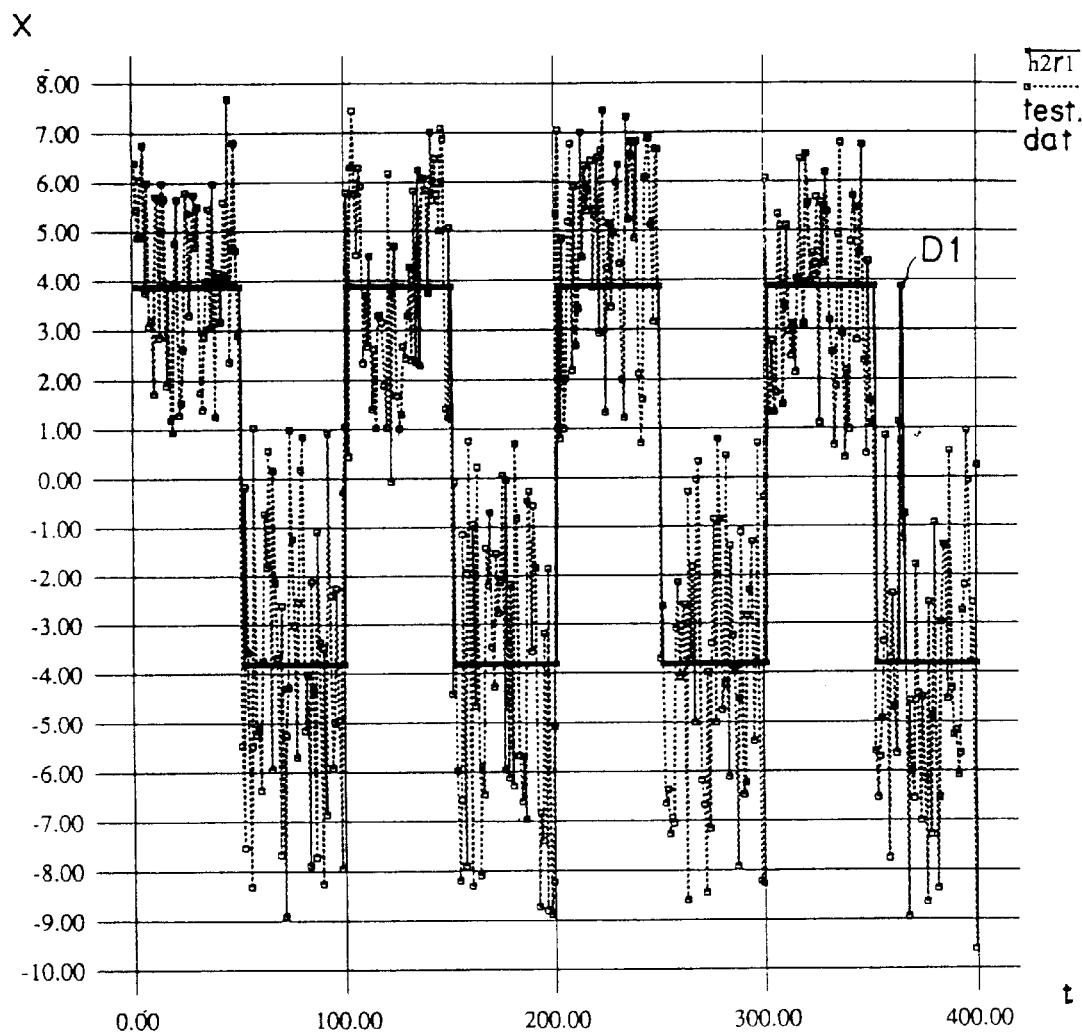
FIG. 16 shows an estimation result according to the h2r1 neural network.

The system comprising an h2r1-NN or h2r10-NN is provided with the time-series data shown in FIG. 15 as learning data and learns the data to obtain the estimation result by the system for unknown test data. The estimation results through the h2r1-NN and h2r10-NN are shown in FIGS. 16 and 17, respectively. In FIGS. 16 and 17, the bold lines indicate the results estimated by the CSSRNN, and the broken lines indicate the test data actually generated by the time-series data generating device.

These results show that the jumping trends have been successfully estimated. However, in the case of the h2r1-NN having a small-scale context layer, a switching phenomenon is not perfectly distinguished from the fluctuation of the amplitude of noises. In FIG. 16, the estimated value D1 in the segment $351 \le t \le 400$ is not within the cyclical trend. On the other hand, the h2r10-NN shown in FIG. 17 does not generate a deviated value in estimation, thereby estimating a trend with a higher accuracy. Thus, to keep the switching phenomenon traced with a certain extent of robustness that permits data to be independent of noises, etc., a rather big scale of context layer should be used.

Figure 18:
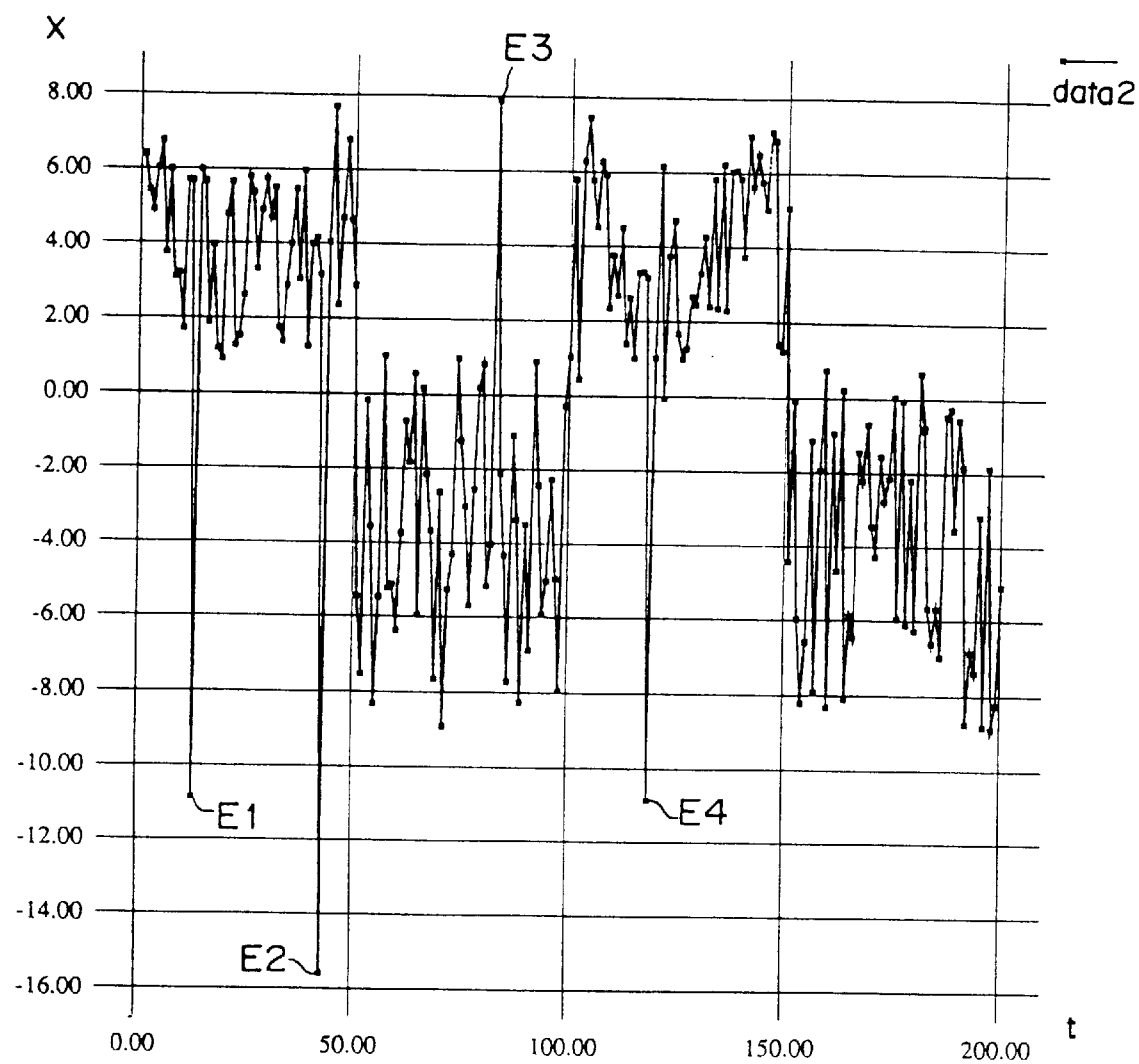
FIG. 18 shows a time series containing an abnormal value.

Described below is the estimation result of a trend for the time-series data indicating an abnormal value. An abnormal value refers to a problem of an extreme deviation that is distinguished from the fluctuation of noises. FIG. 18 shows time-series data of a jumping trend containing an abnormal value. The time-series data shown in FIG. 18 is obtained by generating basic data by expression (20) and adding abnormal values E1, E2, E3, and E4 on the data. These abnormal values are generated such that their generation intervals follow the Poisson distribution. The values are generated according to the normal distribution of an average of 10 and distribution of 0.5, and added to the time-series data indicating a jumping trend as a positive value with probability of ½, and a negative value with probability of ½. The information about the possibility that an abnormal value is generated is not provided for the time-series estimating system. An abnormal value refers to a value considerably deviating from a mean value, if a normal distribution is assumed, and indicating an occurrence probability of nearly 0.

Figure 19:
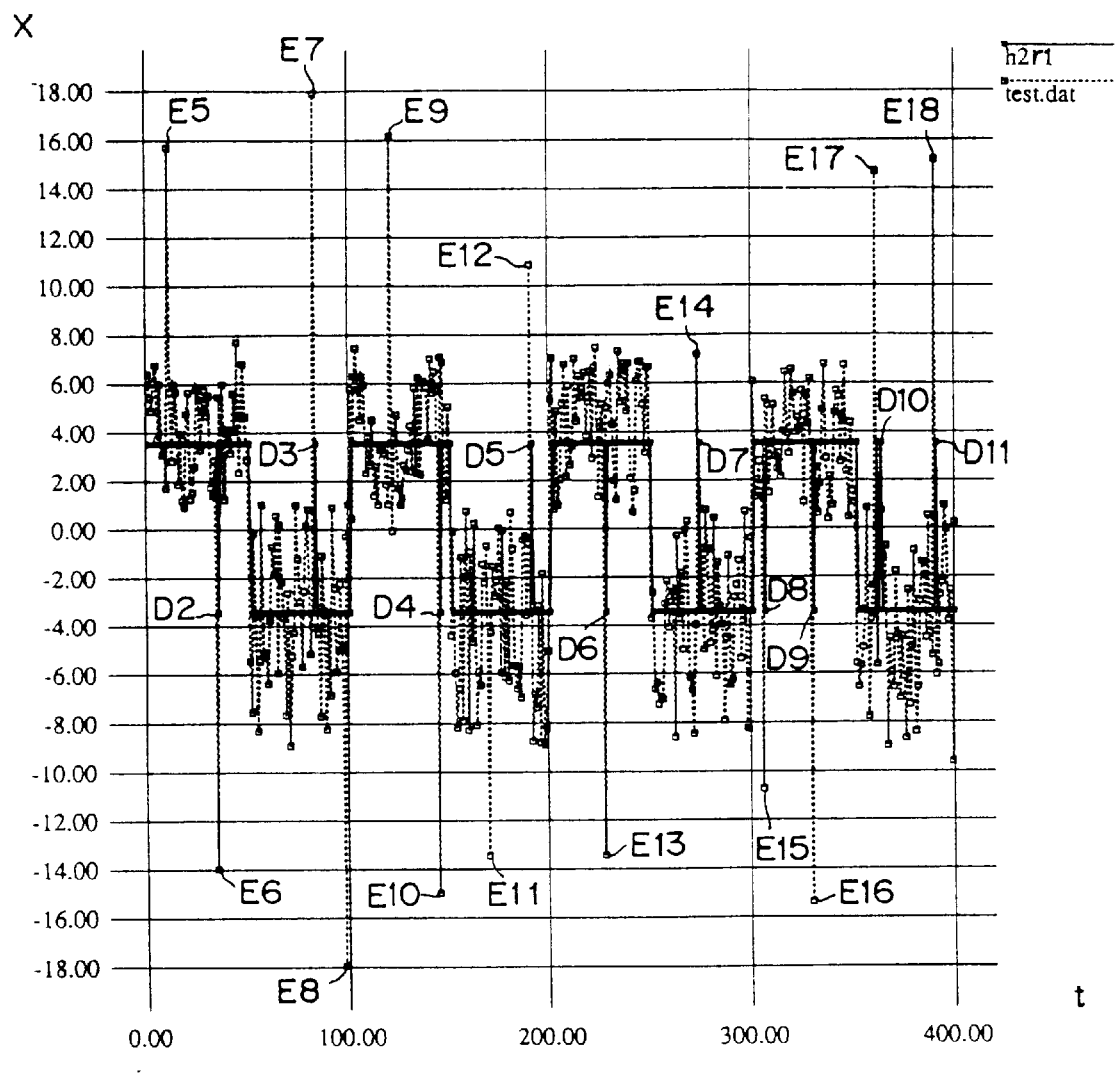
FIG. 19 shows an estimation result containing an abnormal value according to the h2r1 neural network.
Figure 20:
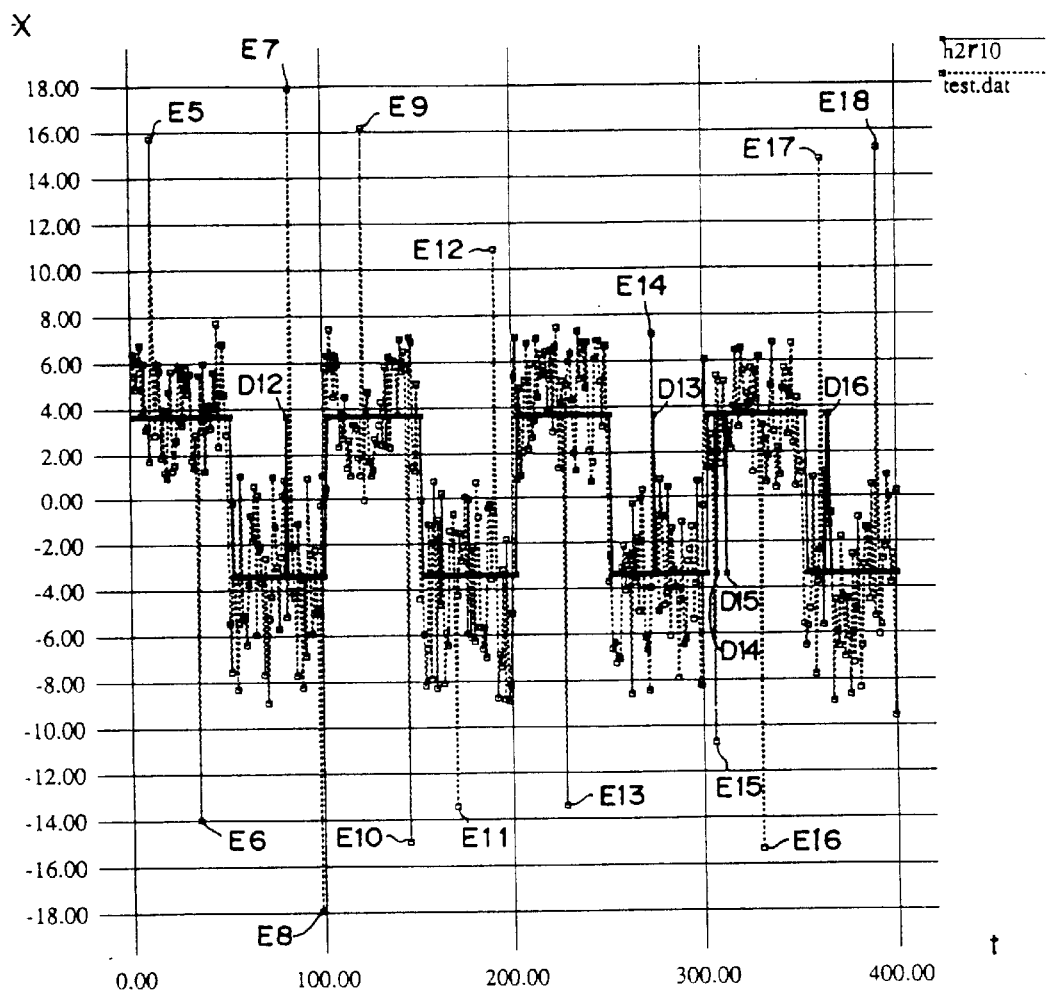
FIG. 20 shows an estimation result containing an abnormal value according to the h2r10 neural network.
Figure 21:
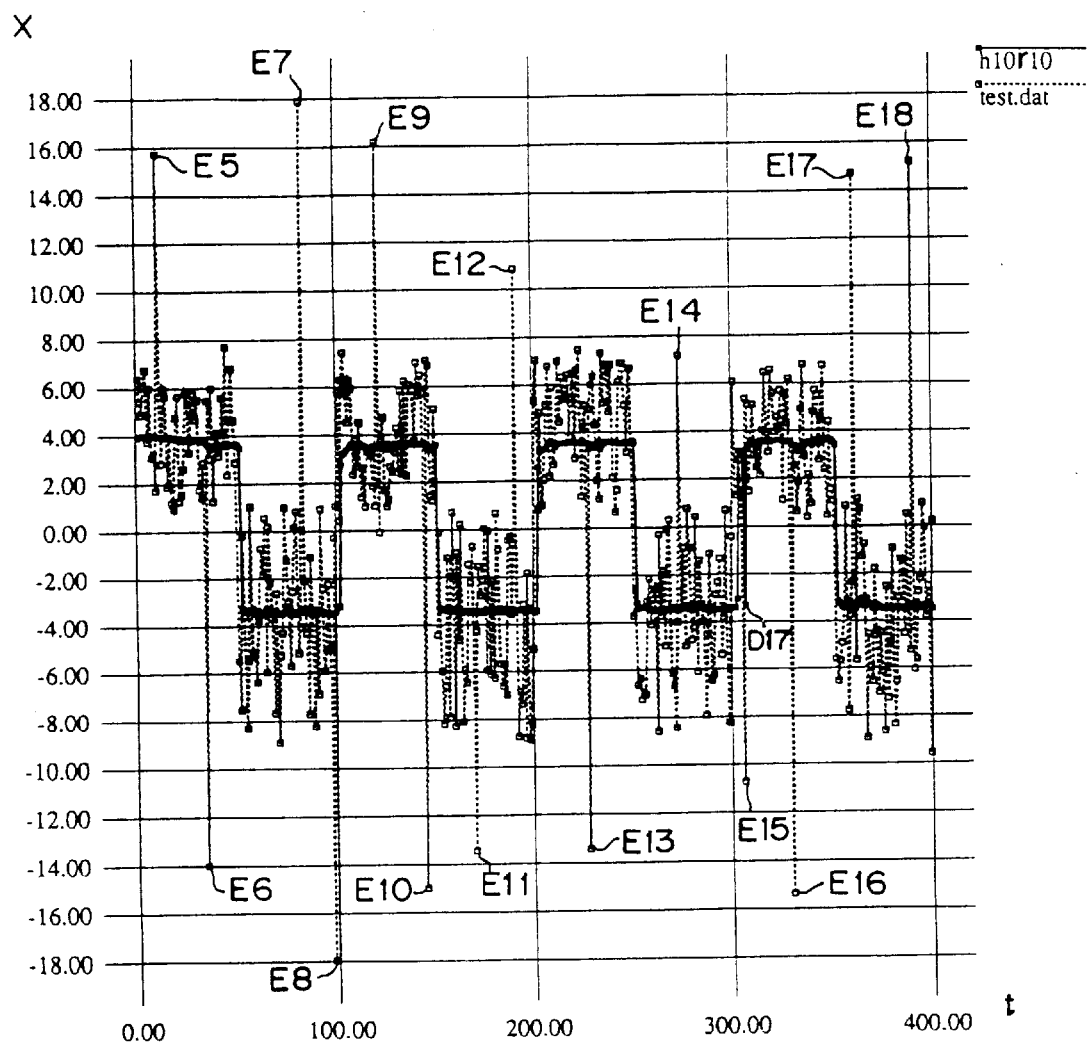
FIG. 21 shows an estimation result containing an abnormal value according to the h10r10 neural network.

The h2r1-NN, h2r10-NN, and h10r10-NN are selected as a CSSRNN, and the systems comprising them learn the time-series data shown in FIG. 18. FIGS. 19, 20, and 21 show the result of the test in which the estimation results from the systems are tested by another data generated by the mechanism similar to that shown in FIG. 18. In FIGS. 19, 20, and 21, data E5, E6, E7, E8, E9, E10, E11, E12, E13, E14, E15, E16, E17, and E18 indicate abnormal values in the test data.

In the h2r1-NN shown in FIG. 19, the abnormal values in the estimated values are D2, D3, D4, D5, D6, D7, D8, D9, D10, and D11. It is considered that the abnormal estimated values are generated under the influences of the abnormal values E6, E7, E10, E12, E13, E14, E15, E16, E17, and E18 in the test data. In the case of the h2r10-NN shown in FIG. 20, the abnormal values in the estimated values are only five, that is, D12, D13, D14, D15, and D16. In the case of the h10r10-NN in FIG. 21, the abnormal value in the estimated values is D1 only. In FIG. 21, the slight fluctuation of the trend of estimated values is caused by the detailed representation of discrete values by a large number of hidden elements. These results imply that a larger-scale circuit for a CSSRNN realizes larger robustness. Therefore, a discontinuous trend can be correctly estimated according to the present invention even if time-series abnormal values exist.

Next, it is checked how the characteristics of the time-series data are obtained as an internal representation when a CSSRNN is configured as an prediction filter using a function merit $(S|\Phi)$ (evaluation function in the least-square method and maximum likelihood estimation method, etc.) for use in measuring the adaptability between a time-series S and a model determined by a parameter set $\Phi$.

First, the relationship between a hidden variable vector and a Gaussian density function is observed. With the hidden variable vector $h^{(t)}$ and input vector $x^{(t)}$ of the CSSRNN, the simultaneous density function p (vector $x^{(t)}$, vector $h^{(t)}|\Phi$, $\overline{O}^{(t,s)}$) is defined by equation (11). The linear relationship with a Gaussian density function as a base is defined between the peripheral density p (vector $x^{(t)}|\Phi, \overline{O}^{(t,s)}$) of the vector $x^{(t)}$ derived by the simultaneous density function and the peripheral distribution function P (vector $h^{(t)}|\Phi, \overline{O}^{(t,s)}$) of the vector $h^{(t)}$. This is easily understood through the following explanation.

The estimated distribution of the hidden variable vector of the CSSRNN at time t is determined by the P (vector $h^{(t)}|\Phi, \overline{O}^{(t,s)}$) in equation (13). The event represented by the CSSRNN is a state in which hidden variable vectors are superposed with a certain probability. For simple representation, a probabilistic superposition of hidden variable vectors in estimation is hereinafter referred to as an aspect. In other words, an aspect refers to a probabilistic configuration of hidden states. Equation (13) is defined on a set of all possible hidden variable vectors and used to estimate their weights in the superposition.

The elements of the hidden variable vectors are displayed, and each element is assigned a non-negative integer as an index. Assuming that the number of hidden elements is m, $2^m$ hidden variable vectors are represented by the following equation (21).

$$\vec{h}_{(i)} = (h_{i1}, \ldots, h_{im})  \quad (21)$$

$$h_{ij} = \begin{cases} 1 \\ 0 \end{cases}, 1 \leq j \leq m, 0 \leq i \leq 2^m - 1$$

For example, when m=2, the hidden variable vectors are vector $h_{(0)}=(0, 0)$, vector $h_{(1)}=(1, 0)$, vector $h_{(2)}=(0, 1)$, and vector $h_{(3)}=(1, 1)$.

According to equation (12), the estimated distribution of the input vector at time t is rewritten as follows.

where $\vec{w}_j$ (hereinafter referred to as vector $w_j$) is the input weight vector of the j-th hidden element.

$$g\left(\vec{x}^{(t)}; \sum_{j=1}^{m} h_{ij}\vec{w}_j\right) = \frac{1}{(\sqrt{2\pi})^d} \exp\left(-\frac{1}{2}\left\|\vec{x}^{(t)} - \sum_{j=1}^{m} h_{ij}\vec{w}_j\right\|^2\right)$$

It is the Gaussian density function having the following mean value and the variance of 1.

$$\sum h_{ij}\vec{w}_j \equiv \sum_{j=1}^{m} h_{ij}\vec{w}_j$$

The function is hereinafter represented as follows.

$$N\left(\sum_{j=1}^{m} h_{ij}\vec{w}_j, 1\right) = N\left(\sum h_{ij}\vec{w}_j, 1\right)$$

According to equation (13), equation (22) can be rewritten as follows.

$$p(\vec{x}^{(t)}|\Phi, \overline{O}^{(t,s)}) = \sum_{i=0}^{2^m-1} P(\vec{h}_{(i)}|\Phi, \overline{O}^{(t,s)}) g\left(\vec{x}^{(t)}; \sum_{j=1}^{m} h_{ij}\vec{w}_j\right) \quad (23)$$

$$= \sum_{i=0}^{2^m-1} P(\vec{h}_{(i)}|\Phi, \overline{O}^{(t,s)}) N\left(\sum_{j=1}^{m} h_{ij}\vec{w}_j, 1\right)$$

$$p(\vec{x}^{(t)}|\Phi, \overline{O}^{(t,s)}) = \sum_{\vec{h}^{(t)} \in \{0,1\}^m} p(\vec{x}^{(t)}, \vec{h}^{(t)}|\Phi, \overline{O}^{(t,s)}) \quad (22)$$

$$= \frac{\exp\left(-\frac{1}{2}\|\vec{x}^{(t)}\|^2\right)\prod_{j=1}^{m}\left(1+\exp\left(\vec{w}_j\vec{x}^{(t)} + \vec{u}_j\vec{O}_j^{(t,s)} + \theta_j\right)\right)}{(\sqrt{2\pi})^d \sum_{\vec{h}^{(t)} \in \{0,1\}^m} \exp\left(\sum_{j=1}^{m} h_j^{(t)}\left(\vec{u}_j\vec{O}_j^{(t,s)} + \theta_j\right) + \frac{1}{2}\left\|\sum_{j=1}^{m} h_j^{(t)}\vec{w}_j\right\|^2\right)}$$

$$= \frac{\exp\left(-\frac{1}{2}\|\vec{x}^{(t)}\|^2\right)\prod_{j=1}^{m}\left(1+\exp\left(\vec{w}_j\vec{x}^{(t)} + \vec{u}_j\vec{O}_j^{(t,s)} + \theta_j\right)\right)}{(\sqrt{2\pi})^d \sum_{i=0}^{2^m-1} \exp\left(\sum_{j=1}^{m} h_{ij}\left(\vec{u}_j\vec{O}_j^{(t,s)} + \theta_j\right) + \frac{1}{2}\left\|\sum_{j=1}^{m} h_{ij}\vec{w}_j\right\|^2\right)}$$

$$= \frac{\sum_{i=0}^{2^m-1} \exp\left(-\frac{1}{2}\left\|\vec{x}^{(t)} - \sum_{j=1}^{m} h_{ij}\vec{w}_j\right\|^2\right) \exp\left(\sum_{j=1}^{m} h_{ij}\left(\vec{u}_j\vec{O}_j^{(t,s)} + \theta_j\right) + \frac{1}{2}\left\|\sum_{j=1}^{m} h_{ij}\vec{w}_j\right\|^2\right)}{(\sqrt{2\pi})^d \sum_{i=0}^{2^m-1} \exp\left(\sum_{j=1}^{m} h_{ij}\left(\vec{u}_j\vec{O}_j^{(t,s)} + \theta_j\right) + \frac{1}{2}\left\|\sum_{j=1}^{m} h_{ij}\vec{w}_j\right\|^2\right)}$$

$$= \sum_{j=0}^{2^m-1} \frac{\exp\left(\sum_{j=1}^{m} h_{ij}\left(\vec{u}_j\vec{O}_j^{(t,s)} + \theta_j\right) + \frac{1}{2}\left\|\sum_{j=1}^{m} h_{ij}\vec{w}_j\right\|^2\right)}{\sum_{i=0}^{2^m-1} \exp\left(\sum_{j=1}^{m} h_{ij}\left(\vec{u}_j\vec{O}_j^{(t,s)} + \theta_j\right) + \frac{1}{2}\left\|\sum_{j=1}^{m} h_{ij}\vec{w}_j\right\|^2\right)} g\left(\vec{x}^{(t)}; \sum_{j=1}^{m} h_{ij}\vec{w}_j\right)$$

where $$\sum_{i=0}^{2^m-1} P\left(\vec{h}_{(i)} \mid \Phi, \overline{O}^{(t,s)}\right) = 1, \; 0 < P\left(\vec{h}_{(i)} \mid \Phi, \overline{O}^{(t,s)}\right) < 1 \; (0 \leq i \leq 2^m - 1)$$

Equation (23) represents the linear combination of the Gaussian density functions specified by estimated density functions of the input vector and hidden variable vectors. The combination coefficient refers to the estimated distribution of a corresponding hidden variable vector. Therefore, the combination coefficients are nonlinear functions of the internal states of the CSSRNN. The following mapping (24) in which each hidden variable vector $h_{(i)}=(h_{i1}, \ldots, h_{im})$ is associated with the Gaussian density function in the input vector space is determined by a set {vector $w_1, \ldots,$ vector $w_m$} of the weights of hidden elements.

$$\mathcal{M}: \vec{h}_{(i)} \to N\left(\sum_{j=1}^{m} h_{ij}\vec{w}_j, 1\right) \quad (24)$$

Assume that the CSSRNN has two hidden elements and one-dimensional input vector. If the input weights of the hidden elements are w1 and w2, the Gaussian density functions that are the bases to four hidden variable vectors are as follows.

$\vec{h}_{(0)} \to N(0,1)$ $\vec{h}_{(1)} \to N(w_1,1)$ $\vec{h}_{(2)} \to N(w_2,1)$ $\vec{h}_{(3)} \to N(w_1+w_2,1)$ Assume that the estimated distribution of hidden variable vectors at time t is obtained as follows.

$P(\vec{h}^{(t)} = \vec{h}_{(0)} \mid \Phi, \overline{O}^{(t,s)}) = 0.07$ $P(\vec{h}^{(t)} = \vec{h}_{(1)} \mid \Phi, \overline{O}^{(t,s)}) = 0.87$ $P(\vec{h}^{(t)} = \vec{h}_{(2)} \mid \Phi, \overline{O}^{(t,s)}) = 0.01$ $P(\vec{h}^{(t)} = \vec{h}_{(3)} \mid \Phi, \overline{O}^{(t,s)}) = 0.05$ where the estimated distribution of the input $x^{(t)}$ is computed according to equation (23) as follows.

$0.07N(0,1)+0.87N(w_1,1)+0.01N(w_2,1)+0.05N(w_1+w_2,1)$

In this case, the distribution is represented nearly by the form of $N(w_1, 1)$. Generally, the form of an estimated density of the input $x^{(t)}$ at time t varies with the distance between input weights and the weights for the Gaussian density functions as bases. Lower slopes of an estimated density function may be extended, or there may be a deviation between the peak (mean value) of any base function and the peak of an estimated density function. There can be plural peaks of estimated density function, or its form can be variable in various manners. If the estimated distribution of hidden variable vectors is extremely concentrated on a specific hidden variable vector $h_{(i)}$, the estimated density function for an input almost matches N ($\Sigma h_{ij}$·vector $w_j$, 1). In this case, the mean value $\Sigma h_{ij}$·vector $w_j$ is determined by the input weight vector $w_j$ of the hidden element corresponding to $h_{ij}=1$.

The above described relationship is used in an experiment of estimating time-series data indicating extreme trend changes. First, the time-series S is generated through the following Gaussian distribution that varies with time and has variable mean value.

$$x^{(t)} \sim \begin{cases} N(1, 1) & 1 \leq t \leq 50 \\ N(-1, 1) & 51 \leq t \leq 100 \\ N(1, 1) & 101 \leq t \leq 150 \\ N(-1, 1) & 151 \leq t \leq 200 \end{cases} \quad (25)$$

Figure 22:
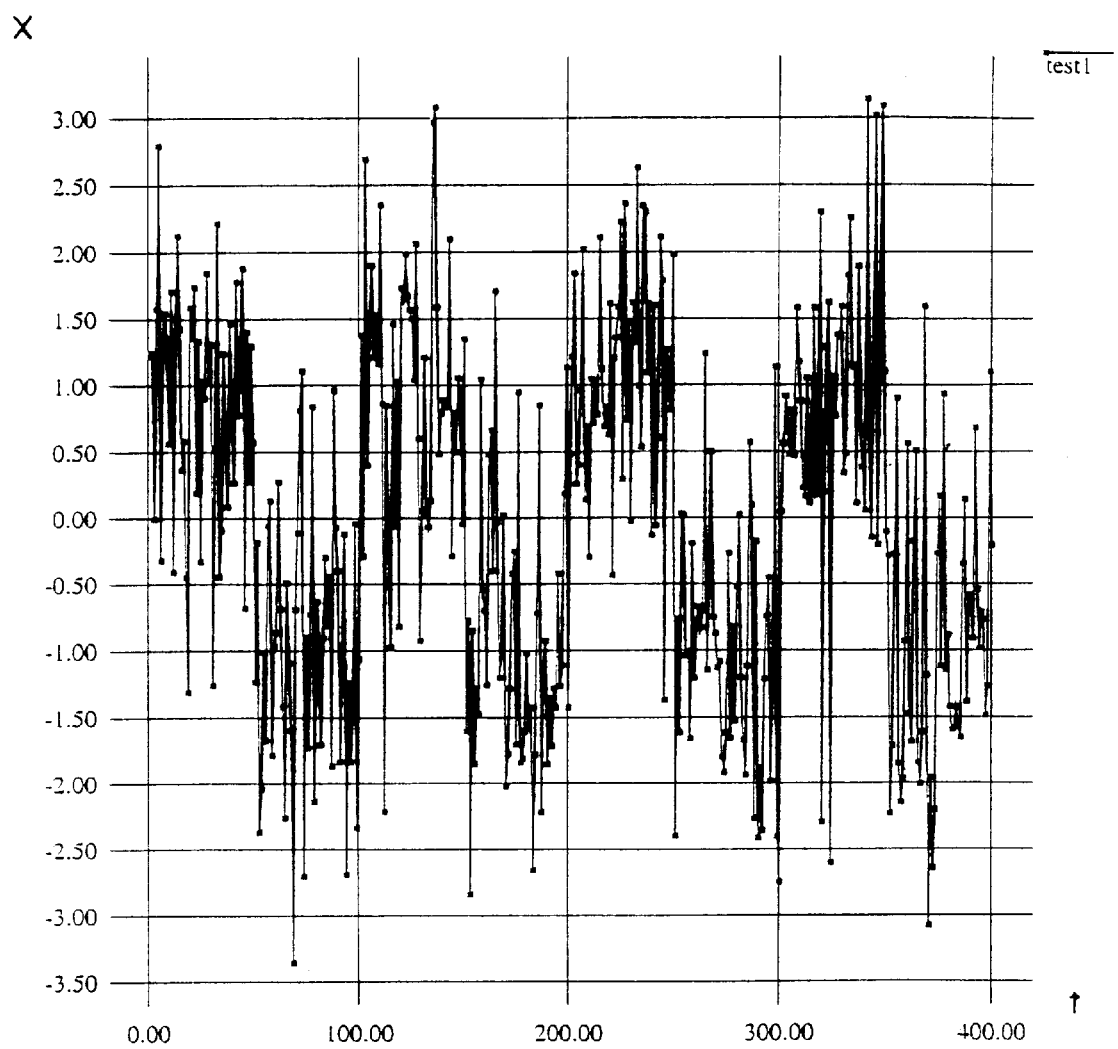
FIG. 22 shows a test time-series.
Figure 23:
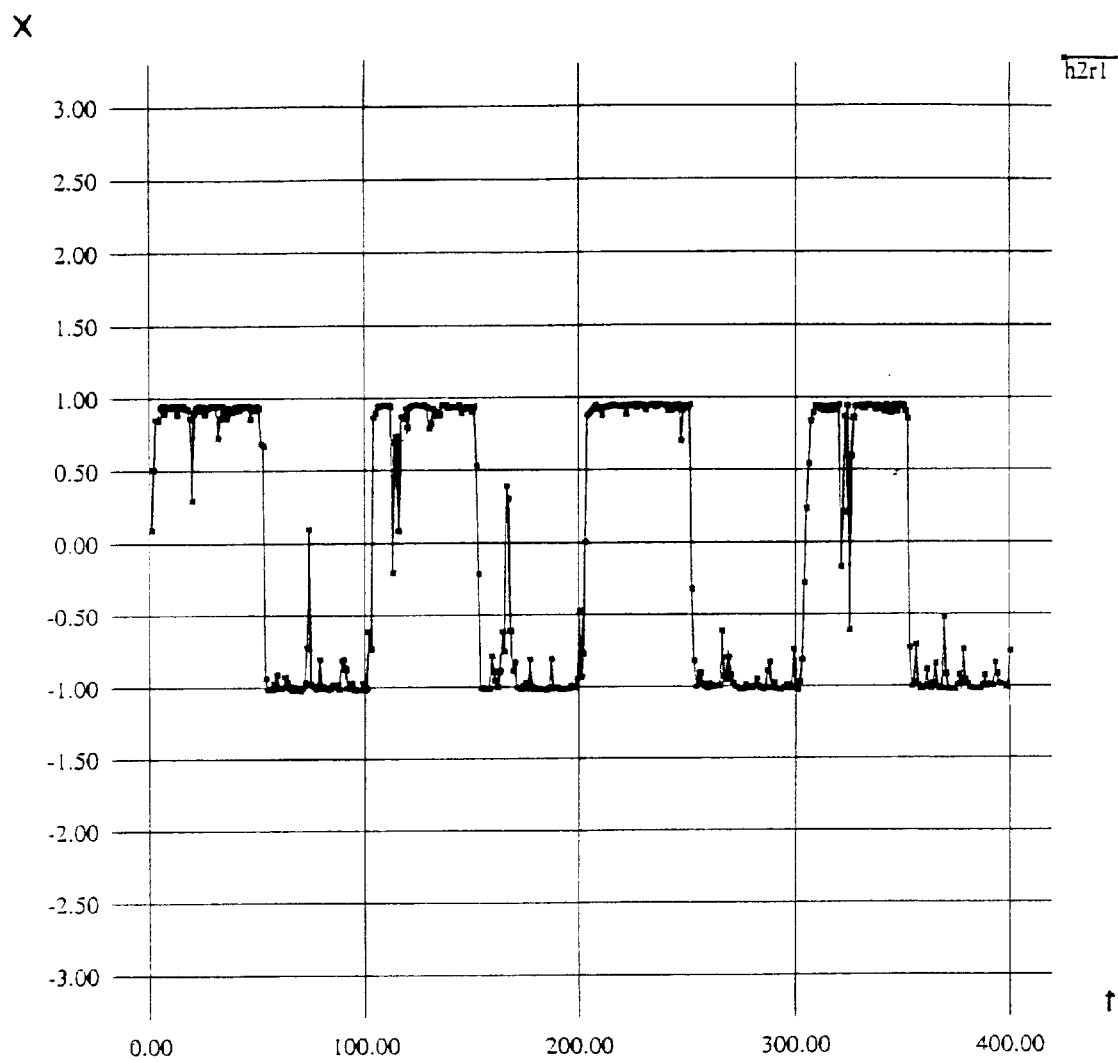
FIG. 23 shows an estimated value according to the h2r1 neural network.
Figure 24:
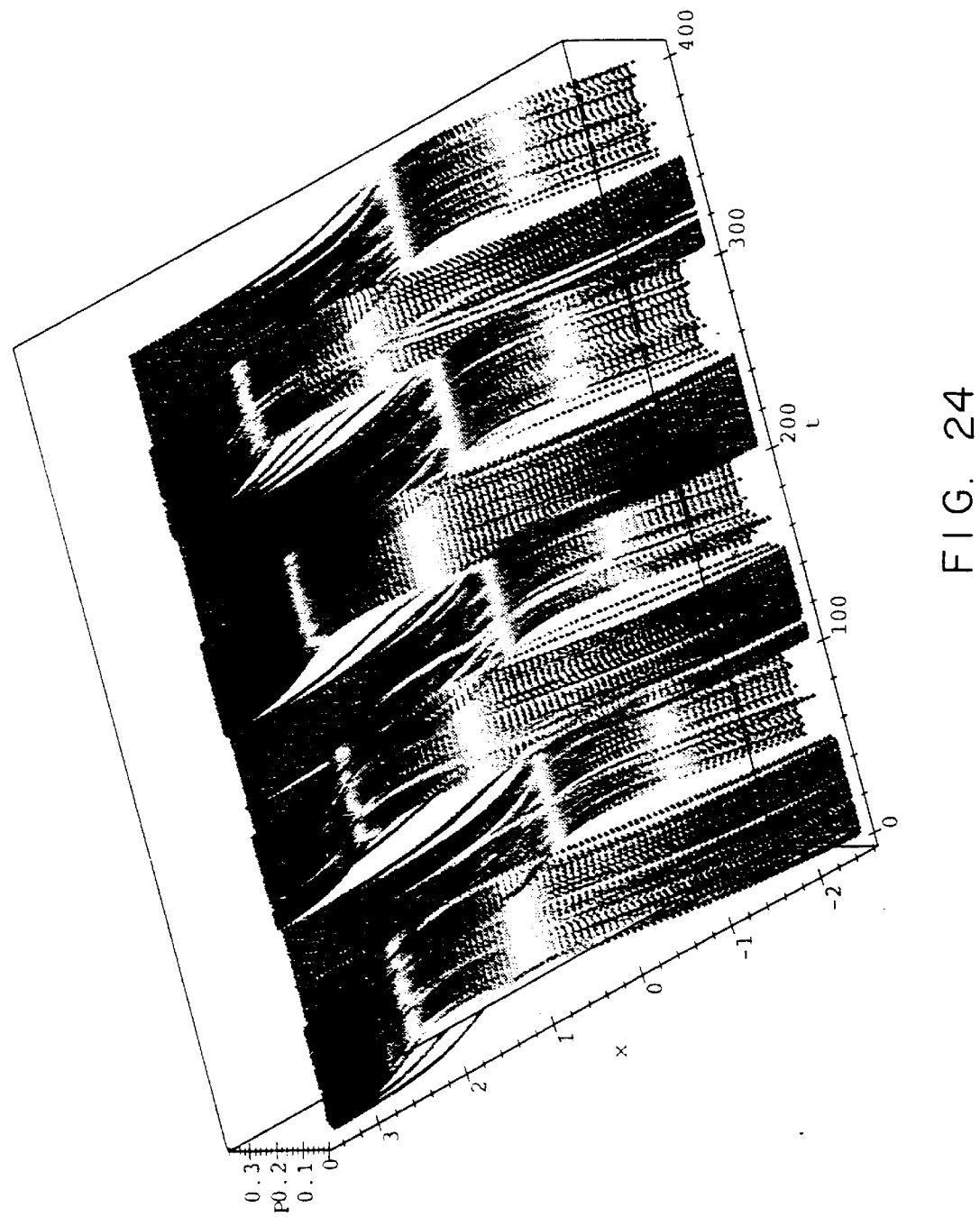
FIG. 24 shows an estimation distribution according to the h2r1 neural network.
Figure 26:
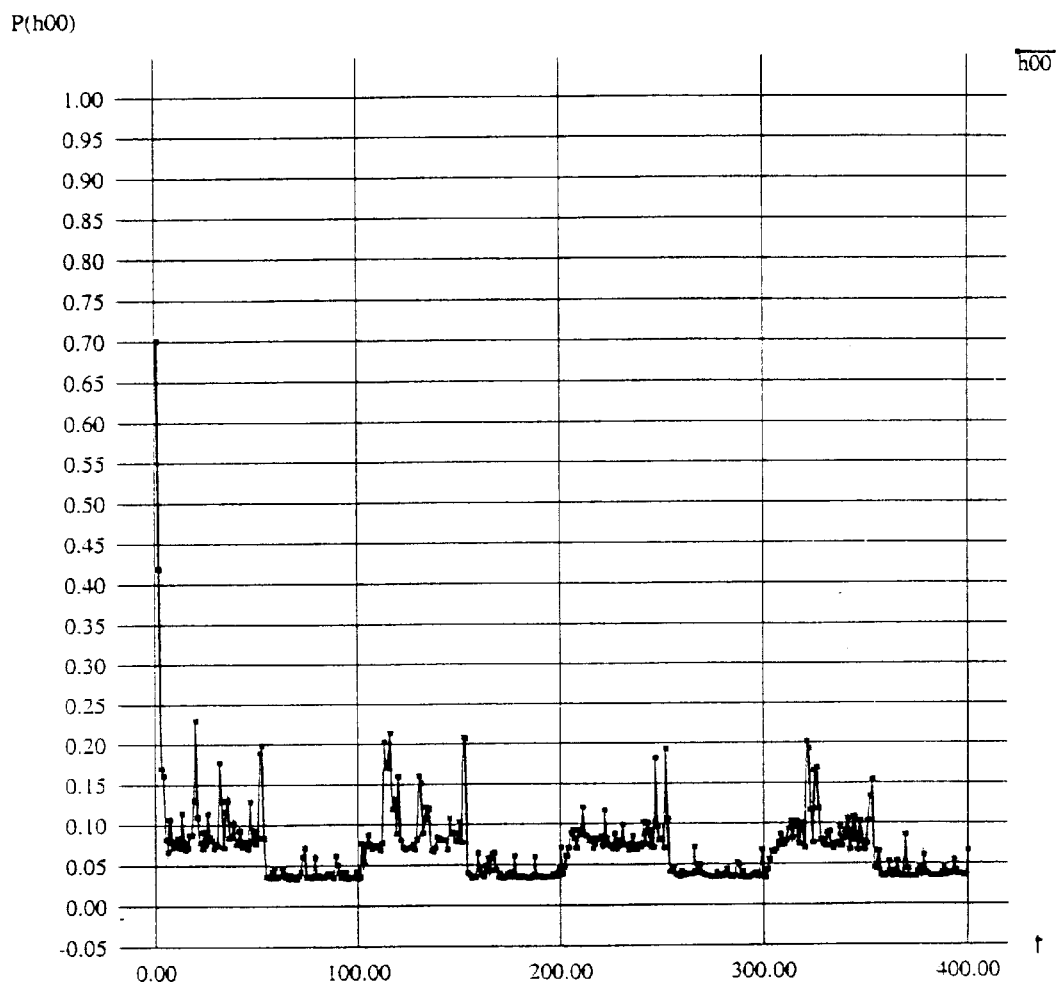
FIG. 26 shows the probability density of a hidden variable vector (0, 0) according to the h2r1 neural network.
Figure 27:
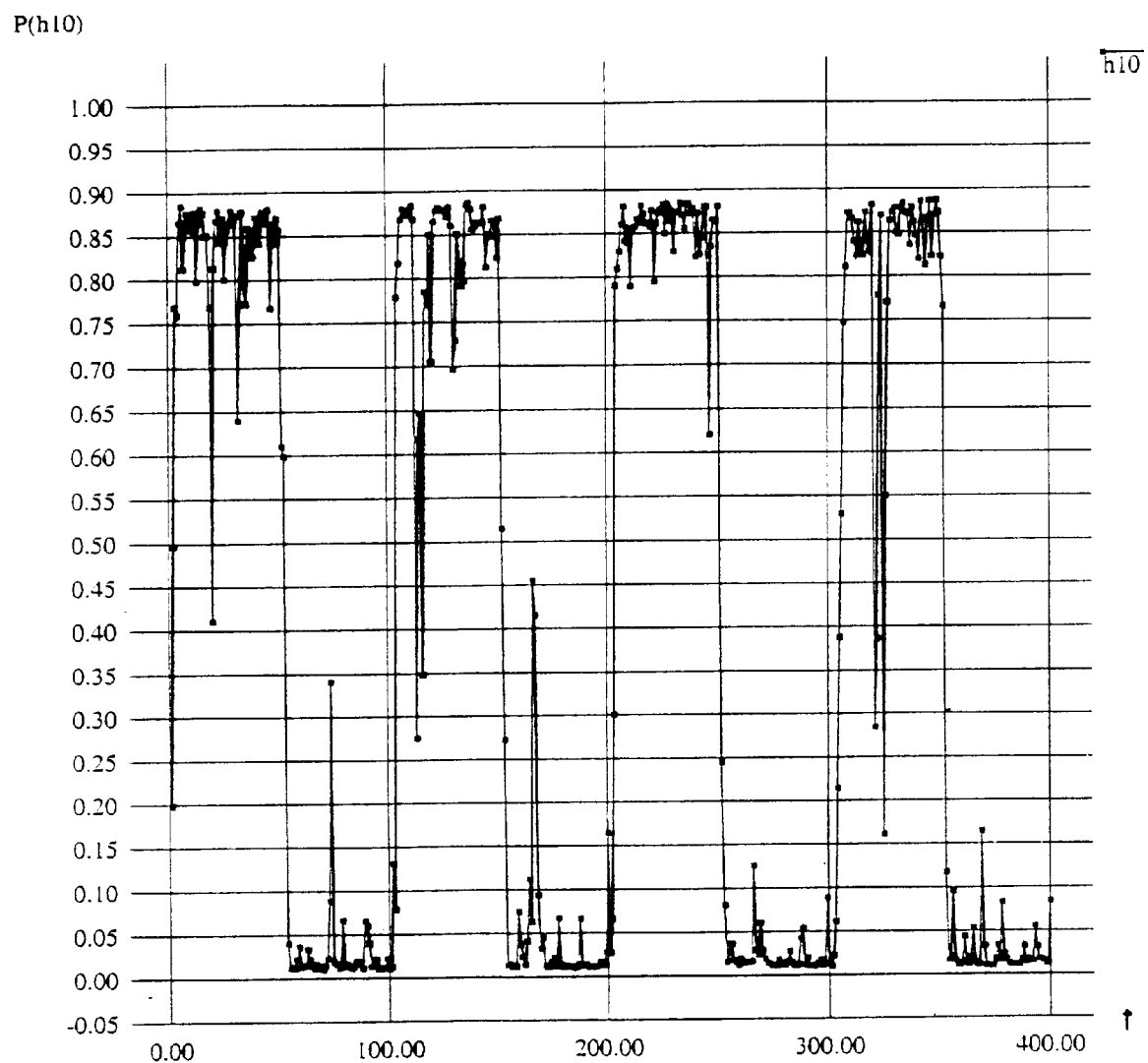
FIG. 27 shows the probability density of a hidden variable vector (1, 0) according to the h2r1 neural network.
Figure 28:
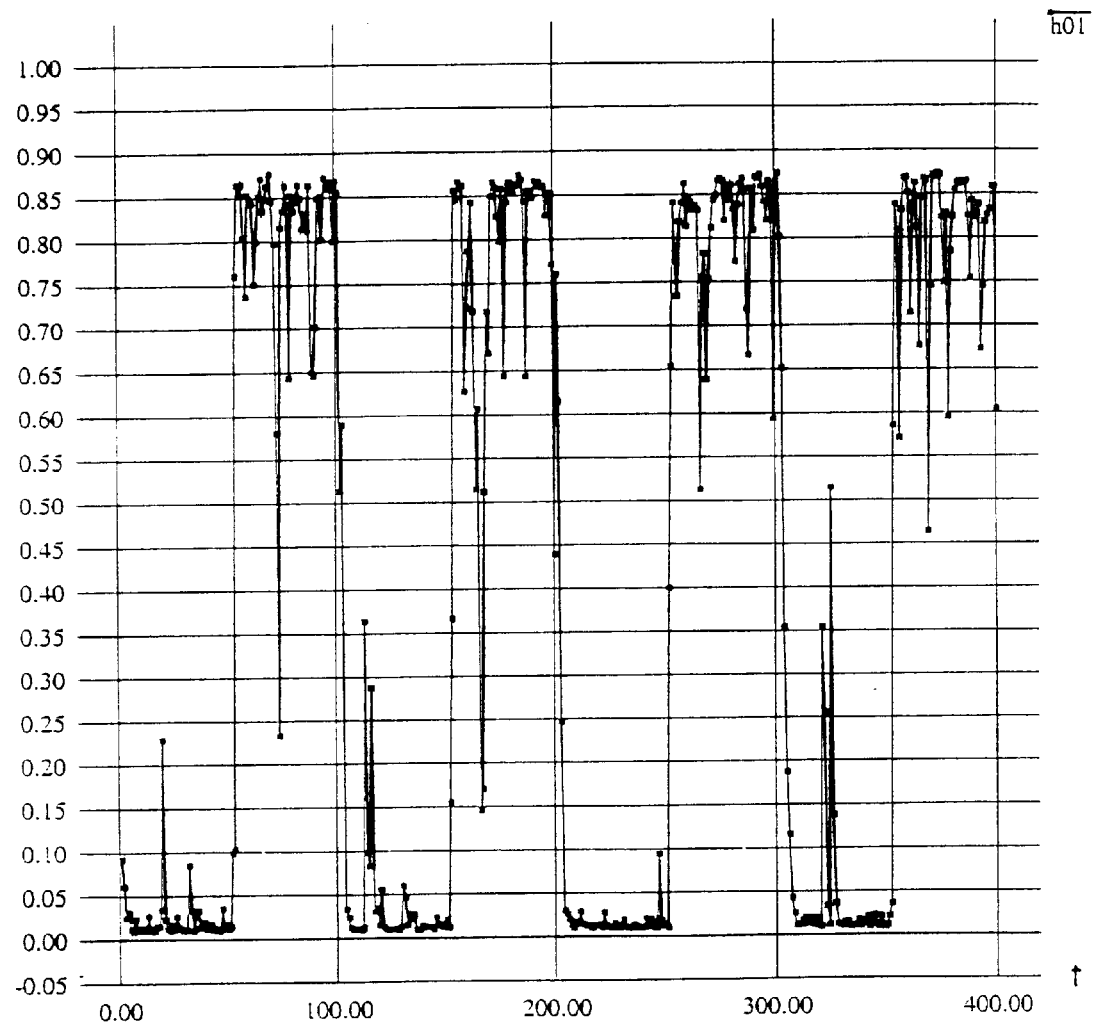
FIG. 28 shows the probability density of a hidden variable vector (0, 1) according to the h2r1 neural network.
Figure 29:
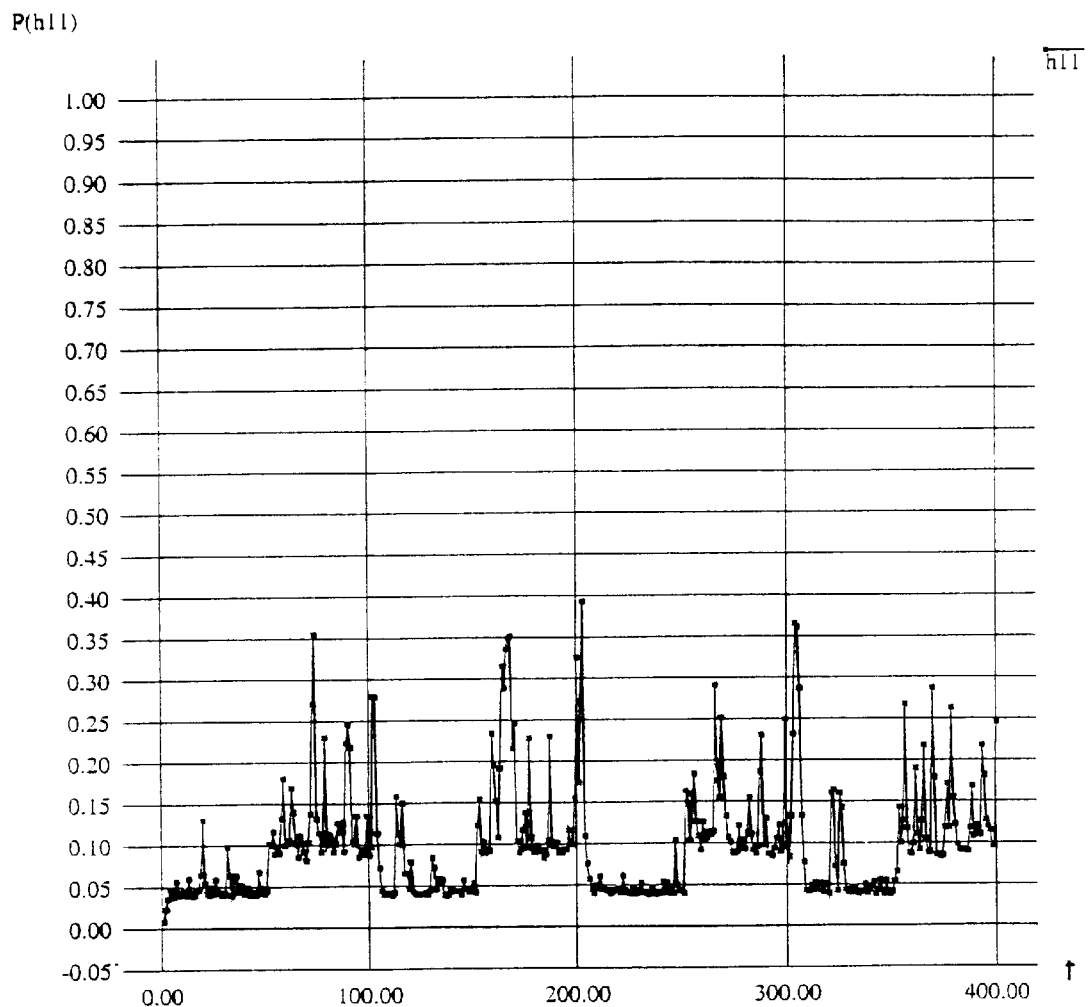
FIG. 29 shows the probability density of a hidden variable vector (1, 1) according to the h2r1 neural network.

The h2r1-NN having two hidden elements each of which is assigned one register is applied to the time-series S. The parameter $\Phi_{opt} = \{w_1, \theta_1, u_1, w_2, \theta_2, u_2\}$ that minimizes the merit (S|$\Phi$) in equation (9) defined by the negative-value logarithm likelihood is retrieved by the numerical optimizing method. If an appropriate parameter is selected, it is used as the $\Phi_{opt}$ in configuring the h2r1-NN, and a testing time-series data shown in FIG. 22 is estimated. The estimation object is an input value entered after the test data are input in turn. The internal state of the h2r1-NN is updated using an actually input observation value. These settings are referred to as an open loop. FIG. 23 shows an estimation result by the h2r1-NN. The estimated value shown in FIG. 23 corresponds to the peak of the estimated distribution of the input $x^{(t)}$. In comparison between FIG. 22 and FIG. 23, the h2r1-NN correctly traces the discontinuous switches of the time-series trends, and successfully estimates each trend. FIG. 24 shows the changes of the entire estimated density with time (estimated density function string). It shows how the estimated probability density P of the input value x changes with time t. FIG. 23 is a diagram showing the estimated values of x corresponding to the peak of the estimated probability density P at each time.

It is checked what characteristics in the time-series S are obtained by the CSSRNN as internal representations. FIG. 25 shows, as the information required to qualitatively explain the relationship between the estimated distribution of each hidden variable vector of the h2r1-NN and the estimated distribution of input data, the optimum parameter set of the h2r1-NN used in the estimation. According to the value of each parameter shown in FIG. 25, the correspondence between a hidden variable vector and a Gaussian density function is verified as follows.

$\vec{h}_{(0)}=(0,0) \to N(0.0,1.0)$ $\vec{h}_{(1)}=(1,0) \to N(1.02696,1.0)$ $\vec{h}_{(2)}=(0,1) \to N(-1.10853,10)$ $\vec{h}_{(3)}=(1,1) \to N(-0.08157,1.0)$ FIGS. 26, 27, 28, and 29 respectively show the probability density for the hidden variable vector $h_{(0)}=(0, 0)$, vector $h_{(1)}=(1, 0)$, vector $h_{(2)}=(0, 1)$, and vector $h_{(3)}=(1, 1)$ estimated by the h2r1-NN. The following descriptions are derived by comparing the time-series trend estimation shown in FIG. 23, the change in entire estimated density shown in FIG. 24, and the estimated distribution of each hidden variable vector shown in FIGS. 26 through 29.

In the time-series section generated by N (1, 1), the estimated distribution of the hidden variable vector $h_{(1)}$ is the primary term in the coefficients, and the form of the estimated density is mainly determined by N (1.02696, 1.0). Parameters for superposing the distribution N (0.0, 1.0) of the vector $h_{(0)}$ at a considerable rate are selected so that the h2r1-NN can realize an appropriate aspect for the time series S in estimating a hidden variable vector. Therefore, the width of the estimated density function is enlarged in the negative direction, and the peak is deviated in the negative direction from the peak of N (1.020696, 1.0). Realizing an appropriate aspect refers to minimizing the negative value logarithm likelihood computed according to the estimated density for an input.

In the time-series section generated by N (−1, 1), the estimated distribution of the hidden variable vector $h_{(2)}$ is the primary term in the coefficients, and the form of the estimated density is mainly determined by N (−1.10853, 1.0). Since the weight of N (−0.08157, 1.0) is not very small, the width of the estimated density function is enlarged in the positive direction, and the peak is deviated in the positive direction from the peak of N (−1.10853, 1.0).

The above discussion is logically proved by equation (23). The result of the experiment derives the following interpretation.

The optimum parameter of the CSSRNN for the time series S generates the most probable function string among the possible estimated density function strings which can be described by the CSSRNN. The CSSRNN represents the rule governing the time series S (for example, the switch of trends) as a change from an aspect to another aspect by setting the optimum parameter. The time series S itself is described using the estimated density function string specified by an aspect string.

An experiment result indicates a trend in the mode of the estimated density function of the CSSRNN. A mode refers to a data value corresponding to the peak of the estimated density function (the highest frequency value) at a specific time. As shown in FIGS. 26, 27, 28, and 29, there are two groups of aspects. When each aspect is approximated with high precision using a Gaussian density function base N ($\Sigma h_{ij}$·vector $w_j$, 1), the Gaussian density function approximately represents a trend. In this case, the trend is explicitly represented as a distributed representation using weight vectors of the CSSRNN.

When the time-series trend almost matches in number the peak of the Gaussian density function base N ($\Sigma h_{ij}$·vector $w_j$, 1) corresponding to the hidden variable vector which is the primary term of an aspect, the data of the trend is represented as a distributed representation using the input loads $\Sigma h_{ij}$·vector $w_j$.

When the CSSRNN is used as a predicting filter, the function of the context layer is defined as follows. The filter for use in estimating time-series data generated by expression (25) should estimate the time-series trend and correctly trace the switch of the trends.

The feature derived by expression (25) is described as follows. The context layer varies with time, and changes the form of the estimated density function. The aspect changes as the content $O^{(t,s)}$ of the context layer varies, thereby changing the form of the estimated density function. $\Theta_j^{(t)}$ in the following equation shows the extent to which the output history of the j-th hidden element affects the aspect.

$$\Theta_j^{(t)} = \vec{u}_j \vec{O}_j^{(t,s)} + \theta_j$$

If the value of $\Theta_j^{(t)}$ is large in equation (13), the contribution of the hidden vector having the j-th element of 1 becomes higher.

Figure 30:
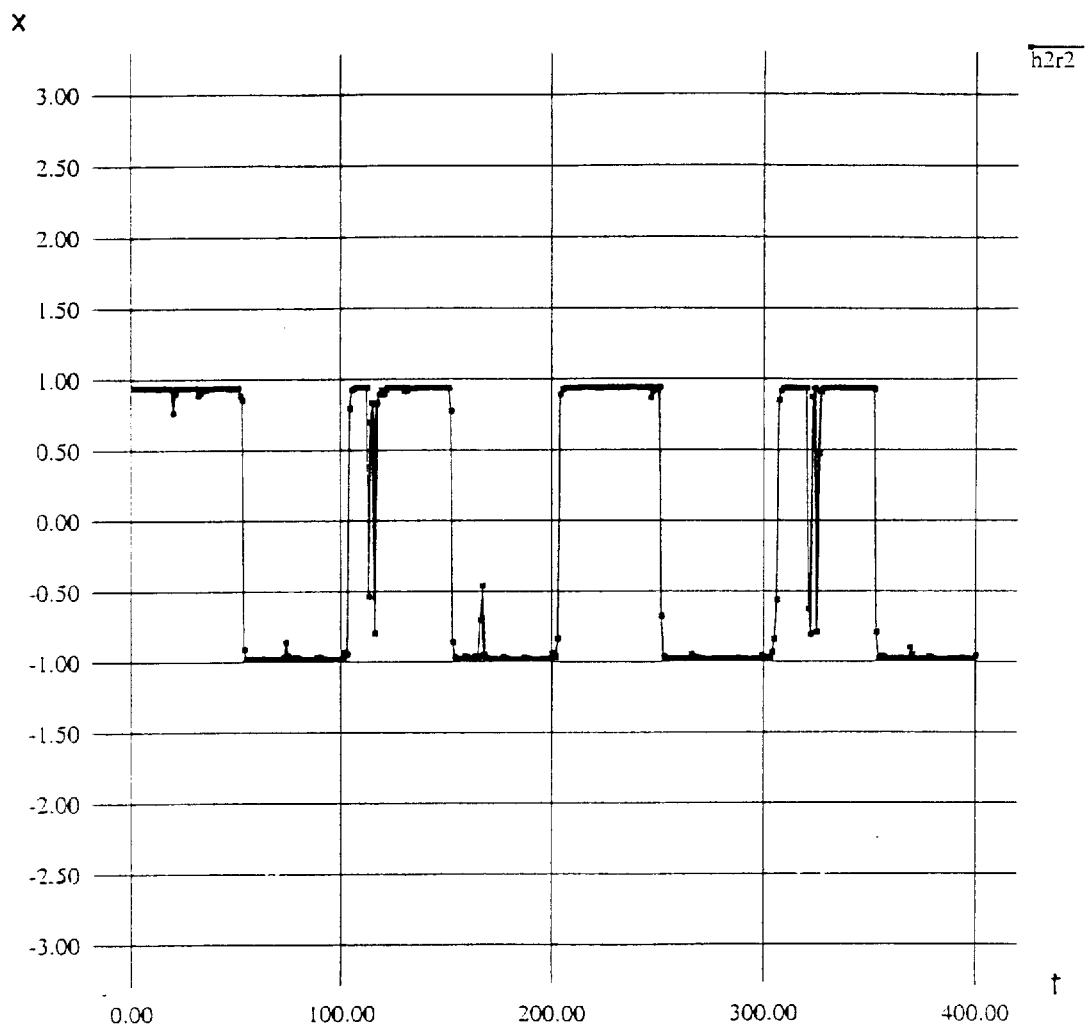
FIG. 30 shows an estimated value according to the h2r2 neural network.
Figure 31:
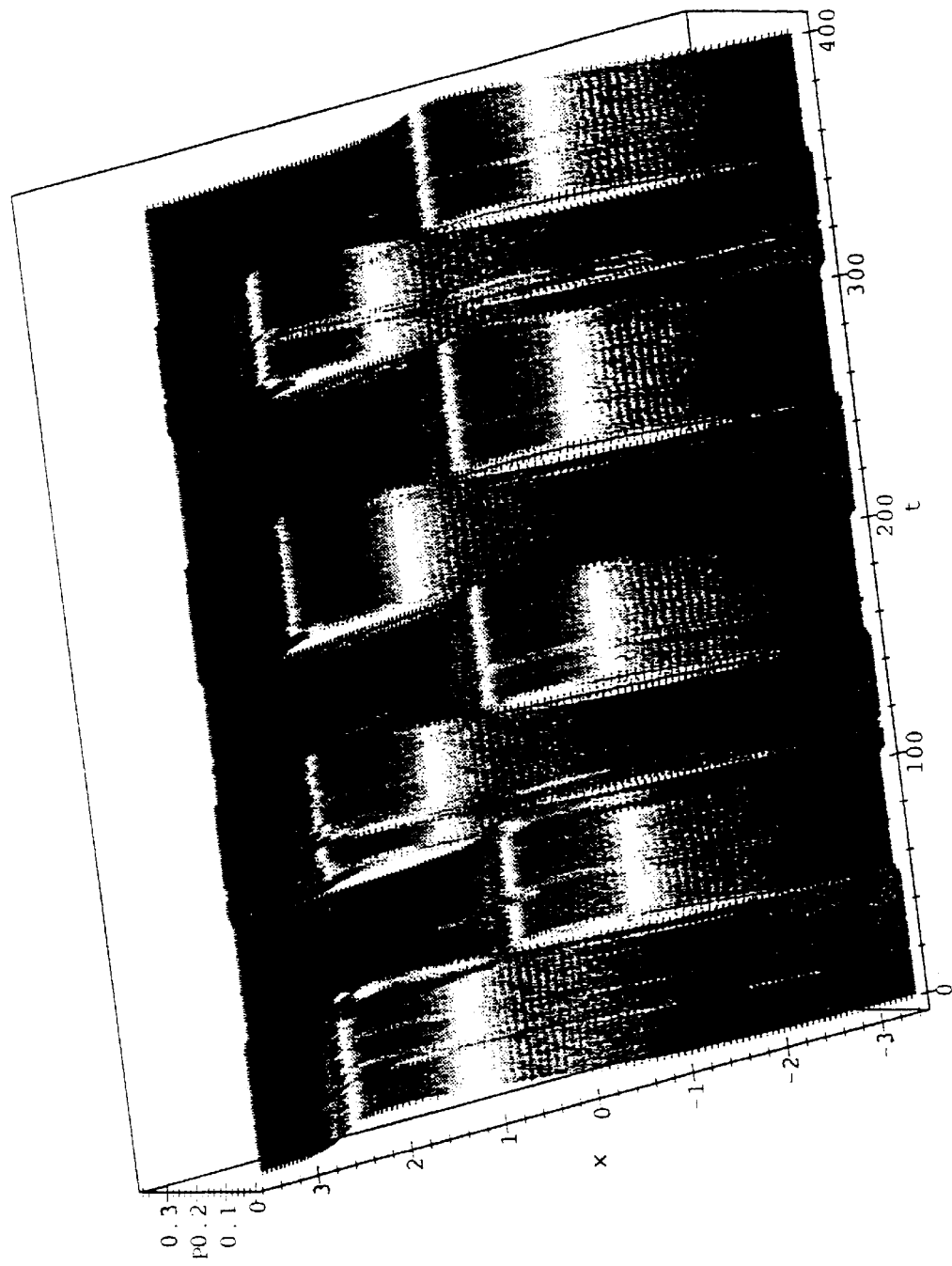
FIG. 31 shows an estimation distribution according to the h2r2 neural network.
Figure 33:
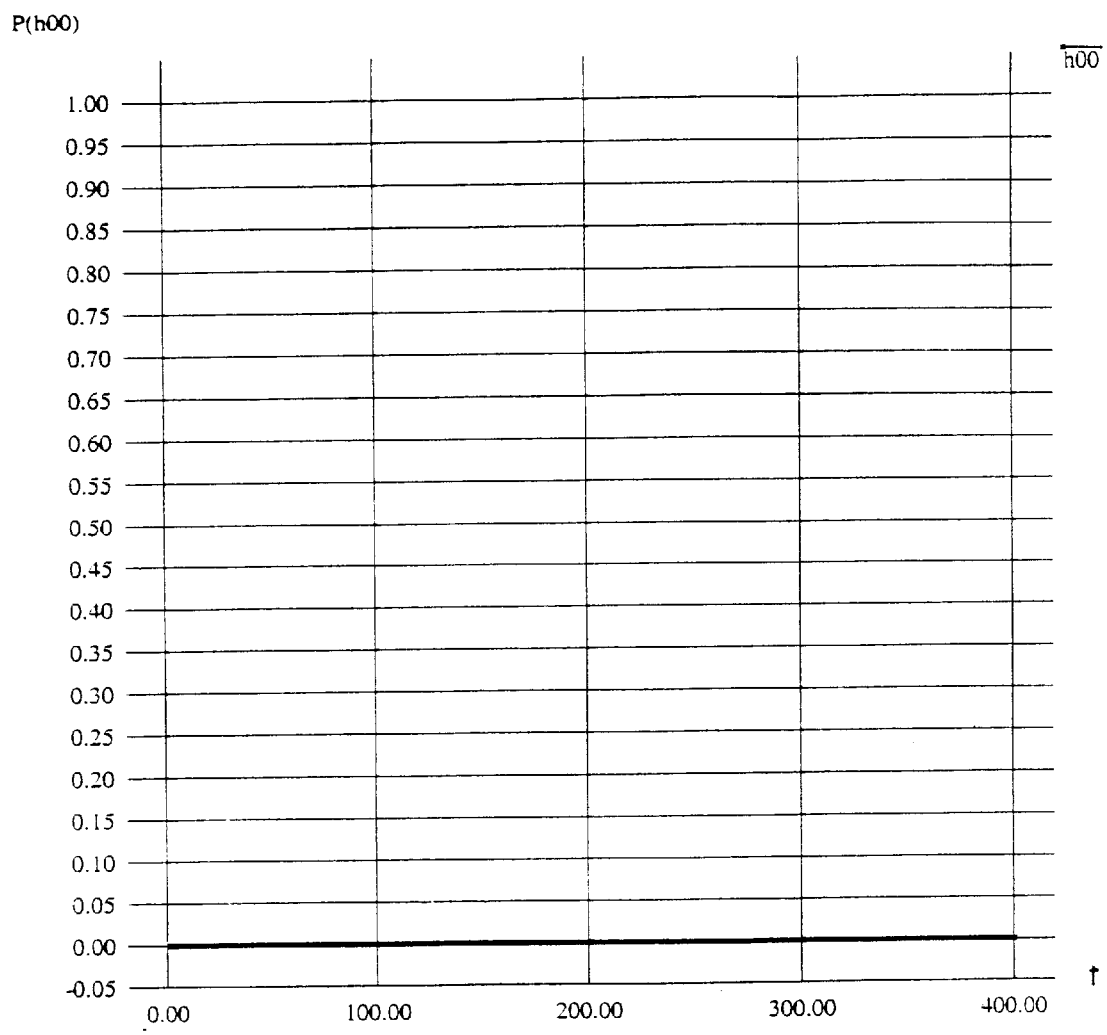
FIG. 33 shows the probability density of a hidden variable vector (0, 0) according to the h2r2 neural network.
Figure 34:
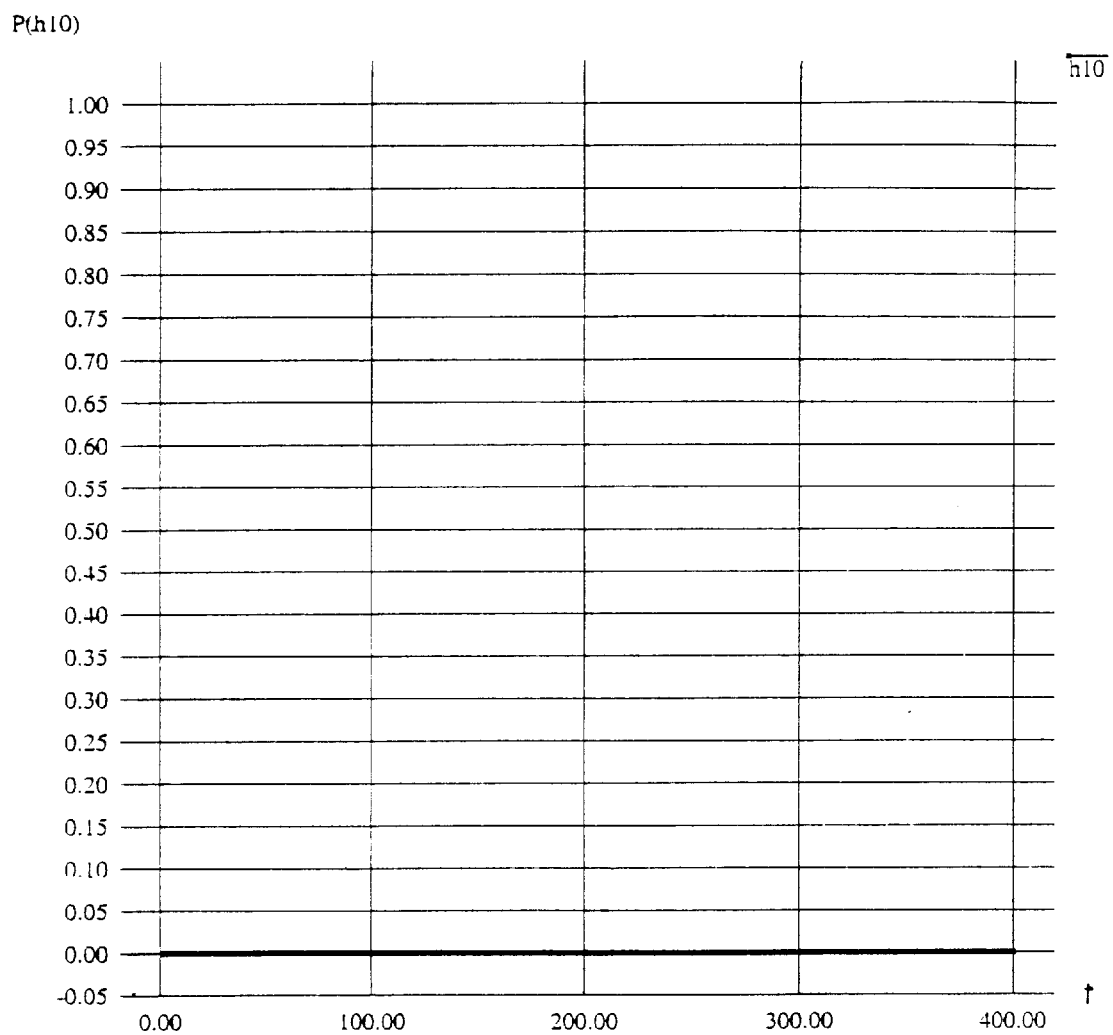
FIG. 34 shows the probability density of a hidden variable vector (1, 0) according to the h2r2 neural network.
Figure 35:
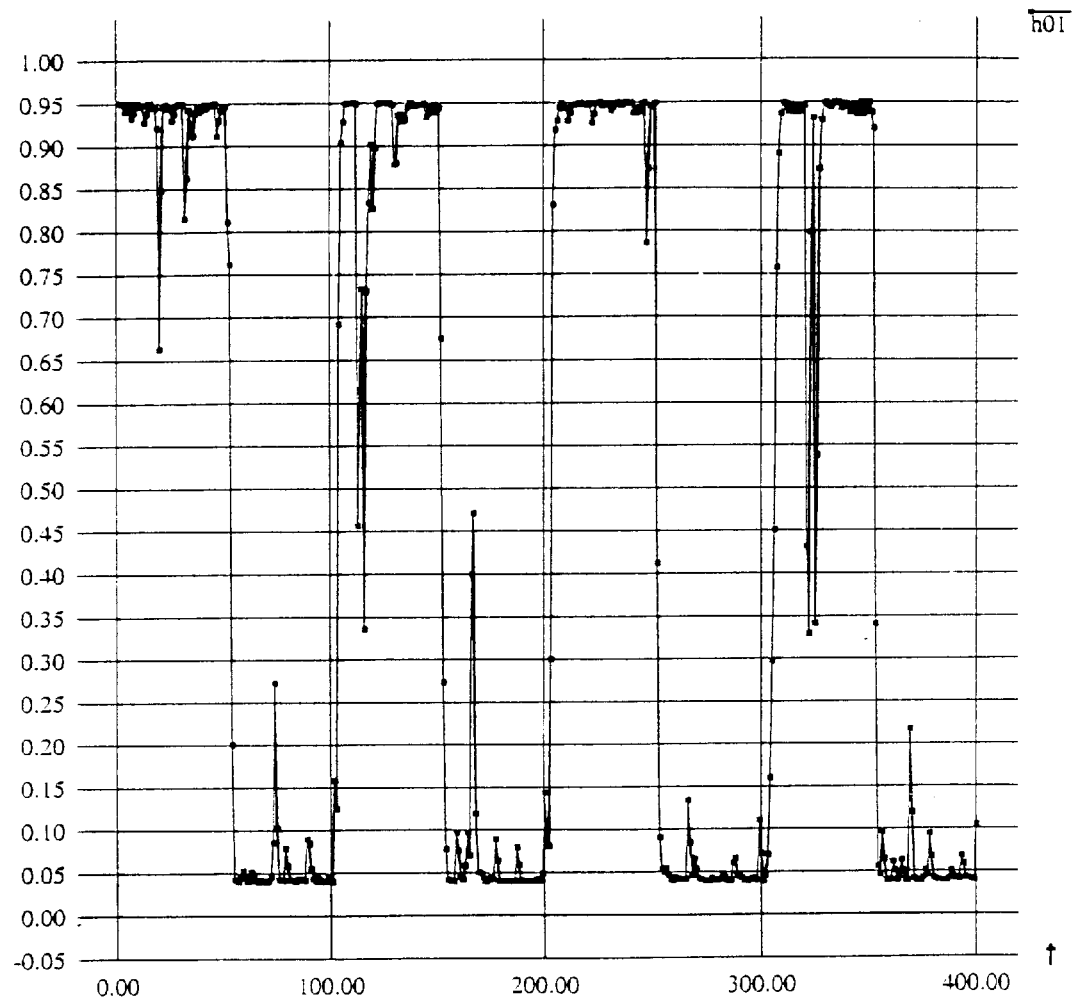
FIG. 35 shows the probability density of a hidden variable vector (0, 1) according to the h2r2 neural network.
Figure 36:
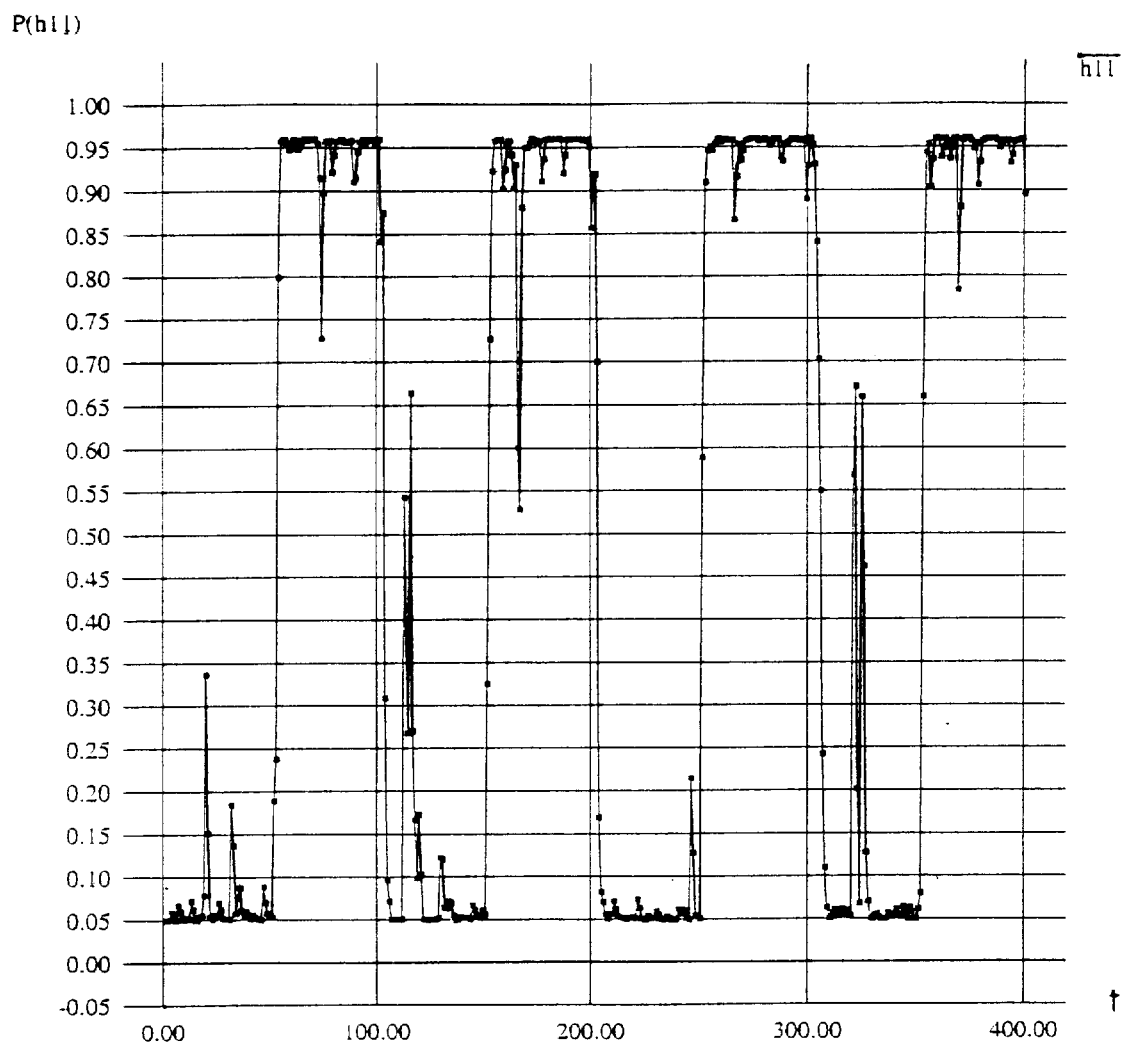
FIG. 36 shows the probability density of a hidden variable vector (1, 1) according to the h2r2 neural network.

The relationship between a practical time-series data and the recurrent coefficient and threshold in the context layer of the CSSRNN is considered. FIG. 30 shows the estimated value through the h2r2-NN for comparison with the h2r1-NN. FIG. 31 shows the estimated density function string. Comparing FIGS. 23 and 30, it is verified that h2r2-NN outputs a stable trend estimation indicating no disorder as shown in FIG. 30. The form of the estimated density function at any time shown in FIG. 31 is close to that of the Gaussian density function. FIG. 32 shows the optimum parameter set used by the h2r2-NN. In the case of the h2r2-NN as well as the h2r1-NN, the optimum parameters for a prediction filter can be found.

FIGS. 33, 34, 35, and 36 respectively show the probability density for the hidden variable vector $h_{(0)}$=(0, 0), vector $h_{(1)}$=(1, 0), vector $h_{(2)}$=(0, 1), and vector $h_{(3)}$=(1, 1) estimated by the h2r2-NN. According to these figures, the aspect of each section can be almost perfectly represented by one hidden variable vector. The vector $h_{(2)}$ is associated with the section managed by N (1, 1), and the vector $h_{(3)}$ is associated with the section managed by N (−1, 1). Therefore, the trend is represented as being distributed over input loads. Thus, in comparison with the h2r1-NN, the h2r2-NN is provided with the properties more appropriate as a prediction filter.

Figure 37:
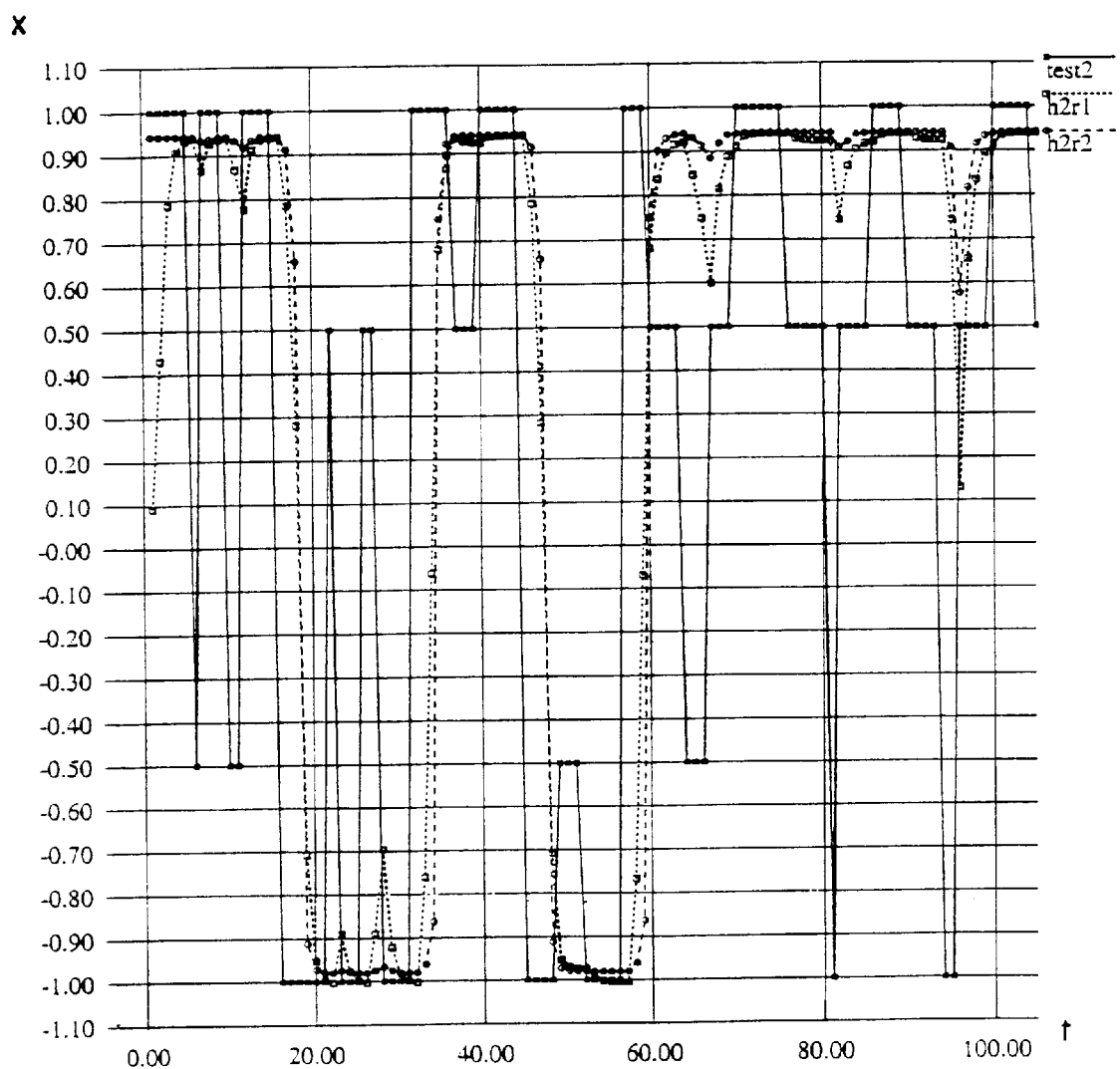
FIG. 37 shows the estimation results (1) according to the two neural networks.
Figure 38:
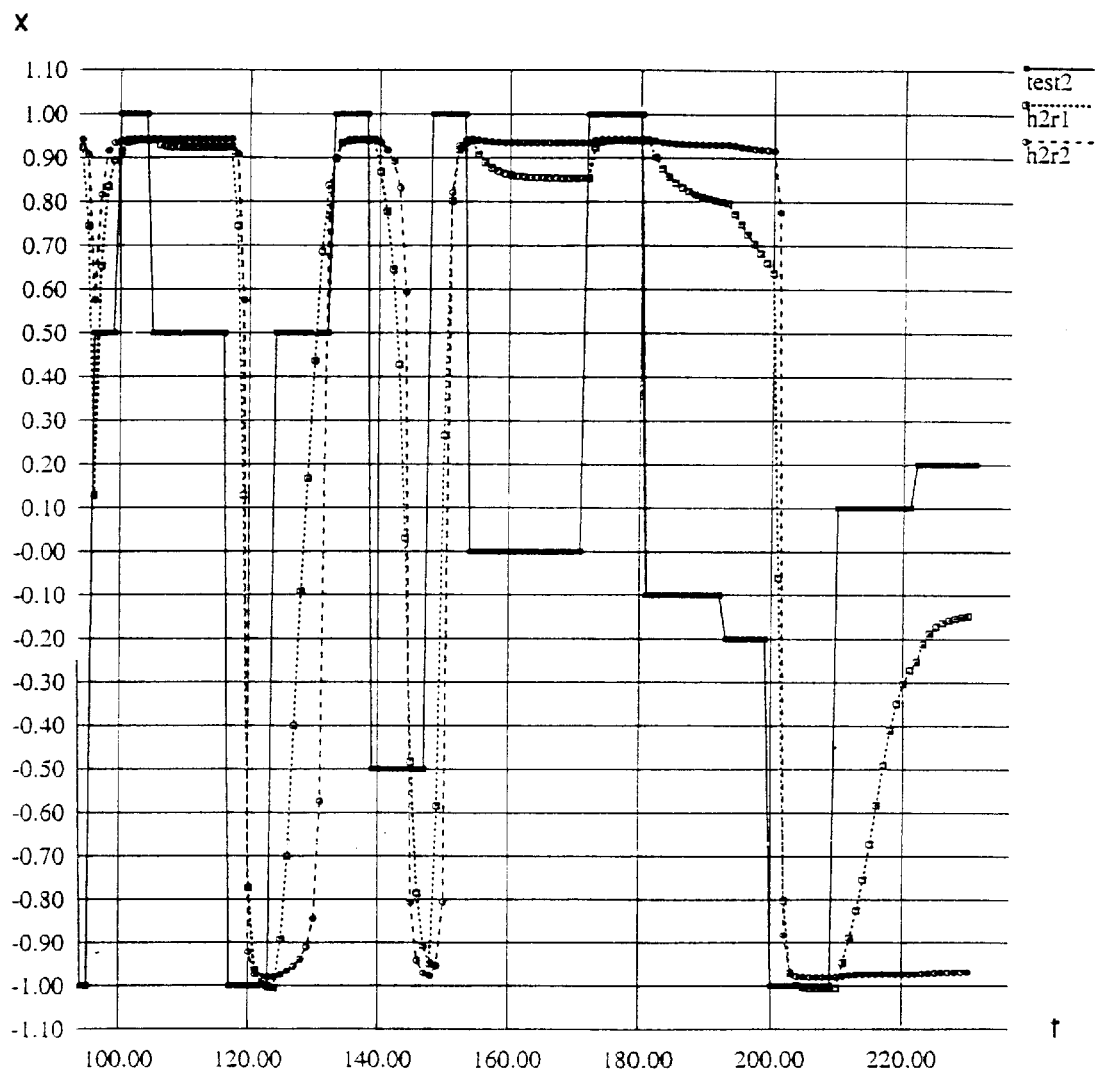
FIG. 38 shows the estimation results (2) according to the two neural networks.

FIGS. 37 and 38 show specific test data and the estimation results on the data respectively obtained by the h2r1-NN and h2r2-NN. The parameters of each CSSRNN are shown in FIGS. 25 and 32. In this test data, any value of {−1, 0, −0.5, −0.2, −0.1, 0.0, 0.1, 0.2, 0.5, 1.0} is continuously output for a certain period. Then, the value is discontinuously switched into another value. The test data is generated by appropriately selecting a combination of these values. This experiment aims at clarifying the functions of the recurrent coefficient (register coefficient) and the threshold of a context layer. That is, the object is to qualitatively determine the change in aspect and the switches of trends for the input $x^{(t)}$. In FIGS. 37 and 38, black squares indicate test data while white squares indicate the values estimated by the h2r1-NN. White circles indicate the values estimated by the h2r2-NN.

In all test data sections ($t \in [1, 2, \ldots, 230]$ with the time axis t), the h2r2-NN is less sensitive than the h2r1-NN to data having a larger difference (deviation) from a trend, and indicates a delay in tracing the switch of trends.

With $t \in [1, \ldots, 30]$ in FIG. 37, the test data are prepared to check how the estimation changes when the data indicating a difference exceeding variance of 1 is suddenly entered under a circumstance with a mean value of N (1, 1) or N (−1, 1) assumed as a trend. For example, when $x^{(t)}$=−0.5 that is close to the mean value −1 of N (−1, 1) and is deviated from an estimated value is suddenly input under a circumstance with a mean value 1 of N (1, 1) assumed as a trend, the both values estimated by h2r1-NN and h2r2-NN slightly fluctuate. The disorder of the estimated values is more apparent with the h2r1-NN. The similar result is obtained when $x^{(t)}$=0.5 that is close to the mean value 1 of N (1, 1) is suddenly input under a circumstance with a mean value −1 of N (−1, 1) assumed as a trend. The aspects determined by the internal states $\overline{O}^{(t,1)}$ and $\overline{O}^{(t,2)}$ of the h2r1-NN and h2r2-NN respectively remains in the current states even if approximately three inputs indicate deviation from the trend as exceeding the variance.

With $t \in [31, \ldots, 60]$, the test data are prepared to check how the estimation changes when the present estimation almost matches the trend and values, although they do not exactly match the trend, but are close to the trend, that is, when values indicating differences smaller than the variance are input in series. In this case, both h2r1-NN and h2r2-NN indicate no fluctuation in the estimated values. In this section, it is supposed that changes in the aspect based on the changes in internal states $\overline{O}^{(t,1)}$ and $\overline{O}^{(t,2)}$ hardly happen.

With $t \in [61, \ldots, 100]$, it is considered that the present estimation matches the trend and data indicating the deviation of double variance is suddenly input when data indicating the deviation from the mean value within the variance are continuously entered. What is checked here is the fluctuation of the estimation after the data containing deviation and abnormal values are input. Estimated values indicate disorder to some extent and the influence of a change in input continues although not to a significant extent. The h2r2-NN indicates a smaller influence than the h2r1-NN. The internal states $\overline{O}^{(t,1)}$ and $\overline{O}^{(t,2)}$ change, and the changes are represented as the changes of aspects. At this time, the peak of the estimated density function moves only a little, but the width of the estimated density function is likely to be extended as compared with the Gaussian density function.

With $t \in [101, \ldots, 150]$ shown in FIG. 38, assuming that the present estimation matches the trend, the change in estimation is checked when data indicating a difference larger than variance but smaller than double the variance are continuously input. The fluctuation of the estimation is significantly different between the h2r1-NN and h2r2-NN. When the present trend is −1, the input $x^{(t)}=0.5$ is selected, and the value is continuously input, the estimated density function is gradually changed into a value close to N (1, 1). The h2r1-NN changes the function continuously and linearly. The h2r2-NN suddenly changes it in such a manner as an exponential function from a form close to N (−1, 1) into another form close to N (1, 1). Compared with the h2r1-NN, the h2r2-NN holds the aspect more firmly.

With $t \in [151, \ldots, 230]$, the change in internal state is hardly represented as a change in aspect. Therefore, it is rather conservative. The input refers to data having deviation from the trend exceeding the variance. The deviation is smaller than that of the above described data in the previous time section. The h2r1-NN indicates continuous movement of the peak of the estimated density function. However, there is no movement of peak in the h2r2-NN. In the h2r1-NN, the change in an updated internal state does not appear as a change in aspect even if the input deviation exceeds the variance.

Summing up, parameters are selected to reserve the aspect regardless of input fluctuation in each section of the CSSRNN where the average value is kept constant when appropriate parameters are selected for the data generated by expression (25). Thus, there is a requirement to reserve an aspect while a requirement to appropriately switch aspects should be satisfied. Therefore, values should be selected as a weight vector $u_j$ and a threshold $\theta_j$ to make the aspect of the CSSRNN conservative and switch aspects without passing through an intermediate aspect. Such values can be obtained by retrieving parameters which minimizes the negative value logarithm likelihood in the CSSRNN having the appropriate number of registers.

The estimated distribution of the CSSRNN are positioned between two main aspects corresponding to two trends according to an input and the past output of a hidden element. A threshold and a weight coefficient for a register are selected such that the switch between aspects is conservative to the fluctuation, and that aspects are actually switched discontinuously.

In determining the number of registers, the size of the context layer should be determined in consideration of appropriate switch of the aspects and computation efficiency. When a CSSRNN comprising a number of registers is used as a predicting filter, undesired problems occur. For example, it is difficult to select appropriate parameters, or there is a delay of operations when trends are switched. If the number of registers is increased, then the negative value logarithm likelihood can be decreased. However, since the estimated value is greatly affected by time-series data in this case, it is not appropriate as a predicting filter. Therefore, the necessary number of registers should be appropriately determined for a time-series data. As a simple heuristic method, the amount-of-information reference is formally introduced to compute the appropriate number of registers (depth of the context layer).

In this method, formal amount-of-information reference of some h2rs-NN ($1 \leq s \leq 5$) is computed for the time series S generated by expression (25).

2×(negative value logarithm likelihood)+2×(number of registers per hidden element)

The results are shown in FIG. 39.

FIG. 39 shows that it is sufficient to store the outputs for the past two unit time in two estimating registers in order to reserve the aspect corresponding to each section when data appear at the area where the lower slopes of the distributions overlap or when abnormal data appear. In the CSSRNN having two or more registers, there is a small change in negative value logarithm likelihood with the increasing number of registers. Furthermore, it is checked in experiments that there is not a large difference in the form of the estimated value of a trend, and that, with the increasing number of registers, the test data affect the estimation of a trend of the CSSRNN. The evaluation method using the formal amount-of-information reference is the heuristics that satisfy the object of preparing a predicting filter for the information source having such a structure as specified by expression (25).

According to the above described experiments and studies, the following conclusions are obtained about the relationship between the internal representation of a predicting filter by the CSSRNN and time-series data.

(e) In the CSSRNN, an estimated density function p (vector $x^{(t)}|\Phi, \overline{O}^{(t,s)}$) is represented by a linear combination of Gaussian density functions N ($\Sigma h_{ij}$·vector $w_j$, 1) having as a weight the estimated distribution P (vector $h_{(i)}|\Phi, \overline{O}^{(t,s)}$) of the hidden variable vector $h_{(i)}$. The mean value of the base Gaussian density function is determined by a hidden variable vector and the input weight vector $w_j$ of a hidden element, and represented as $\Sigma h_{ij}$·vector $w_j$. Therefore, the form of the estimated density function is determined by the state (aspect) of overlap of hidden vectors in probability, and by an input weight vector.

(f) The optimum parameters of the CSSRNN for time-series S generate the most probable function string among the possible estimated density function strings which can be represented by the CSSRNN for the time-series S. Therefore, in the CSSRNN having the optimum parameters, the weights of aspects reflects the characteristics (a probabilistic structure) of the time-series S.

(g) When the time series S is generated by the Gaussian density function indicating a shifting mean value, the CSSRNN represents the rules governing the switch of trends behind the time-series S as a transition from an aspect to another aspect. The time-series S is regarded as following the estimated density function string specified by an aspect string.

(h) If the trend of time-series data almost matches in number the peak of the Gaussian density function base N ($\Sigma h_{ij}$·vector $w_j$, 1) corresponding to the hidden variable vector that is the primary term of the aspect, and if the weight of the primary term is close to 1.0, then the value of the trend is represented as a distributed representation over the input loads $\Sigma h_{ij}$·vector $w_j$ of the CSSRNN.

(i) In the operating CSSRNN, the estimated density function is shifted between plural of aspects corresponding to plural trends according to an input and the past output of a hidden element. In a predicting filter for a mean value shifting Gaussian density function, a switch between aspects should be conservative to the fluctuation, and the aspects should be actually switched discontinuously. Therefore, thresholds and register weight coefficients should be selected such that the scope of the fluctuation of the internal state can be extended as much as possible under a condition that the internal fluctuation does not affect the fluctuation of the aspect very much. At this time, optimizing in number the evaluation function merit (S|Φ) detects parameters that meet the above described requirements.

(j) To realize a predicting filter, the size of the CSSRNN (number of hidden elements and registers) should be appropriately selected. When the depth (number of registers) of the context layer and the value of each parameter are determined for the average value shifting Gaussian density function, an appropriate predicting filter can be configured.

As described above, the time-series trend estimating system according to the present invention correctly traces a discontinuously changing trend. Therefore, in the following field in which the non-stationary and nonlinear time-series analysis is required, the system can be used in correctly estimating a trend at a high speed.

1: Management of the Resources of the Computer Network

A network traffic or a load of CPU over the entire network can be estimated as time-series data. The utilization of the network is modelled using the available memory amount, and the change in utilization can be estimated.

The resources of the network can be appropriately controlled by estimating the state of the network from the measurement changing with time, for example, a network traffic. Even when the measurement has a trend in which each section is piecewise stationary and the trend discontinuously changes every section, the state of the network can be correctly estimated.

2: Processing a Living Organism Signal

The system models sleeping stages by using individual brain waves and estimates a sleep disorder. Furthermore, it uses a load model generated from an individual rheocardiography to estimate an abnormal condition of an individual body.

According to the present invention, the relationship between the internal state of a recurrent neural network and time-series data is clarified, and the time-series trend that discontinuously changes with time can be efficiently estimated according to the relationship.

What is claimed is:

1. A time-series trend estimating system for use in an information processing apparatus for estimating a change trend of data which changes with time, comprising:

input means for inputting time-series data;

neural network means for outputting an internal state including information about past time-series data, comprising a column-structured recurrent neural network including at least one independent column with a context layer;

estimated value generating means for obtaining an occurrence probability of a candidate for an estimated value according to the internal state, and obtaining a most probably candidate as the estimated value; and output means for outputting the estimated value as an estimation result of unknown data.

2. The time-series trend estimating system according to claim 1, wherein said neural network means is adapted for outputting the internal state representing information about a probability that a probability distribution of data is selected.

3. The time-series trend estimating system according to claim 1 further comprising:

learning means for learning provided time-series data, generating an optimum value of a parameter of said recurrent neural network means, and for providing the optimum value for said neural network means, wherein said neural network means is adapted for computing the internal state using the optimum value of the parameter.

4. The time-series trend estimating system according to claim 3, wherein said learning means is adapted for computing an evaluation function using an arbitrary value of the parameter of said recurrent neural network and the provided time-series data, and setting as the optimum value a parameter value causing a value of the evaluation function to be optimal.

5. The time-series trend estimating system according to claim 1, wherein said column-structured recurrent neural network comprises a plurality of columns, each of said columns including:

a neural element for receiving said time-series data; and a shift register in the context layer for holding a past output history of the neural element in time order, and an output of the shift register is recurrently input to the neural element in a same column.

6. The time-series trend estimating system according to claim 1, wherein said column-structured recurrent neural network comprises a plurality of columns, each of said columns including:

a neural element for receiving said time-series data; and a register in the context layer for holding a past output history of the neural element, and an output of the register is recurrently input to the neural element in a same column.

7. The time-series trend estimating system according to claim 6, wherein said estimated value generating means is adapted for assigning to said neural element a discrete variable representing a discreteness of a discontinuous trend of time-series data, generating a probability distribution function defined by an energy function represented by the discrete variable and the internal state, and obtaining the estimated value using the probability distribution function.

8. The time-series trend estimating system according to claim 7, wherein said estimating means is adapted for generating the probability distribution function as a combination of a plurality of Gaussian distribution functions with a probability distribution of the discrete variable used as a weight.

9. The time-series trend estimating system according to claim 1, wherein said estimating means is adapted for generating a probability distribution function as a combination of a plurality of Gaussian distribution functions using the internal state, and obtaining the estimated value using the probability distribution function.

10. The time-series trend estimating system according to claim 9, wherein said estimating means is adapted for generating a string of probability distribution functions, each of the probability distribution functions corresponding to a form of said probability function which changes with time through update of the internal state, and generating a string of estimated values string, each of the estimated values corresponding to a value of said estimated value which changes with time, from the string of the probability distribution functions.

11. The time-series trend estimating system according to claim 1, wherein said estimated value generating means is adapted for setting a solution of an estimation equation determined by the internal state and a parameter of the recurrent neural network as the candidate for the estimated value.

12. The time-series trend estimating system according to claim 11, wherein said estimating means comprises zero point computing means for obtaining a zero point of an object function described with the internal state and the parameter of the recurrent neural network, and is adapted for setting a data value corresponding to the zero point as the candidate for the estimated value.

13. The time-series trend estimating system according to claim 12, wherein said estimating means further comprises object function evaluating means for computing a value of the object function around the zero point from the internal state, and providing a computation result for the zero point computing means.

14. The time-series trend estimating system according to claim 11, wherein said estimating means further comprises probability computing means for computing a value of a probability distribution function of data according to the candidate for the estimated value and internal state.

15. The time-series trend estimating system according to claim 14, wherein said recurrent neural network comprises a plurality of columns having a neural element;

said estimating means further comprises normalization coefficient computing means for computing a normalization coefficient of the probability distribution function using a discrete variable assigned to the neural element; and said probability computing means is adapted for computing the value of the probability distribution function using the normalization coefficient obtained by said normalization coefficient computing means.

16. The time-series trend estimating system according to claim 14 further comprising:

estimated value selecting means for providing a plurality of candidates for the estimated value for said probability computing means, receiving a plurality of values of the corresponding probability distribution function, and selecting a candidate corresponding to a maximum value in the plurality of values as the estimated value.

17. A time-series trend estimating system comprising:

input means for receiving time-series data which changes with time;

neural network means for storing an internal state representing information about a probability in which a probability distribution relating to a discrete value of the time-series data is selected; and estimated value output means for obtaining an estimated value having a high occurrence probability using the internal state, and outputting the estimated value as an estimation result.

18. A computer-readable storage medium used by a computer for estimating a change trend of data which changes with time, and used to direct the computer to perform the steps of:

inputting time-series data;

obtaining an internal state including information about past time-series data using a column-structured recurrent neural network having at least one independent column with a context layer;

obtaining an occurrence probability of a candidate for an estimated value using the internal state, and obtaining a candidate having a highest probability as the estimated value; and estimating unknown data based on the estimated value.

19. The computer-readable storage medium according to claim 18 used to direct the computer to further perform the step of:

outputting the internal state representing information about a probability that a probability distribution of the data is selected.

20. A time-series trend estimating method of estimating a change trend of data which changes with time, comprising the steps of:

measuring time-series data;

obtaining an internal state including information about past time-series data through a column-structured recurrent neural network having at least one independent column with a context layer;

obtaining an occurrence probability of a candidate for an estimated value using the internal state;

setting a candidate having a highest probability as the estimated value; and estimating unknown data based on the estimated value.

21. The time-series trend estimating method according to claim 20, wherein said internal state represents information about a probability that a probability distribution of data is selected.

* * * * *